United States Patent
Sakamoto et al.

(10) Patent No.: US 7,121,976 B2
(45) Date of Patent: Oct. 17, 2006

(54) SYSTEM AND METHOD FOR CONTROLLING MOTOR VEHICLE

(75) Inventors: Hiroshi Sakamoto, Hitachi (JP); Toshimichi Minowa, Mito (JP); Takashi Okada, Hitachi (JP); Tatsuya Ochi, Tokai-mura (JP); Naoyuki Ozaki, Hitachinaka (JP); Tetsuo Matsumura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 10/939,590

(22) Filed: Sep. 14, 2004

(65) Prior Publication Data

US 2005/0059529 A1    Mar. 17, 2005

(30) Foreign Application Priority Data

Sep. 16, 2003    (JP) .............................. 2003-323029

(51) Int. Cl.
*F16H 59/64* (2006.01)
*B60W 10/04* (2006.01)

(52) U.S. Cl. ........................................ 477/98; 471/107
(58) Field of Classification Search ................ 477/107, 477/98, 76; 74/339
See application file for complete search history.

(56) References Cited

U.S. PATENT DOCUMENTS 5,997,433 A * 12/1999 Domian et al. ................ 477/98

6,889,570 B1 * 5/2005 Kayano et al. ................ 74/339

FOREIGN PATENT DOCUMENTS

| JP | 61-045163 | 3/1986 |
|----|-----------|--------|
| JP | 08-230503 | 9/1996 |
| JP | 2002-349646 | 12/2002 |
| WO | WO 95/22014 | 8/1995 |

* cited by examiner

*Primary Examiner*—Dirk Wright
(74) *Attorney, Agent, or Firm*—Crowell & Moring LLP

(57) ABSTRACT

A control system for a motor vehicle is provide which is capable of reducing a load on a friction engagement device and preventing the friction engagement device from being damaged. A transmission 50 includes a plurality of gears and a plurality of dog clutches for transmitting torque from an input shaft 41 to an output shaft 50 and a friction engagement device 10. A torque transmission path from the input shaft 41 to the output shaft 50 is formed through engagement between the gear and the dog clutch. When the engagement between the gear and the dog clutch is changed from a first engagement to a second engagement, the friction engagement device 10 is used to transmit torque of an engine 6 from the input shaft 41 to the output shaft 50. A power train unit 100 includes state determiner 310 and engine torque control means 320. The state determiner 310 detects or estimates a thermal state of the friction engagement device 10. The engine torque controller 320 controls the torque of the engine 6 according to a parameter representing the thermal state detected or estimated by the state determiner 310.

20 Claims, 24 Drawing Sheets

SYSTEM AND METHOD FOR CONTROLLING MOTOR VEHICLE

BACKGROUND OF THE INVENTION

This application claims the priority of Japanese Patent Document No. 2003-323029, filed Sep. 16, 2003, the disclosure of which is expressly incorporated by reference herein.

The present invention relates to a system and a method for controlling a motor vehicle and, more particularly, to a system and a method for controlling a motor vehicle mounted with a transmission that, when a gearshift is accomplished by selecting a dog clutch, transmits by way of a friction engagement device torque from a driving power source from an input shaft to an output shaft.

An automated manual transmission (hereinafter referred to as an "automated MT") has been lately developed. The automated MT is a system automatizing operations of getting a vehicle started and gearshifts performed by a manual transmission that transmits torque of a driving power source from an input shaft to an output shaft through engagement of a gear and a dog clutch.

In a conventional vehicle mounted with an automated MT, a gearshift operation is performed by using an actuator that operates a friction clutch interposed between the driving power source and the input shaft of the transmission. As a result, the gearshift operation is disabled if the friction clutch is damaged. Then, in worst cases, the vehicle becomes unable to run.

Examples of known art are disclosed, for example, in Japanese Patent Laid-open No. Hei 8-230503 and PCT Patent Publication No. WO 95-22014 (an equivalent of Japanese Patent Laid-open No. 8-509284). In these known techniques, energy generated from a friction surface of the friction clutch is calculated and controlled to prevent the friction clutch from being damaged due to an increased temperature. In PCT Patent Publication No. WO95-22014, for example, an approach as detailed in the following is taken. Specifically, the overall energy that has already been generated is calculated based on an engine rotational speed, an input shaft rotational speed, and the transmission torque of the friction clutch. The natural cooling energy is then subtracted from the overall energy to arrive at the energy generated on the friction surface of the friction clutch. It is further known that the friction clutch is protected by minimizing the energy generated on the friction surface of the friction clutch in the following manner. Specifically, engagement of the friction clutch is rapidly released or a rapid engagement of the friction clutch is promoted according to the value of the calculated energy.

The automated MT has the disadvantage that there is an interruption of torque transmitted from the driving power source due to release and engagement operations of the friction clutch during gearshifts. This gives passengers of the vehicle a sense of discomfort. Known as a method of controlling gearshifts in the automated MT is an automatic transmission provided with a friction engagement device as disclosed in Japanese Patent Laid-open No. Sho 61-45163. In this method, when accomplishing a gearshift through selecting a dog clutch, the friction engagement device is controlled so as to transmit the driving power source torque to the output shaft of the transmission even during the gearshift. The method thereby avoids torque interruption, achieving a smooth shift feel.

The techniques disclosed in Japanese Patent Laid-open No. Hei 8-230503 and PCT Patent Publication No. WO95-22014 are effective in protecting the friction clutch, but are not directly applicable to the automatic transmission provided with the friction engagement device such as that disclosed in Japanese Patent Laid-open No. Sho 61-45163. To state it another way, the friction engagement device differs from the friction clutch used in PCT Patent Publication No. WO95-22014 in the purpose of use, method of use, frequency of use, and operating conditions. The friction engagement device without its modification is not thus directly applicable to the automatic transmission provided with the friction engagement device.

The automated MT using the friction engagement device as disclosed in Japanese Patent Laid-open No. Sho 61-45163 therefore has the problem that a broken friction engagement device aggravates a gearshift feel and, in worst cases, could make the automated MT totally disabled in gearshift.

SUMMARY OF THE INVENTION

It is therefore an object of the present invention to provide a system and a method for controlling a motor vehicle capable of reducing a load on a friction engagement device and preventing the friction engagement device from being damaged.

(1) To achieve the foregoing object, the present invention provides a control system for a motor vehicle in which torque from a driving power source is transmitted to a tire through an input shaft and an output shaft of a transmission which includes a plurality of gears and a plurality of dog clutches for transmitting torque from the input shaft to the output shaft, and at least one friction engagement device, wherein engagement of the gears with the dog clutches forms torque transmission paths from the input shaft to the output shaft, and wherein, when the engagement of the gears with the dog clutches is switched from a first engagement to a second engagement, the friction engagement device transmits the torque of the driving power source from the input shaft to the output shaft, the control system comprising:

thermal state determining means for determining a thermal state by detecting or estimating a thermal state of the friction engagement device; and driving power source torque control means for controlling the torque of the driving power source according to a parameter representing the thermal state of the friction engagement device determined by the thermal state determining means.

With this configuration, a load on the friction engagement device can be reduced and thus the friction engagement device can be prevented from being damaged.

(2) To achieve the foregoing object, the present invention provides a control system for a motor vehicle in which torque from a driving power source is transmitted to a tire through an input shaft and an output shaft of a transmission which includes a plurality of gears and a plurality of dog clutches for transmitting torque from the input shaft to the output shaft and at least one friction engagement device, and the motor vehicle including first/second gearshift mode control means for controlling the transmission in either a first gearshift mode or a second gearshift mode, in the first gearshift mode, when the engagement of the gears with the dog clutches forming torque transmission paths from the input shaft to the output shaft is switched from the first engagement to the second engagement, a gearshift being performed such that the friction engagement device transmits the torque of the driving power source from the input shaft to the output shaft with a friction clutch engaged, and the torque transmission path formed by the first engagement is switched to at least one intermediate transmission path formed by the friction engagement device before the intermediate transmission path is switched to a transmission path formed by the second engagement, and in the second gearshift mode, when the engagement of the gears with the dog clutches is switched from the first engagement to the second engagement, a gearshift being performed such that the transmission path formed by the first engagement is switched to the transmission path formed by the second engagement with the friction clutch released, comprising:

thermal state determining means for determining or estimating a thermal state of the friction engagement device; and gearshift mode selection means selecting either the first gearshift mode or the second gearshift mode according to the parameter representing the thermal state determined by the thermal state determining means.

With this configuration, a load on the friction engagement device can be reduced and the friction engagement device can be prevented from being damaged.

(3) To achieve the foregoing object, the present invention provides a control system for a motor vehicle in which torque from a driving power source is transmitted to a tire through an input shaft and an output of a transmission which includes a plurality of gears and a plurality of dog clutches for transmitting torque from the input shaft to the output shaft and at least one friction engagement device, and in which engagement of the gears with the dog clutches forms torque transmission paths from the input shaft to the output shaft, and, when the engagement of the gears with the dog clutches is switched from a first engagement to a second engagement for a gearshift, the friction engagement device transmits the torque of the driving power source from the input shaft to the output shaft, the control system comprising:

thermal state determining means for determining or estimating a thermal state of the friction engagement device; and gearshift enable/disable determining means for determining whether or not the gearshift can be performed according to the parameter representing the thermal state determined by the thermal state determining means.

With this configuration, a load on the friction engagement device can be reduced and thus the friction engagement device can be prevented from being damaged.

(4) To achieve the foregoing object, the present invention provides a control system for a motor vehicle in which torque from a driving power source is transmitted to a tire through an input shaft and an output shaft of a transmission which includes a plurality of gears and a plurality of dog clutches for transmitting torque from the input shaft to the output shaft and at least one friction engagement device, and in which engagement of the gears with the dog clutches forms torque transmission paths from the input shaft to the output shaft, and, when the engagement of the gears with the dog clutches is switched from a first engagement to a second engagement, the friction engagement device transmits the torque of the driving power source from the input shaft to the output shaft, the control system comprising:

thermal state determining means for determining a thermal state of the friction engagement device; and annunciation means for informing the driver of the state of the friction engagement device according to the parameter representing the thermal state as determined by the thermal state determining means.

With this configuration, a load on the friction engagement device can be reduced and thus the friction engagement device can be prevented from being damaged.

(5) To achieve the foregoing object, the present invention provides a control method for a motor vehicle in which torque from a driving power source is transmitted to a tire through an input shaft and an output shaft of a transmission which includes a plurality of gears and a plurality of dog clutches for transmitting torque from the input shaft to the output shaft and at least one friction engagement device, and in which engagement of the gears with the dog clutches forms torque transmission paths from the input shaft to the output shaft, and, when the engagement of the gears with the dog clutches is switched from a first engagement to a second engagement, the friction engagement device transmits the torque of the driving power source from the input shaft to the output shaft, comprising steps of:

determining a parameter representing a thermal state of the friction engagement device by detecting or estimating a temperature of the friction engagement device or a quantity of heat of the friction engagement device; and reducing the torque of the driving power source when the parameter is greater than a predetermined value.

With this method, a load on the friction engagement device can be reduced and thus the friction engagement device can be prevented from being damaged.

(6) To achieve the foregoing object, the present invention provides a control method for a motor vehicle in which torque from a driving power source is transmitted to a tire through an input shaft of and an output shaft of a transmission which includes a plurality of gears and a plurality of dog clutches for transmitting torque from the input shaft to the output shaft, comprising steps of: performing a first gearshift mode in which when the engagement of the gears with the dog clutches forming torque transmission paths from the input shaft to the output shaft is switched from the first engagement to the second engagement, a gearshift being performed such that the friction engagement device transmits the torque of the driving power source from the input shaft to the output shaft with a friction clutch interposed between the driving power source and the input shaft engaged, the torque transmission path formed by the first engagement is switched to at least one intermediate transmission path formed by the friction engagement device before the intermediate transmission path is switched to a transmission path formed by the second engagement, performing a second gearshift mode in which when the engagement of the gears with the dog clutches is switched from the first engagement to the second engagement, a gearshift being performed such that the transmission path formed by the first engagement is switched to the transmission path formed by the second engagement with the friction clutch released;

determining a parameter representing a thermal state of the friction engagement device by detecting or estimating a temperature of the friction engagement device or a quantity of heat of the friction engagement device; and carrying out a gearshift in the second gearshift mode when the parameter is greater than a predetermined value.

With this method, a load on the friction engagement device can be reduced and thus the friction engagement device can be presented from being damaged.

(7) To achieve the foregoing object, the present invention provides a control method for a motor vehicle in which torque from a driving power source is transmitted to a tire through an input shaft and an output shaft of a transmission which includes a plurality of gears and a plurality of dog clutches for transmitting torque from the input shaft to the output shaft and at least one friction engagement device, and in which engagement of the gears with the dog clutches forms torque transmission paths from the input shaft to the output shaft, and, when the engagement of the gears with the dog clutches is switched from a first engagement to a second engagement for a gearshift, the friction engagement device transmits the torque of the driving power source from the input shaft to the output shaft, comprising steps of: performing a manual gearshift mode in which a driver's intention to change gears is detected and an output of a gearshift command is produced according to the detected driver's intention, and an automatic gearshift mode in which an output of a gearshift command is produced according to a gearshift map previously stored:

determining a parameter representing a thermal state of the friction engagement device by detecting or estimating a temperature of the friction engagement device or a quantity of heat of the friction engagement device; and prohibiting a gearshift for a predetermined period of time in the manual gearshift mode when the parameter is greater than a predetermined value.

With this method, a load on the friction engagement device can be reduced and thus, the friction engagement device can be prevented from being damaged.

(8) To achieve the foregoing object, the present invention provides a control method for a motor vehicle in which torque from a driving power source is transmitted to a tire through an input shaft and an output shaft of a transmission which includes a plurality of gears and a plurality of dog clutches for transmitting torque from the input shaft to the output shaft and at least one friction engagement device, and in which engagement of the gears with the dog clutches forms torque transmission paths from the input shaft to the output shaft, and, when the engagement of the gears with the dog clutches is switched from a first engagement to a second engagement, the friction engagement device transmits the torque of the driving power source from the input shaft to the output shaft, comprising steps of:

determining a parameter representing a thermal state of the friction engagement device by detecting or estimating a temperature of the friction engagement device or a quantity of heat of the friction engagement device; and warning a driver of a faulty condition of the friction engagement device when the parameter is greater than a predetermined value.

With this method, a load on the friction engagement device can be reduced and the friction engagement device can be prevented from being damaged.

According to the present invention, it is possible to reduce a load on the friction engagement device and prevent the friction engagement device from being damaged.

BRIEF DESCRIPTION OF THE DRAWINGS

Other objects and advantages of the invention will become apparent from the following description of embodiments with reference to the accompanying drawings in which.

DETAILED DESCRIPTION OF THE PREFERRED EMBODIMENTS

An arrangement and operation of a control system for a motor vehicle in accordance with a preferred embodiment of the present invention will be described with reference to FIGS. 1 through 24.

The arrangements of a vehicle system using the control system for a motor vehicle in accordance with the embodiment of the present invention will be described with reference to FIG. 1.

Figure 1:
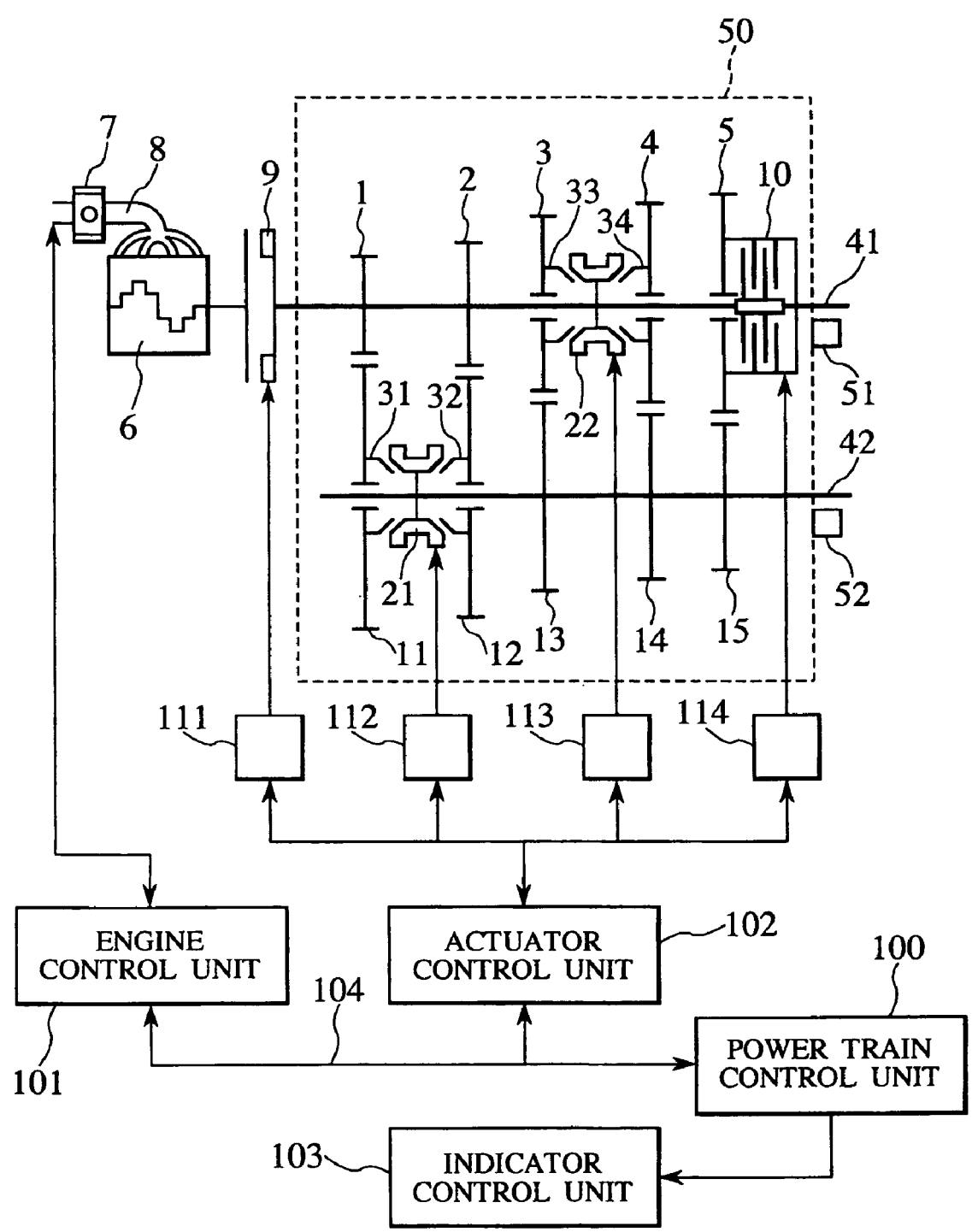
FIG. 1 is a block diagram showing a vehicle system using a motor vehicle control system in accordance with a preferred embodiment of the present invention.

FIG. 1 is a block diagram showing the vehicle system using the control system for a motor vehicle in accordance with the embodiment of the present invention.

In an engine 6, an electronic controlled throttle 7 provided at an intake pipe 8 controls an amount of intake air, and an amount of fuel corresponding to the amount of intake air is injected from a fuel injection system (not shown). The electronic controlled throttle 7 includes a throttle valve, a driving motor, and a throttle sensor. An ignition timing is determined based on a signal representing an air-fuel ratio established according to the amount of intake air and the amount of fuel and a signal representing an engine speed. A fuel spray is then ignited by an ignition system (not shown). The fuel injection system may work on a system of intake port injection of fuel, in which fuel is injected to an intake port. Alternatively, the fuel injection system may work on a system of direct injection, in which fuel is directly injected into a cylinder. It is desirable that a system that can reduce fuel consumption and offer better exhaust performance be selected based on a comparison made on a required engine operating range (a range as determined based on engine torque and the engine speed).

A clutch 9 is interposed between the engine 6 and an input shaft 41. A thrust force of the clutch 9 can be adjusted by controlling a stroke of the clutch 9 using an actuator 111. This allows a power drive from the engine to be transmitted to the input shaft 41. Transmission of the power drive from the engine 6 to the input shaft 41 can also be interrupted by releasing the clutch 9. A dry type single plate friction clutch commonly found in a vehicle mounted with an ordinary manual transmission is used for the clutch 9. Adjusting the thrust force of the clutch 9 allows torque transmitted from the engine 6 to the input shaft 41 to be adjusted. The actuator 111 of the clutch 9 includes a motor (not shown) and a mechanical structure for converting a rotary movement of the motor to a linear movement. The actuator 111 controls the stroke of the clutch 9. A wet type multiple disc friction clutch, an electromagnetic clutch, or any other type of clutch that allows the transmission torque to be adjusted, may be used for the clutch 9.

In accordance with the embodiment of the present invention, the actuator 111 for controlling the clutch 9 includes the motor and the mechanical structure. It is nonetheless possible to use a hydraulic actuator or the like using a solenoid valve or the like.

A gear 1 and a gear 2 are secured to the input shaft 41. The gear 1 and the gear 2 are in mesh with a gear 11 and a gear 12 mounted rotatably relative to an output shaft 42, respectively. A gear 3, a gear 4, and a gear 5 are mounted rotatably relative to the input shaft 41. The gear 3, the gear 4, and the gear 5 are in mesh with a gear 13, a gear 14, and a gear 15 secured to the output shaft 42, respectively. An input shaft speed sensor 51 is provided as means of detecting a speed of the input shaft 41. An output shaft speed sensor 52 is provided as means of detecting a speed of the output shaft 42.

The output shaft 42 is connected to a driving wheel through a final gear or the like not shown. Torque of the engine 6 can be transmitted to the driving wheel through the clutch 9 and a transmission 50.

A synchronous dog clutch including a sleeve and a synchromesh will be described.

The synchronous dog clutch is commonly found in a vehicle mounted with an ordinary manual transmission. The synchromesh allows the speeds of the input shaft 41 and the output shaft 42 to be synchronized with each other, enabling easy gearshift operations.

In the first place, the synchronous dog clutch including a sleeve 21, a synchromesh 31, and a synchromesh 32 will be described.

The output shaft 42 is provided with the sleeve 21 that directly connects the gear 11 and the gear 12 to the output shaft 42. There is provided a stopper (not shown) that prevents the gear 11 and the gear 12 from moving in an axial direction of the output shaft 42. Provided on the inside of the sleeve 21 are grooves (not shown) in mesh with a plurality of grooves (not shown) of the output shaft 42. These grooves permit movement of the sleeve 21 in the axial direction of the output shaft 42, but restrict movement of the sleeve 21 in a rotating direction of the output shaft 42. Torque of the sleeve 21 is thus transmitted to the output shaft 42.

To transmit torque of the gear 11 or the gear 12 to the output shaft 42, it is necessary that the sleeve 21 be moved axially along the output shaft 42, thereby directly coupling the gear 11 or the gear 12 to the sleeve 21.

The synchromesh 31 is disposed between the gear 11 and the sleeve 21. Pressing the sleeve 21 up against the synchromesh 31 will generate a frictional force between the gear 11 and the synchromesh 31. At this time, torque is transmitted from the gear 11 to the sleeve 21 through the synchromesh 31. This synchronizes the speed of the sleeve 21 with the speed of the gear 11. When synchronization of the speeds is completed, the sleeve 21 slips out of the synchromesh 31 to be directly coupled to the gear 11.

Similarly, the synchromesh 32 is disposed between the gear 12 and the sleeve 21. Pressing the sleeve 21 up against the synchromesh 32 will generate a frictional force between the gear 12 and the synchromesh 32. At this time, torque is transmitted from the gear 12 to the sleeve 21 through the synchromesh 32. This synchronizes the speed of the sleeve 21 with the speed of the gear 12. When synchronization of the speeds is completed, the sleeve 21 slips out of the synchromesh 32 to be directly coupled to the gear 12.

An actuator 112 of the sleeve 21 includes a motor (not shown) and a mechanical structure for converting a rotary movement of the motor to a linear movement. The actuator 112 controls the thrust force from the sleeve 21 to the synchromesh 31 or the synchromesh 32.

In accordance with the embodiment of the present invention, the actuator 112 for controlling the sleeve 21 includes the motor and the mechanical structure. It is nonetheless possible to use a hydraulic actuator or the like using a solenoid valve or the like.

A synchronous dog clutch including a sleeve 22, a synchromesh 33, and a synchromesh 34 will be described.

The input shaft 41 is provided with the sleeve 22 that directly connects the gear 3 and the gear 4 to the input shaft 41. There is provided a stopper (not shown) that prevents the gear 3 and the gear 4 from moving in an axial direction of the input shaft 41. Provided on the inside of the sleeve 22 are grooves (not shown) in mesh with a plurality of grooves (not shown) of the input shaft 41. These grooves permit movement of the sleeve 22 in the axial direction of the input shaft 41, but restrict movement of the sleeve 22 in a rotating direction of the input shaft 41. Torque of the input shaft 41 is thus transmitted to the sleeve 22.

To transmit torque of the input shaft 41 to the gear 3 or the gear 4, it is necessary that the sleeve 22 be moved axially along the input shaft 41, thereby directly coupling the sleeve 22 to the gear 3 or the gear 4.

The synchromesh 33 is disposed between the gear 3 and the sleeve 22. Pressing the sleeve 22 up against the synchromesh 33 will generate a frictional force between the gear 3 and the synchromesh 33. At this time, torque is transmitted from the sleeve 22 to the gear 3 through the synchromesh 33. This synchronizes the speed of the sleeve 22 with the speed of the gear 3. When synchronization of the speeds is completed, the sleeve 22 slips out of the synchromesh 33 to be directly coupled to the gear 4.

Similarly, the synchromesh 34 is disposed between the gear 4 and the sleeve 22. Pressing the sleeve 22 up against the synchromesh 34 will generate a frictional force between the gear 4 and the synchromesh 34. At this time, torque is transmitted from the sleeve 22 to the gear 4 through the synchromesh 34. This synchronizes the speed of the sleeve 22 with the speed of the gear 4. When synchronization of the speeds is completed, the sleeve 22 slips out of the synchromesh 34 to be directly coupled to the gear 4.

An actuator 113 of the sleeve 22 includes a motor (not shown) and a mechanical structure for converting a rotary movement of the motor to a linear movement. The actuator 113 controls the thrust force from the sleeve 22 to the synchromesh 33 or the synchromesh 34.

In accordance with the preferred embodiment of the present invention, the actuator 113 for controlling the sleeve 22 includes the motor and the mechanical structure. It is nonetheless possible to use a hydraulic actuator or the like using a solenoid valve or the like.

Torque applied to a friction engagement device 10 is transmitted from the input shaft 41. The torque transmitted from the input shaft 41 is transmitted to the gear 5 through the friction engagement device 10. The friction engagement device 10 is controlled by an actuator 114.

The arrangement and the theory of operation of the friction engagement device 10 used in the motor vehicle control system in accordance with the preferred embodiment of the present invention will be described with reference to FIG. 2.

Figure 2:
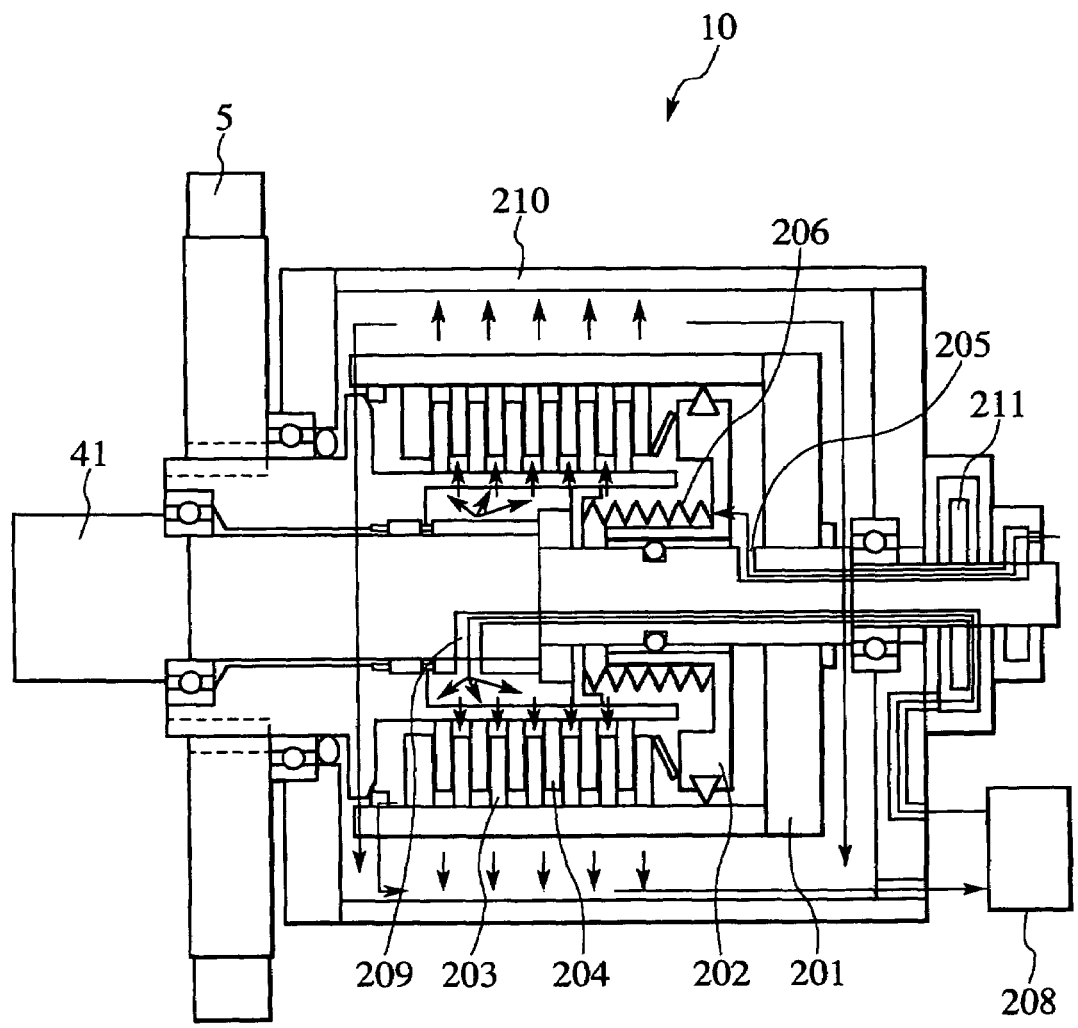
FIG. 2 is a block diagram showing a friction engagement device 10 used in the motor vehicle control system in accordance with the preferred embodiment of the present invention.

FIG. 2 is a block diagram showing the friction engagement device 10 used in the motor vehicle control system in accordance with the embodiment of the present invention.

The friction engagement device 10 is typically arranged as shown in FIG. 2. Referring to FIG. 2, a plurality of drive plates 203 secured by way of a clutch drum 201 to the input shaft 41 and driven plates 204 secured to the shaft to which the gear 5 is secured are disposed alternately. Lubricating oil is contained inside a casing 210 of the friction engagement device 10 to be present between the drive plates 203 and the driven plates 204. The oil interposed between the drive plates 203 and the driven plates 204 keeps constant a frictional state therebetween. The oil is splashed by rotation of the input shaft 41 and eventually collects in the casing 210. The oil collecting on the bottom of the casing 210 is taken out of the casing 210 through a strainer not shown. The oil is then returned to an oil pump 211 by way of an oil passageway inside the casing 210. The oil pump 211 provided on the input shaft 41 sends the lubricating oil under pressure through the oil passageway inside the input shaft 41 to a lubricating oil port 209 provided in the input shaft 41. The oil that flows from the lubricating oil port 209 is hurled against the inside of the clutch 201 by a rotating force to lubricate the drive plates 203 and the driven plates 204. This allows the friction engagement device 10 to be independently lubricated, thus achieving a stabilized torque transmission characteristic.

The friction engagement device 10 is mounted with a piston 202 that pushes the drive plates 203 and the driven plates 204. A hydraulic pressure applied through a piston hydraulic oil port 205 provided in the input shaft 41 pushes the piston 202, generating a force applied from the drive plates 203 to the driven plates 204. The actuator 114 shown in FIG. 1 controls the hydraulic pressure applied through the piston hydraulic oil port 205.

The actuator 114 of the friction engagement device 10 includes a motor, a mechanical structure, and a master cylinder. The actuator 114 converts a rotating force of the motor to a corresponding hydraulic pressure. The thrust force of the piston 202 determines the capacity of the torque transmitted between the drive plates 203 and the driven plates 204. The drive plates 203 and the driven plates 204 slip over each other to transmit the torque. Specifically, applying a thrust force to the piston 202 causes torque to be transmitted between the input shaft 41 and the gear 5. Adjusting the thrust force applied to the piston 202 at this time permits adjustment of the torque transmitted between the input shaft 41 and the gear 5.

If the thrust force applied to the piston is made zero, a return spring 206 pushes the piston 202 back. This, as a result, releases the drive plates 203 and the driven plates 204. This, in turn, makes torque transmitted between the input shaft 41 and the gear 5 zero, thus allowing the gear 5 to rotate freely relative to the input shaft 41.

Adjusting the thrust force applied to the piston 202 in the friction engagement device 10 will therefore allow the torque transmitted from the input shaft 41 to the gear 5 to be adjusted. This in turn allows the torque to be transmitted to the output shaft 42 through the gear 15 (secured onto the output shaft 42) in mesh with the gear 5.

In accordance with the embodiment of the present invention, the actuator 114 for controlling the friction engagement device 10 includes the motor, the mechanical structure, and the master cylinder. It is nonetheless possible to use a hydraulic actuator or the like using a solenoid valve or the like. In accordance with the embodiment of the present invention, the wet type multiple disc clutch shown in FIG. 2 is used as the friction engagement device 10. A mechanism transmitting torque through friction should nonetheless serve the purpose, including a dry type single plate clutch and an electromagnetic clutch.

In the embodiment, a specific gear train is designated as a unique name as detailed in the following. That is, a gear train comprising the gear 1 and the gear 11 is called a 1st speed gear. A gear train comprising the gear 2 and the gear 12 is called a 2nd speed gear. A gear train comprising the gear 3 and the gear 13 is called a 3rd speed gear. A gear train comprising the gear 4 and the gear 14 is called a 4th speed gear. A gear train comprising the gear 5 and the gear 15 is called a 5th speed gear. In addition, the clutch 9 is designated as a "starting clutch." The friction engagement device 10 is designated as an "assist clutch." The motor (not shown) of the actuator 111 is designated as a "starting clutch motor" and the motor (not shown) of the actuator 114 is designated as an "assist motor." Further, the synchronous dog clutch comprising the sleeve 21, the synchromesh 31, and the synchromesh 32 is designated as a "shift A." The synchronous dog clutch comprising the sleeve 22, the synchromesh 33, and the synchromesh 34 is designated as a "shift B." The motor of the actuator 112 is designated as a "shift A motor" and the motor of the actuator 113 is designated as a "shift B motor."

Referring to FIG. 1, the engine 6 is controlled by an engine control unit 101. Each of the actuators 111, 112, 113, and 114 is controlled by an actuator control unit 102. A power train control unit 100 controls the engine control unit 101, the actuator control unit 102, and an indicator control unit 103.

I/O signals of the control units used in the motor vehicle control system in accordance with the embodiment of the present invention will be described with reference to FIG. 3.

Figure 3:
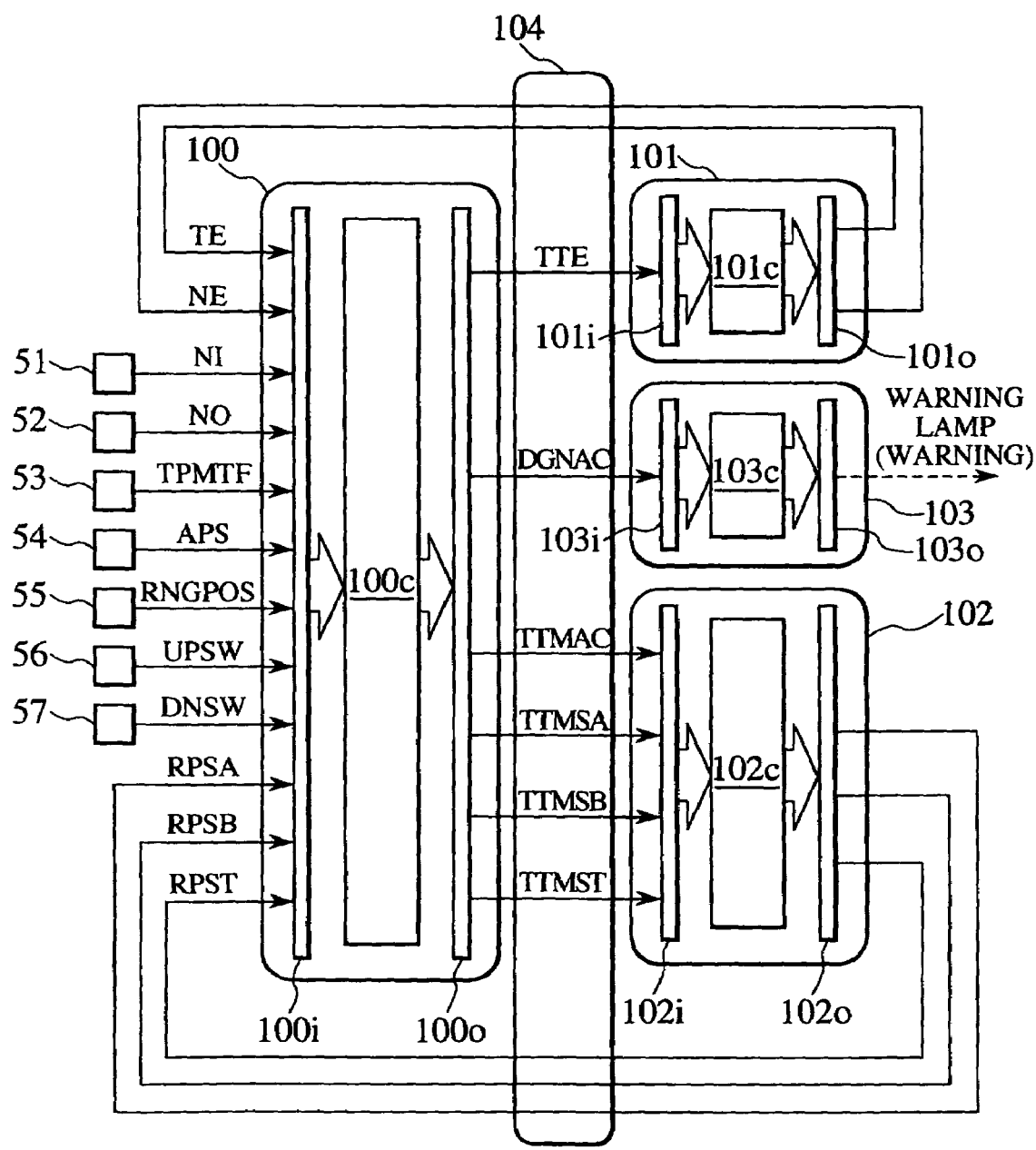
FIG. 3 is a block diagram showing input/output (I/O) signals sent and received by control units used in the motor vehicle control system in accordance with the preferred embodiment of the present invention.

FIG. 3 is a block diagram showing input/output (I/O) signals sent and received by the control units used in the motor vehicle control system in accordance with the embodiment of the present invention.

FIG. 3 shows how I/O signals are sent and received among the power train control unit 100, the engine control unit 101, the actuator control unit 102, and the indicator control unit 103. The power train control unit 100 is formed as a control unit including an input portion 100$i$, an output portion 100$o$, and a computer 100$c$. Similarly, the engine control unit 101 is formed as a control unit including an input portion 101$i$, an output portion 101$o$, and a computer 101$c$. The actuator control unit 102 is also formed as a control unit including an input portion 102$i$, an output portion 102$o$, and a computer 102$c$. Further, the indicator control unit 103 is also formed as a control unit including an input portion 103$i$, an output portion 103$o$, and a computer 103$c$.

The power train control unit 100 receives a signal representing an input shaft speed NI of the input shaft 41 detected by an input shaft speed sensor 51. In addition, the control unit 100 receives a signal representing an output shaft speed NO of the output shaft 42 detected by an output shaft speed sensor 52. The control unit 100 receives a signal representing a lubricating oil temperature TPMTF detected by a lubricating oil temperature sensor 53 detecting the temperature of the lubricating oil packed in a case of the transmission 50. The control unit 100 receives a signal representing an accelerator pedal depression amount APS of the driver detected by an accelerator pedal sensor 54 installed in an accelerator pedal. Furthermore, the control unit 100 receives a range position signal RNGPOS detected by a range position detection sensor 55 detecting the positions of a shift lever. The range positions may include a P (parking) range, an R (reverse) range, an N (neutral) range, a D (drive) range (automatic gearshift mode), and an S (sports) range (manual gearshift mode). In addition, if the shift lever is in the S range (manual gearshift mode), the control unit 100 receives signals UPSW and DNSW of an up switch 56 and a down switch 57, respectively, detecting the intention of the driver to change gears.

The power train control unit 100 transmits an engine torque command value TTE to the engine control unit 101 using communication means 104. To achieve the engine torque command value TTE, the engine control unit 101 controls the amount of intake air, the amount of fuel, the ignition timing, and the like of the engine 6. There is also provided inside the engine control unit 101 means for detecting an engine torque (not shown). The engine speed NE and the engine torque TE detected by the engine control unit 101 are transmitted to the power train control unit 100 using the communication means 104. As the means for detecting the engine torque, estimation means based on engine parameters including an injector injection pulse width, an intake pipe vacuum, the engine speed, and the like, and a torque sensor mounted in a crankshaft are used.

The power train control unit 100 transmits an assist motor target torque TTMAC, a shift A motor target torque TTMSA, a shift B motor target torque TTMSB, and a starting clutch motor target torque TTMST to the actuator control unit 102 using the communication means 104. To achieve the starting clutch motor target torque TTMST, the actuator control unit 102 controls a motor current for the actuator 111. The actuator control unit 102 then uses the clutch 9 to adjust torque transmitted from the engine 6 to the input shaft 41. To achieve the shift A motor target torque TTMSA, the actuator control unit 102 controls the motor current for the actuator 112 to engage and release the shift A. To achieve the shift B motor target torque TTMSB, the actuator control unit 102 controls the motor current for the actuator 113 to engage and release the shift B. Furthermore, to achieve the assist motor target torque TTMAC, the actuator control unit 102 controls the motor current for the actuator 114 and, using the friction engagement device 10, adjusts torque transmitted from the input shaft 41 to the output shaft 42.

In addition, the actuator control unit 102 detects a position signal indicating a stroke RPST of the clutch 9, a position signal indicating a shift A stroke RPSA, and a position signal indicating a shift B stroke RPSB. The actuator control unit 102 then transmits these signals to the power train control unit 100 using the communication means 104.

When the driver drives the vehicle with the shift range in the D range (automatic gearshift mode), the power train control unit 100 provides control according to the automatic gearshift mode. The power train control unit 100 therefore determines the gearshift timing according to a gearshift map stored therein. The gearshift map is set up based on a vehicle speed VSP calculated from the output shaft speed NO and the accelerator pedal depression amount APS. When the driver drives the vehicle with the shift range in the S range (manual gearshift mode), the power train control unit 100 provides control according to the manual gearshift mode. When the up switch is pressed, the power train control unit 100 judges that the driver intends to perform an upshift operation (e.g., from the 1st speed to the 2nd speed). When the down switch is pressed, the power train control unit 100 judges that the driver intends to perform a downshift operation (e.g., from the 4th speed to the 3rd speed). To effect a gearshift in accordance with these decisions made, the power train control unit 100 sets the engine torque command value TTE, the starting clutch motor target torque TTMST, the shift A motor target torque TTMSA, the shift B motor target torque TTMSB, and the assist motor target torque TTMAC.

In addition, the power train control unit 100 uses the communication means 104 to transmit a flag DGNAC determining a fault of the friction engagement device 10 to the indicator control unit 103. The fault determination flag DGNAC is calculated according to parameters representing the state of the friction engagement device 10, including the lubricating oil temperature TPMTF of the transmission 50, and a quantity of heat generated and an accumulated quantity of heat of the friction engagement device 10.

The indicator control unit 103 turns ON a warning lamp provided in a vehicle compartment according to the value of the fault determination flag DGNAC. The indicator control unit 103 thereby warns the driver of a faulty condition of the friction engagement device 10. Instead of the warning lamp, an alarm may be sounded to warn the driver of a faulty condition of the friction engagement device 10. It is also possible, instead of using the indicator control unit 103, to use the power train control unit 100, the engine control unit 101, or other control unit to give the driver warning.

The arrangement of the power train control unit 100 as the motor vehicle control system according to the preferred embodiment of the present invention will be described with reference to FIG. 4.

Figure 4:
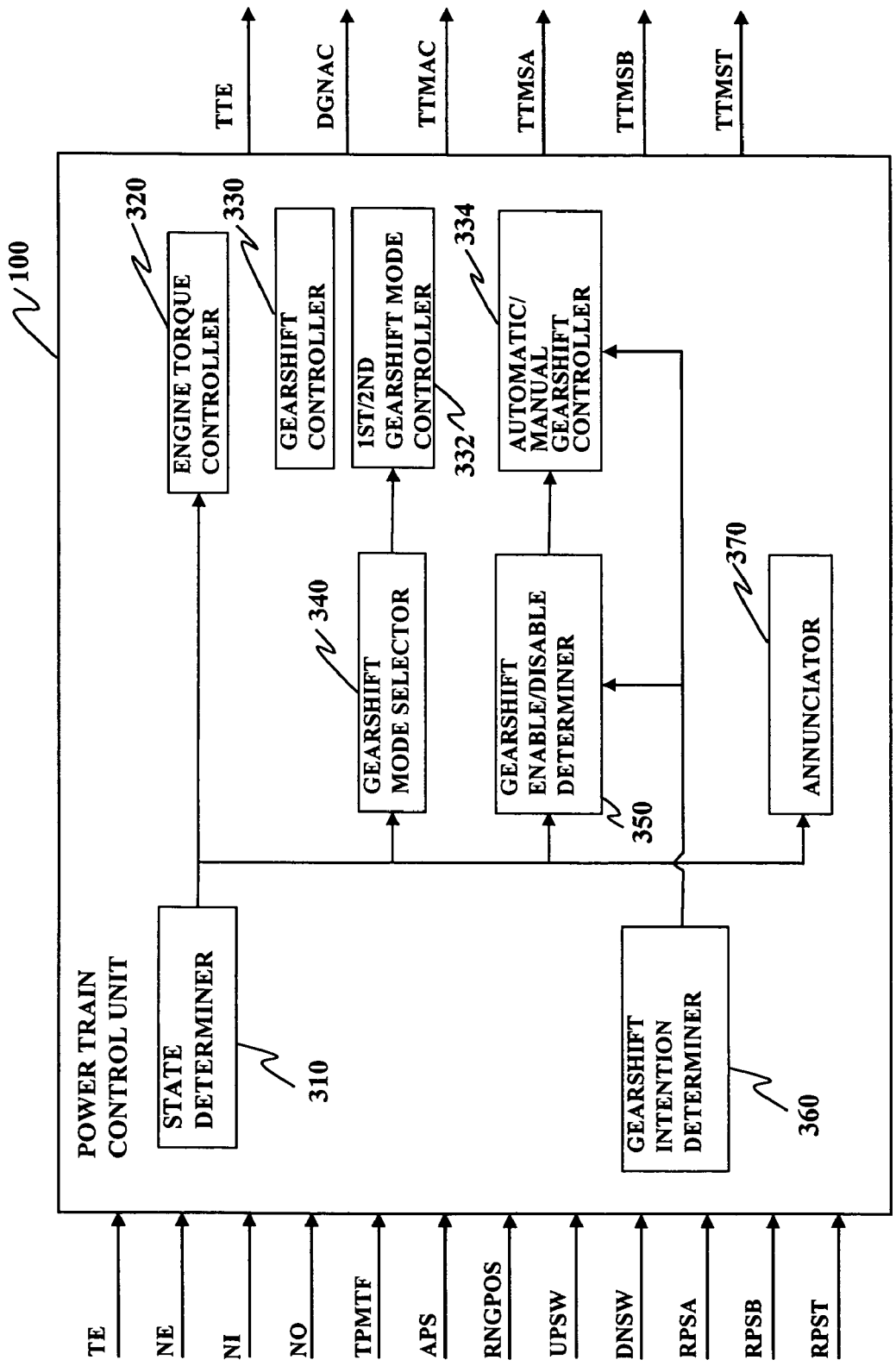
FIG. 4 is a control block diagram showing the arrangement of a power train control unit 100 as the motor vehicle control system according to the preferred embodiment of the present invention.

FIG. 4 is a control block diagram showing the arrangement of the power train control unit 100 as the motor vehicle control system according to the embodiment of the present invention.

As described with reference to FIG. 3, the power train control unit 100 receives the signals representing the engine torque TE, the engine speed NE, the input shaft speed NI, the output shaft speed NO, and the like. The control unit 100 also receives the lubricating oil temperature TPMTF of the transmission 50. The control unit 100, in addition to these signals, the accelerator pedal depression amount signal APS, the range position signal RNGPOS, the up switch signal UPSW, the down switch signal DNSW, and the like. This is done to let the power train control unit 100 determine the conditions of range operation and accelerator operation by the driver. Further, to detect the condition of the transmission 50, the control unit 100 receives the position signal RPST, the position signal RPSA, and the position signal RPSB.

The power train control unit 100 includes state determiner 310, engine torque controller 320, gearshift controller 330, gearshift mode selector 340, gearshift enable/disable determiner 350, gearshift intention determiner 360, and annunciator 370. The gearshift controller 330 includes first/second gearshift mode controller 332 and automatic/manual gearshift controller 334.

The state determiner 310 detects or estimates a parameter representing a thermal state of the friction engagement device 10 based on a vehicle condition and a gearshift pattern. The state determiner 310 is achieved by step 1001 of FIG. 11 to be described later. The engine torque controller 320 controls torque of the engine according to the parameter representing the thermal state of the friction engagement device 10 as detected or estimated by the state determiner 310. If the parameter representing the thermal state of the friction engagement device 10 is greater than a predetermined value, in particular, the engine torque controller 320 reduces the engine torque. The engine torque controller 320 is achieved by step 1706 of FIG. 18 to be described later.

The first/second gearshift mode controller 332 controls the transmission 50 in a first gearshift mode and a second gearshift mode. In the first gearshift mode, the control proceeds as described below. Specifically, when engagement between the gear and the dog clutch is switched from a first engagement to a second engagement, the friction engagement device 10 is used to transmit the engine torque from the input shaft to the output shaft with the friction clutch engaged. A transmission path formed by the first engagement is switched to an intermediate transmission path formed by the friction engagement device 10 before being eventually switched to a transmission path formed by the second engagement. In the second gearshift mode, the control proceeds as described below. Specifically, when the engagement between the gear and the dog clutch is switched from the first engagement to the second engagement, the transmission path formed by the first engagement is switched to the transmission path formed by the second engagement with the friction clutch released. The first/second gearshift mode control means 332 is achieved by step 1705 of FIG. 18 to be described later. The gearshift mode selector 340 selects either the first gearshift mode or the second gearshift mode according to the parameter representing the thermal state as detected or estimated by the state determiner 310. The gearshift mode selector 340 is achieved by step 1206 of FIG. 13 to be described later.

The gearshift intention determiner 360 detects the intention of the driver to change gears according to the range operation performed by the driver. The gearshift determiner 360 is achieved by step 1102 of FIG. 12 to be described later. The automatic/manual gearshift controller 334 controls the transmission 50 in either of the following two modes. One of the modes is, specifically, the manual gearshift mode, in which an output of a gearshift command is produced according to the driver's intention to change gears as detected by the gearshift intention determiner 360. The other mode is the automatic gearshift mode, in which an output of a gearshift command is produced according to a gearshift map previously stored in the control unit. The automatic/manual gearshift controller 334 is achieved by step 1103 of FIG. 12 to be described later. The gearshift enable/disable determiner 350 determines whether a gearshift is to be enabled or disabled according to the parameter representing the thermal state as detected or estimated by the state determiner 310. If it is determined that the gearshift is to be disabled, a gearshift in the manual gearshift mode accomplished by the automatic/manual gearshift controller 334 is prohibited. The gearshift enable/disable determiner 350 is achieved by steps 1002 and 1003 of FIG. 11 to be described later.

The annunciator 370 informs the driver of the state of the friction engagement device 10 according to the parameter representing the thermal state as detected or estimated by the state determiner 310. The annunciator 370 is achieved by step 1005 of FIG. 11 to be described later.

Gearshift control provided in the motor vehicle control system according to the embodiment of the present invention will be detailed with reference to FIGS. 5 through 18.

An overview of the gearshift control provided in the motor vehicle control system according to the embodiment of the present invention will first be described with reference to FIG. 5.

Figure 5:
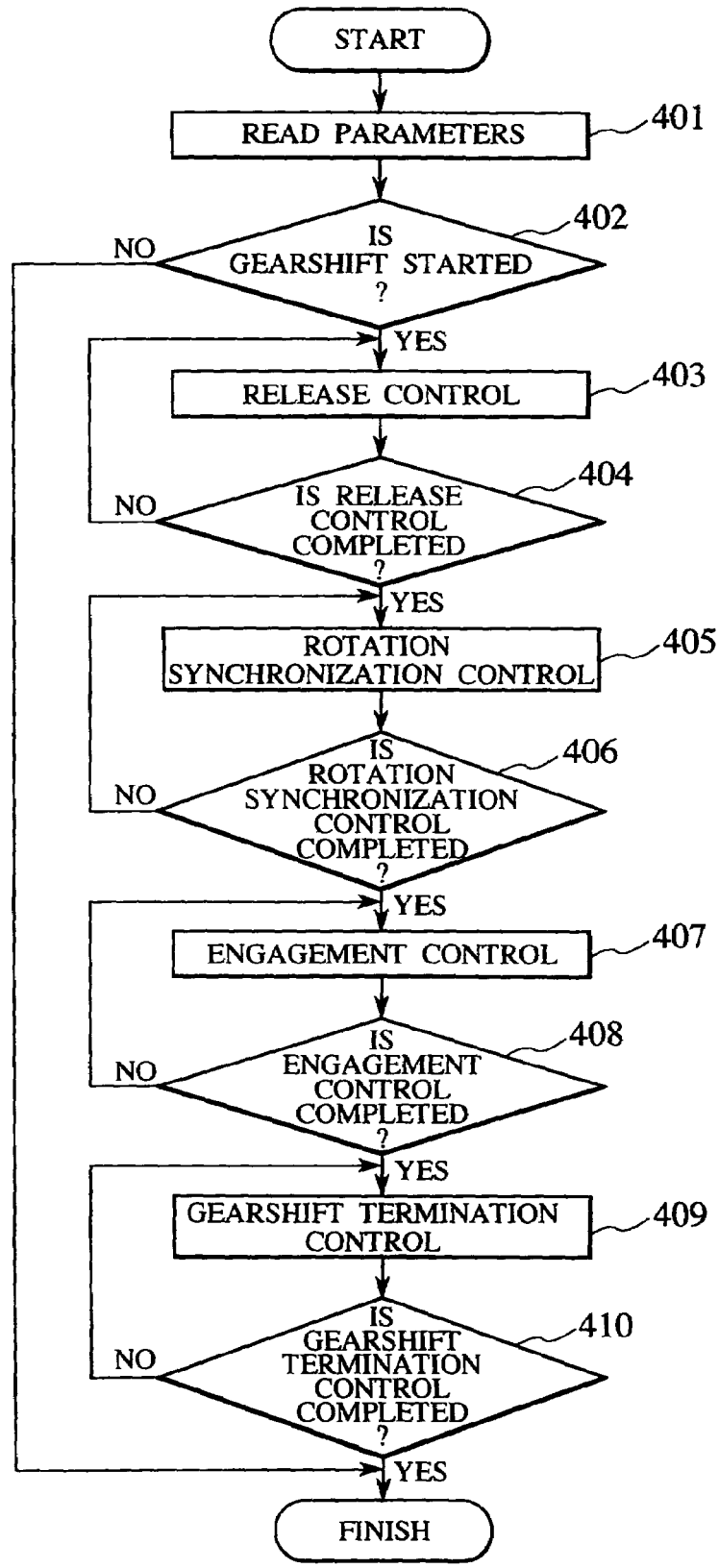
FIG. 5 is a flowchart showing an overview of gearshift control provided in the motor vehicle control system according to the preferred embodiment of the present invention.

FIG. 5 is a flowchart showing an overview of the gearshift control provided in the motor vehicle control system according to the embodiment of the present invention.

Specific operations of the gearshift control described hereunder have previously been programmed in the computer 100c of the power train control unit 100, and executed repeatedly at a predetermined cycle. That is, operations of steps 401 through 410 given in the following are executed by the power train control unit 100.

In step 401, the power train control unit 100 reads parameters used in the subsequent steps of 402 through 410.

In step 402 that follows, if the shift range is the D range (automatic gearshift mode), a gearshift position is set according to the gearshift map stored in the power train control unit 100. If the shift range is the S range (manual gearshift mode), the gearshift position is set according to the driver's intention to change gears as detected by the up switch or the down switch.

When the gearshift operations are started, release control is first executed to disengage gears in step 403 (release control phase). In step 404, it is determined whether or not the release control is completed. If it is determined that the release control is completed, the control operation proceeds to step 405. If it is determined that the release control is yet to be completed, step 403 is re-executed. A decision made in step 404 is to determine, if the gearshift is from the 1st speed to the 2nd speed, whether or not the sleeve 21 is released from the gear 11. The decision is therefore made based on whether the shift A position signal RPSA as the stroke signal for the sleeve 21 indicates that the sleeve 21 is located at the release position.

In step 405 (rotation synchronization control phase) that follows, control is provided so as to make the input shaft speed NI synchronized with a speed level (target speed) corresponding to the next gearshift position. To that end, specific controls are provided for the thrust load on the friction control device 10 that executes torque transmission during the gearshift and for the torque of the engine 6. In step 406, it is determined whether or not the rotation synchronization control is completed. The rotation synchronization control is considered to be completed if a deviation of the input shaft speed NI from the speed corresponding to the next gearshift position (target speed) becomes small (|input shaft speed NI—output shaft speed NO×target gearshift position gear ratio Gnl≦ a predetermined value). If it is determined that the rotation synchronization control is completed, the control operation proceeds to step 407 (engagement control phase) to engage gears and engagement control is executed. If it is determined that the rotation synchronization control is yet to be completed, the control operation returns to step 405 to continue the rotation synchronization control.

In step 408 that follows, it is determined whether or not the engagement control is completed. The engagement control is considered to be complete if the sleeve 21 is engaged with the gear 12 for the gearshift from the 1st speed to the 2nd speed. To make this decision, it is determined whether or not the shift A position signal RPSA as the stroke signal for the sleeve 21 indicates that the sleeve 21 is located at the engagement position. If it is determined that the engagement control is completed, the control operation proceeds to step 409 (gearshift completion phase). If it is determined that the engagement control is yet to be completed, the control operation returns to step 407 to continue the engagement control.

In step 410, it is determined whether or not the gearshift is completed. The gearshift termination control is considered to be completed if the assist motor target torque TTMAC corresponding to the thrust load of the friction engagement device 10 is zero for the gearshift from the 1st speed to the 2nd speed. There is another condition that must be met to determine that the gearshift termination control is considered to be complete. If the torque of the engine 6 is controlled during the gearshift, the torque of the engine 6 is recovered, through the gearshift termination control, to a level corresponding to an accelerator opening. The condition is therefore added, with which it can be determined whether or not the torque of the engine 6 recovers to a level corresponding to the accelerator opening based on the speed of the engine 6, a throttle opening, and the like.

Specific control operations performed during the gearshift in the motor vehicle control system according to the embodiment will be described with reference to FIGS. 6 through 18.

Overall control operations performed during the gearshift in the motor vehicle control system according to the embodiment will first be described with reference to FIG. 6. A flowchart shown in FIG. 6 represents operations for calculating parameters in step 403 (release control operation), step 405 (rotation synchronization control operation), and step 407 (engagement control operation) of FIG. 5.

Figure 6:
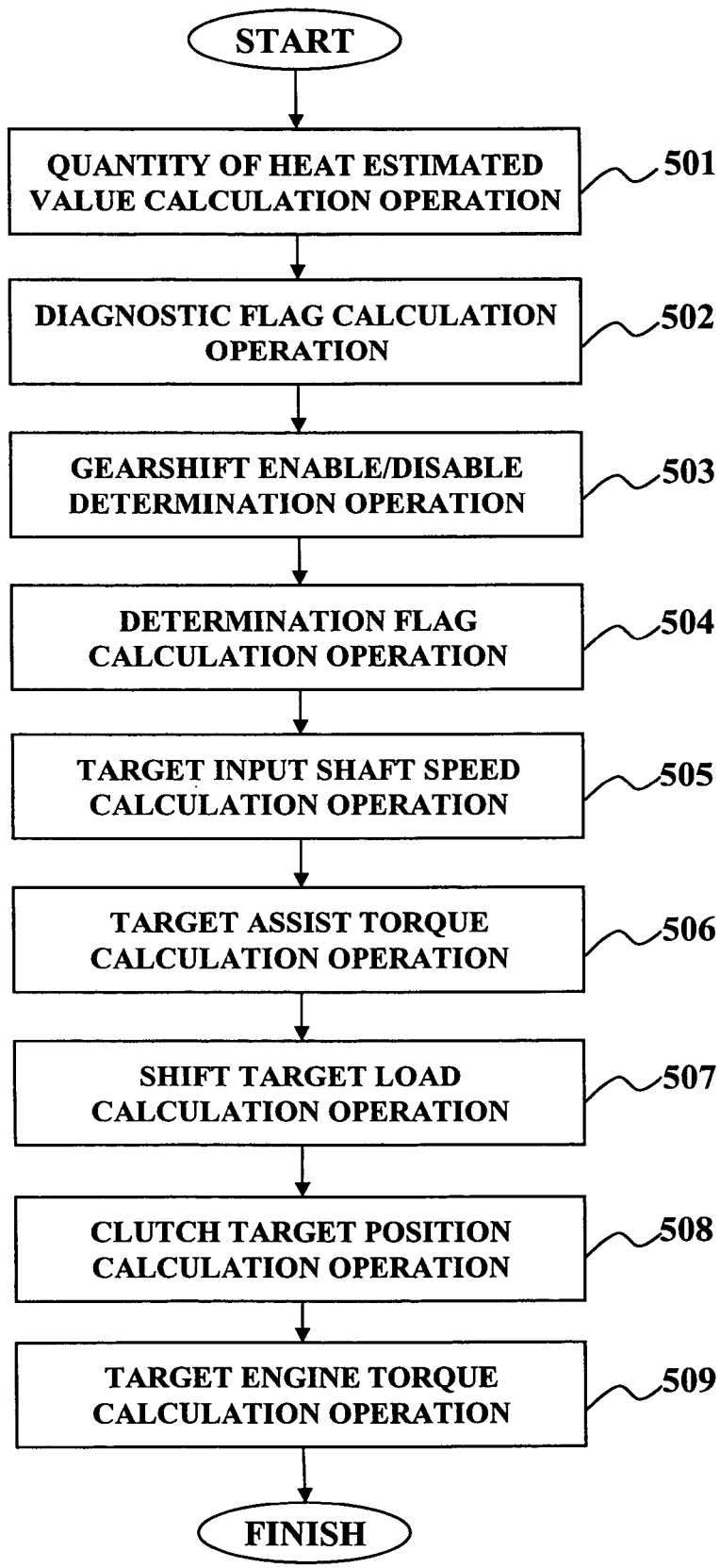
FIG. 6 is a flowchart showing overall control operations performed during a gearshift in the motor vehicle control system according to the preferred embodiment of the present invention.

FIG. 6 is a flowchart showing overall control operations performed during the gearshift in the motor vehicle control system according to the embodiment.

The gearshift control flow shown in FIG. 6 includes step 501 (quantity of heat estimated value calculation operation), step 502 (diagnostic flag calculation operation), step 503 (gearshift enable/disable determination operation), step 504 (determination flag calculation operation), step 505 (target input shaft speed calculation operation), step 506 (target assist torque calculation operation), step 507 (shift target load calculation operation), step 508 (clutch target position calculation operation), and step 509 (target engine torque calculation operation). The control operations of steps 501 through 509 are executed by the power train control unit 100.

Details of step 501 (quantity of heat estimated value calculation operation) will be described later with reference to FIGS. 7 through 10. Details of step 502 (diagnostic flag calculation operation) will be described later with reference to FIG. 11. Details of step 503 (gearshift enable/disable determination operation) will be described later with reference to FIG. 12. Details of step 504 (determination flag calculation operation) will be described later with reference to FIG. 13. Details of step 505 (target input shaft speed calculation operation) will be described later with reference to FIG. 14. Details of step 506 (target assist torque calculation operation) will be described later with reference to FIG. 15. Details of step 507 (shift target load calculation operation) will be described later with reference to FIG. 16. Details of step 508 (clutch target position calculation operation) will be described later with reference to FIG. 17.

Details of step 509 (target engine torque calculation operation) will be described later with reference to FIG. 18.

Details of step 501 (quantity of heat estimated value calculation operation) of FIG. 6 will be described with reference to FIGS. 7 through 10.

Figure 7:
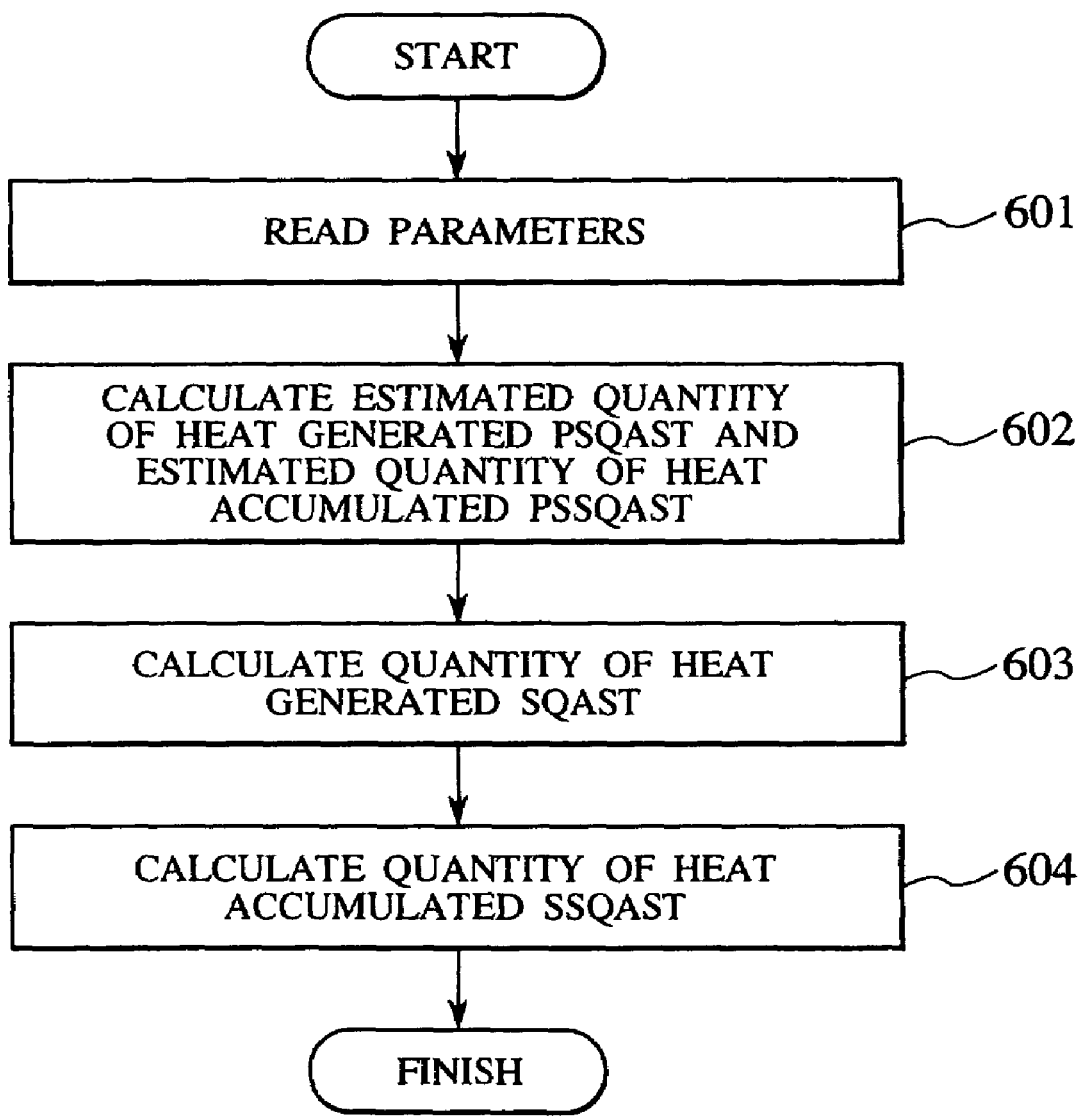
FIG. 7 is a flowchart showing specific operations performed for calculating a quantity of heat estimated value in the motor vehicle control system according to the preferred embodiment of the present invention.

FIG. 7 is a flowchart showing specific operations performed for calculating a quantity of heat estimated value in the motor vehicle control system according to the embodiment of the present invention.

In step 601, the power train control unit 100 reads parameters used in subsequent steps 602 through 604.

In step 602 that follows, an estimated quantity of heat generated PSQAST representing the quantity of heat that is expected to be generated by the friction engagement device 10 in the next gearshift is calculated. An estimated quantity of heat accumulated PSSQAST is then calculated based on the estimated quantity of heat generated PSQAST. Details of procedures for calculating the estimated quantity of heat generated PSQAST and the estimated quantity of heat accumulated PSSQAST will be described later with reference to FIG. 8.

In step 603, a quantity of heat generated by the friction engagement device 10 through the gearshift SQAST is calculated. Details of procedures for calculating the quantity of heat generated SQAST will be described later with reference to FIG. 9.

In step 604, a quantity of heat accumulated in the friction engagement device 10 through the gearshift SSQAST is calculated. Details of procedures for calculating the quantity of heat accumulated SSQAST will be described later with reference to FIG. 10.

The procedures for calculating the estimated quantity of heat generated PSQAST and the estimated quantity of heat accumulated PSSQAST will be described with reference to FIG. 8.

Figure 8:
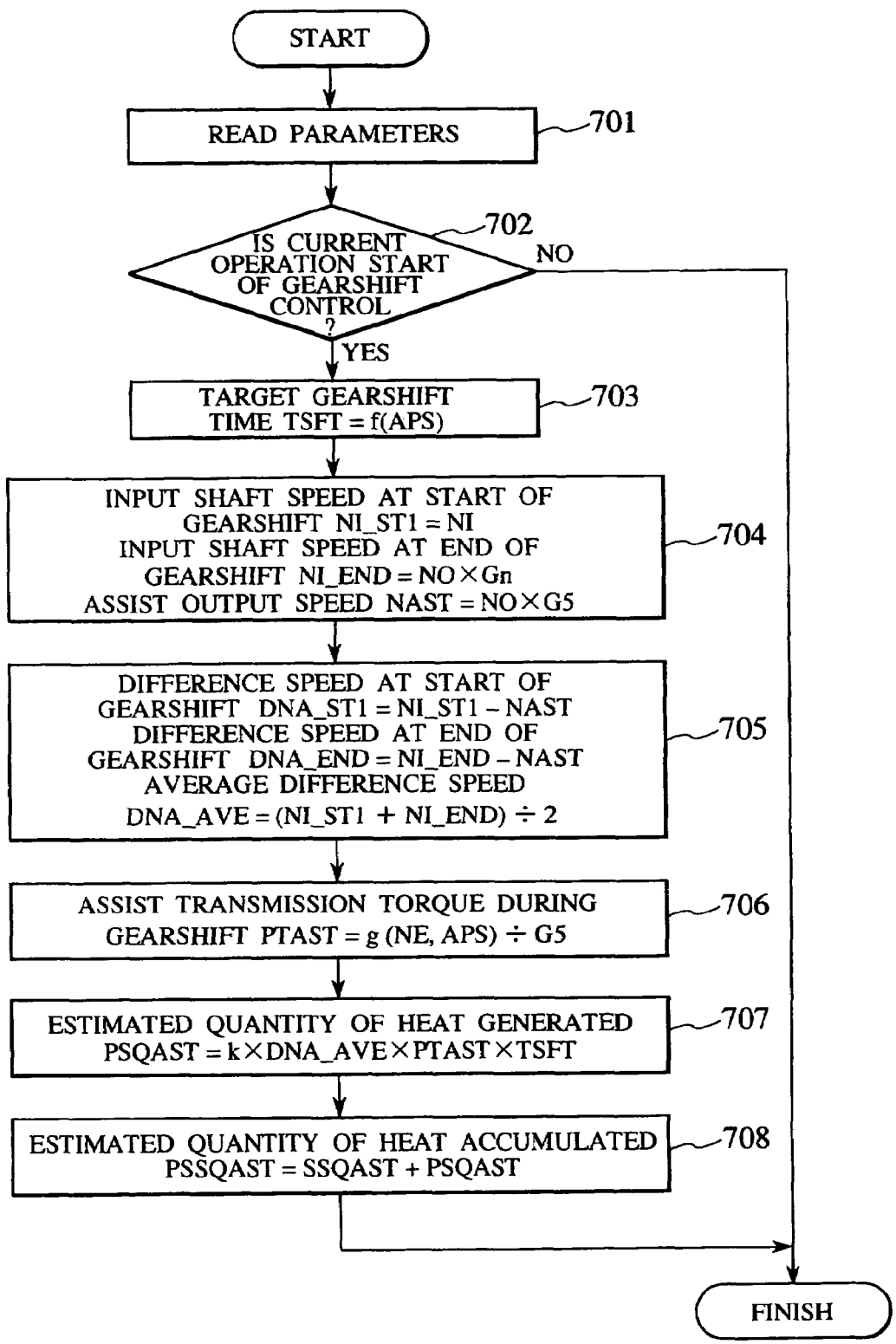
FIG. 8 is a flowchart showing detailed procedures for calculating an estimated quantity of heat generated PSQAST and an estimated quantity of heat accumulated PSSQAST in the motor vehicle control system according to the preferred embodiment of the present invention.

FIG. 8 is a flowchart showing detailed procedures for calculating the estimated quantity of heat generated PSQAST and the estimated quantity of heat accumulated PSSQAST in the motor vehicle control system according to the embodiment of the present invention.

In step 701, the power train control unit 100 reads parameters used in subsequent steps 702 through 708.

In step 702, it is determined whether or not the current operation is a start of gearshift control. If it is determined that the current operation is the start of gearshift control, the control operation proceeds to step 703. If it is determined that the current operation is not the start of gearshift control, the control operation is terminated.

In step 703, a target gearshift time TSFT is calculated using a function f according to the parameters of the accelerator pedal depression amount APS and the like.

In step 704, an input shaft speed at the start of gearshift NI_ST1, an input shaft speed at the end of gearshift NI_END, and an assist output speed NAST are calculated in accordance with the following equations (1) to (3).

$$NI\_ST1 = NI \tag{1}$$

$$NI\_END = NO \times Gn \tag{2}$$

$$NAST = NO \times G5 \tag{3}$$

Where, the assist output speed NAST is the speed of the gear 5 and G5 is a reduction gear ratio of the 5th speed gear provided in the friction engagement device 10.

In step 705, a difference speed DNA_ST1 at the start of gearshift and a difference speed DNA_END at the end of gearshift of the friction engagement device 10 are calculated using equations (4) and (5). Equation (6) is then used to calculate an average difference speed DNA_AVE during the gearshift. The difference speed of the friction engagement device 10 is calculated from a difference between the input shaft speed NI and the speed of the gear 5.

$$DNA\_ST1 = NI\_ST1 - NAST \tag{4}$$

$$DNA\_END = NI\_END - NAST \tag{5}$$

$$DNA\_AVE = (DNA\_ST1 + DNA\_END) \div 2 \tag{6}$$

In step 706, an assist transmission torque during gearshift PTAST is next calculated using equation (7). The assist transmission torque during gearshift PTAST is a torque transmitted by the friction engagement device 10 during the gearshift.

$$PTAST = g(NE, APS) \div G5 \tag{7}$$

Where, a function g is used for calculating the target torque around the output shaft 42 according to the parameters of the engine speed NE, the accelerator pedal depression amount APS, and the like.

In step 707, the estimated quantity of heat generated PSQAST representing the quantity of heat that is expected to be generated by the friction engagement device 10 through the gearshift is calculated using equation (8).

$$PSQAST = k \times DNA\_AVE \times PTAST \times TSFT \tag{8}$$

Where, k is a constant for converting the speed [r/min] to a rotating velocity [rad/s].

In step 708, the estimated quantity of heat accumulated PSSQAST representing the quantity of heat that is expected to be accumulated in the friction engagement device 10 through the gearshift is next calculated using equation (9). This completes the calculation procedures.

$$PSSQAST = SSQAST + PSQAST \tag{9}$$

The procedures for calculating the quantity of heat generated SQAST will be described with reference to FIG. 9.

Figure 9:
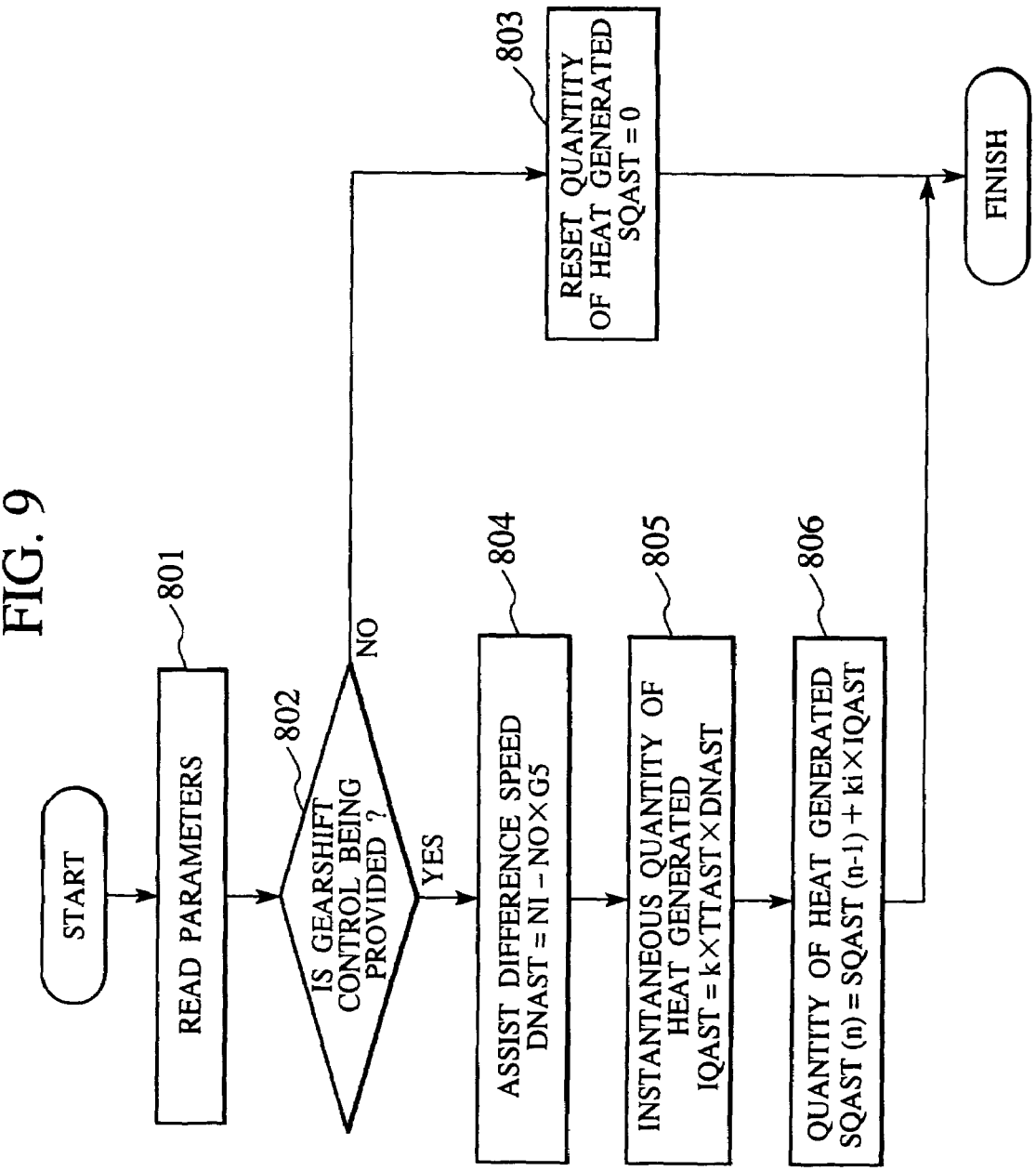
FIG. 9 is a flowchart showing detailed procedures for calculating a quantity of heat generated SQAST in the motor vehicle control system according to the preferred embodiment of the present invention.

FIG. 9 is a flowchart showing detailed procedures for calculating the quantity of heat generated SQAST in the motor vehicle control system according to the embodiment of the present invention.

In step 801, the power train control unit 100 reads parameters used in subsequent steps 802 through 806.

In step 802, it is determined whether or not the gearshift control is being provided. If it is determined that the gearshift control is not being provided, the control operation proceeds to step 803 where the quantity of heat generated SQAST is initialized (SQAST=0) before the procedure is terminated.

If it is determined that the gearshift control is being provided, the control operation proceeds to step 804. In step 804, an assist difference speed DNAST is calculated using equation (10).

$$DNAST = NI - NO \times G5 \tag{10}$$

Where, the assist difference speed DNAST is the difference speed of the friction engagement device 10.

In step 805, an instantaneous quantity of heat generated IQAST is calculated using equation (11).

$$IQAST = k \times TTAST \times DNAST \tag{11}$$

Where, TTAST is a target value of torque transmitted by the friction engagement device 10, being referred to as a target assist torque.

In step 806, the quantity of heat generated SQAST is calculated using equation (12). This completes the calculation procedures.

$$SQAST=SQAST(n-1)+ki \times IQAST \qquad (12)$$

Where, SQAST(n−1) is the quantity of heat generated SQAST calculated during the last cycle and ki is an integral coefficient as determined by a calculation cycle and the like of the computer 100c of the power train control unit 100.

The procedures for calculating the quantity of heat accumulated SSQAST will be described with reference to FIG. 10.

Figure 10:
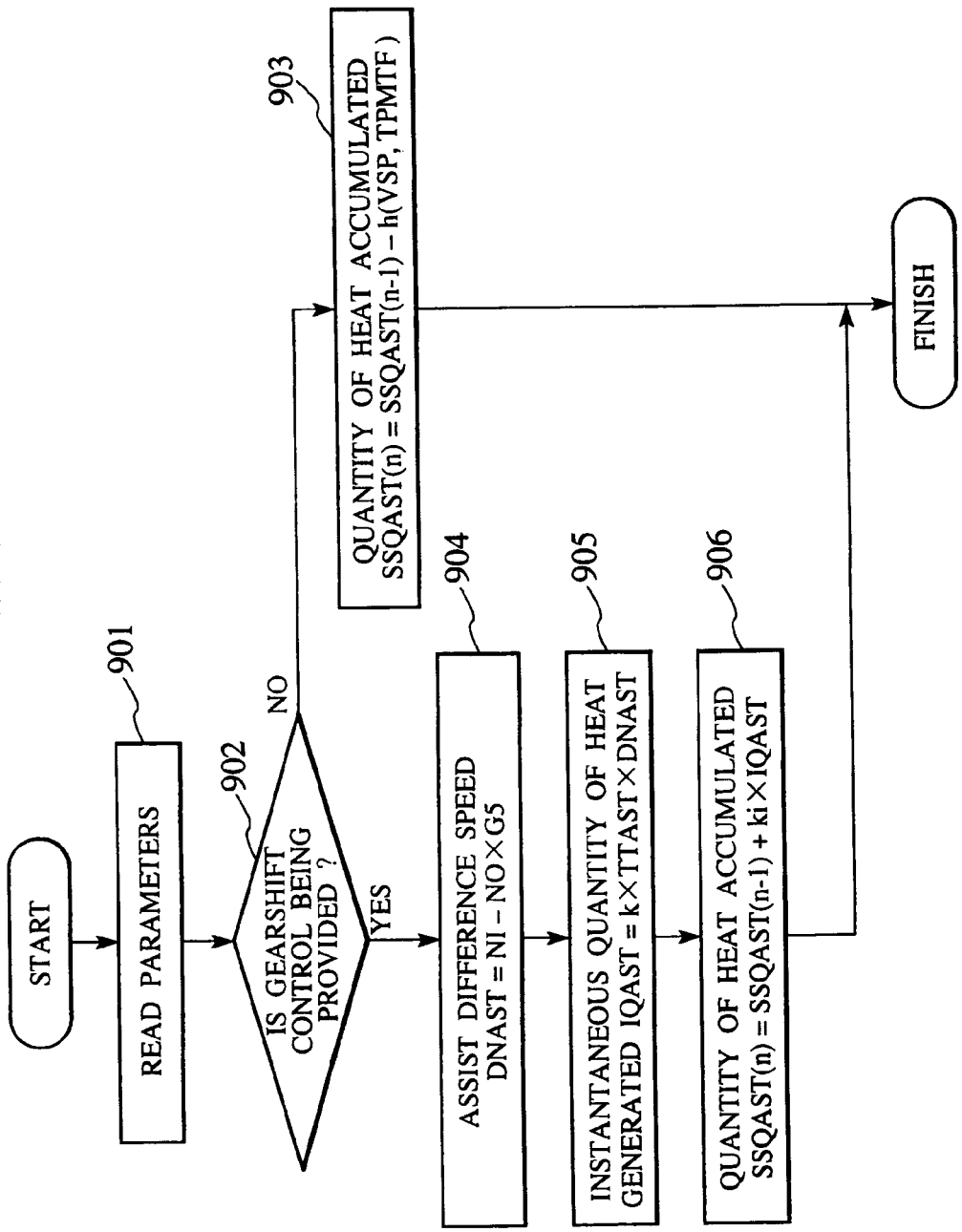
FIG. 10 is a flowchart showing detailed procedures for calculating a quantity of heat accumulated SSQAST in the motor vehicle control system according to the preferred embodiment of the present invention.

FIG. 10 is a flowchart showing detailed procedures for calculating the quantity of heat accumulated SSQAST in the motor vehicle control system according to the preferred embodiment of the present invention.

In step 901, the power train control unit 100 reads parameters used in subsequent steps 902 through 906.

In step 902, it is determined whether or not the gearshift control is being provided. If it is determined that the gearshift control is not being provided, the control operation proceeds to step 903 where the quantity of heat accumulated SSQAST is calculated using equation (13) before the procedure is terminated.

$$SSQAST=SSQAST(n-1)-h(VSP, TPMTF) \qquad (13)$$

Where, SSQAST(n−1) is the quantity of heat accumulated SSQAST calculated during the last cycle. A function h is used for calculating cooling energy of the friction engagement device 10 according to the parameters of the vehicle speed VSP, the transmission lubricating oil temperature TPMTF, and the like.

If it is determined that the gearshift control is being provided, the control operation proceeds to step 904. In step 904, the assist difference speed DNAST is calculated using equation (10) cited earlier.

In step 905, the instantaneous quantity of heat generated IQAST is calculated using equation (11) cited earlier.

In step 906, the quantity of heat accumulated SSQAST is calculated using equation (14). This completes the calculation procedures.

$$SSQAST=SSQAST(n-1)+ki \times IQAST \qquad (14)$$

As explained in the foregoing, the calculation methods shown in FIGS. 7 and 8 allow the estimated quantity of heat generated PSQAST, which represents the quantity of heat expected to be generated by the friction engagement device 10 through the gearshift, and the estimated quantity of heat accumulated PSSQAST, which represents the quantity of heat expected to be accumulated in the friction engagement device 10 through the gearshift, to be estimated. Further, the calculation methods shown in FIGS. 9 and 10 allow the quantity of heat generated SQAST, which represents the quantity of heat generated in the friction engagement device 10 through the gearshift, and the quantity of heat accumulated SSQAST, which represents the quantity of heat accumulated in the friction engagement device 10 through the gearshift, to be estimated.

Details of step 502 (diagnostic flag calculation operation) shown in FIG. 6 will be described with reference to FIG. 11.

Figure 11:
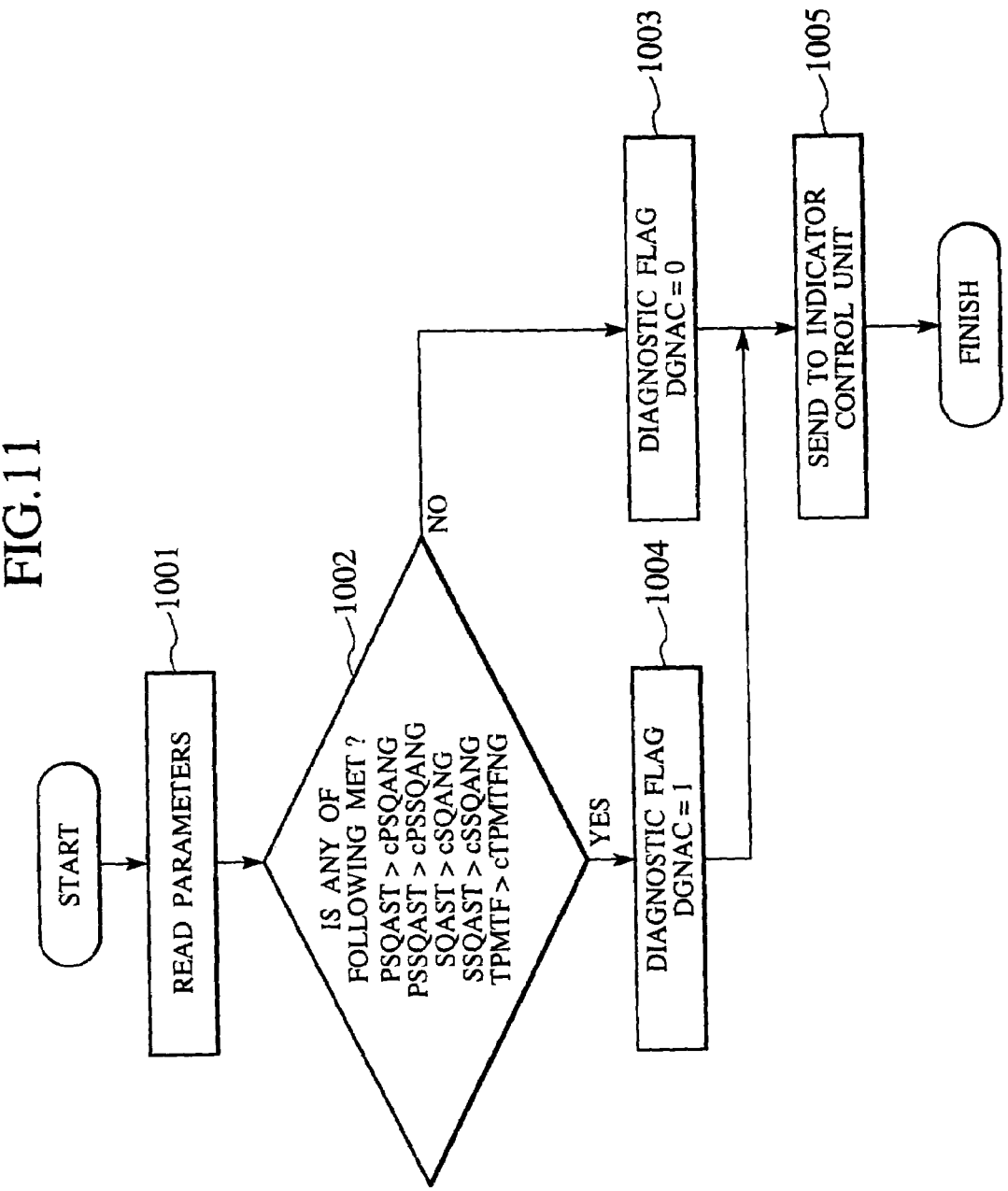
FIG. 11 is a flowchart showing detailed procedures for calculating a diagnostic flag in the motor vehicle control system according to the preferred embodiment of the present invention.

FIG. 11 is a flowchart showing detailed procedures for calculating the diagnostic flag in the motor vehicle control system according to the preferred embodiment of the present invention.

In step 1001, the power train control unit 100 reads parameters used in the subsequent step 1002.

In step 1002, it is determined whether or not any of the conditions specified by equations (15) through (19) is met.

$$PSQAST > CPSQANG \qquad (15)$$

$$PSSQAST > cPSSQANG \qquad (16)$$

$$SQAST > cSQANG \qquad (17)$$

$$SSQAST > cSSQANG \qquad (18)$$

$$TPMTF > cTPMTFNG \qquad (19)$$

Where, cPSQANG is an estimated quantity of heat generated NG threshold value, cPSSQANG is an estimated quantity of heat accumulated NG threshold value, cSQANG is a quantity of heat generated NG threshold value, cSSQANG is a quantity of heat accumulated NG threshold value, and cTPMTFNG is a lubricating oil temperature NG threshold value. If none of the conditions specified by equations (15) through (19) is met, it is determined that there is only a marginal increase in temperature of the friction engagement device 10. The control operation then proceeds to step 1003, in which the diagnostic flag DGNAC is reset. The control operation then proceeds to step 1005.

If any of the conditions specified by equations (15) through (19) is met, it is determined that there is a substantial increase in temperature of the friction engagement device 10. The control operation then proceeds to step 1004, in which the diagnostic flag DGNAC is set. The control operation then proceeds to step 1005.

In step 1005, the diagnostic flag DGNAC is sent to the indicator control unit 103 and the procedures are terminated. The indicator control unit 103 turns ON the warning lamp as necessary according to the diagnostic flag DGNAC received to warn the driver of the condition of the friction engagement device 10. Instead of turning ON the warning lamp, the indicator control unit 103 may sound the alarm to warn the driver of the condition of the friction engagement device 10.

Details of step 503 (gearshift enable/disable discrimination operation) shown in FIG. 6 will be described with reference to FIG. 12.

Figure 12:
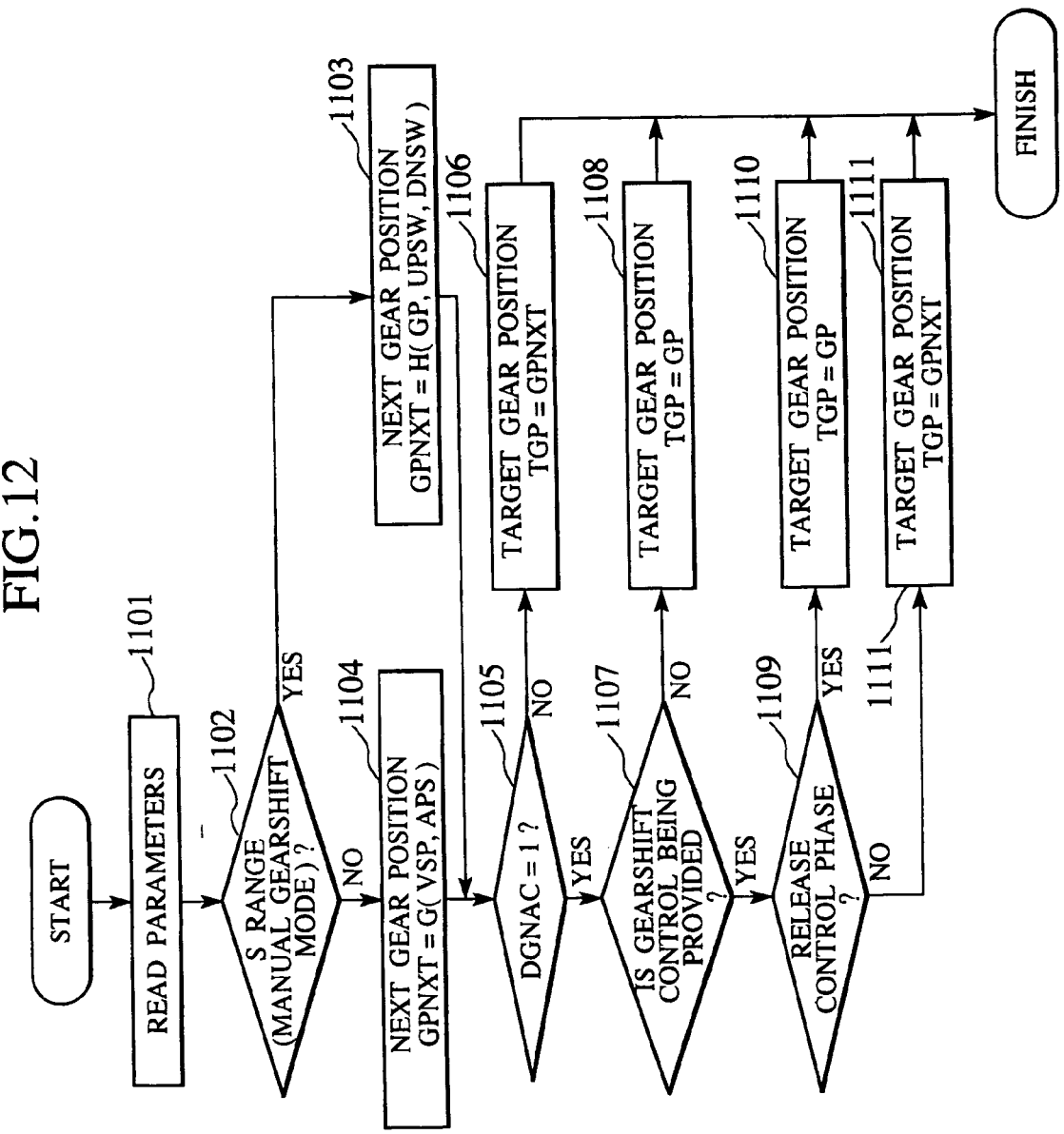
FIG. 12 is a flowchart showing detailed procedures for determining whether a gearshift is to be enabled or disabled, as performed in the motor vehicle control system according to the preferred embodiment of the present invention.

FIG. 12 is a flowchart showing detailed procedures for determining whether a gearshift is to be enabled or disabled, as performed in the motor vehicle control system according to the preferred embodiment of the present invention.

In step 1101, the power train control unit 100 reads parameters used in subsequent steps 1102 through 1109.

In step 1102, it is determined whether the current operation is in the S range (manual gearshift mode) according to the range position signal RNGPOS. If it is determined that the operation is not in the S range (manual gearshift mode), it is then determined that the operation is in the D range (automatic gearshift mode). The control operation then proceeds to step 1104. In step 1104, a next gear position GPNXT is calculated using a function G based on the vehicle speed VSP and the accelerator pedal depression amount APS. The control operation then proceeds to step 1105. If it is determined that the current operation is in the S range (manual gearshift mode), the control operation proceeds to step 1103. In step 1103, the next gear position GPNXT is calculated using a function H based on a current gear position GP, and the signals provided by the up switch UPSW and the down switch DNSW that detect the driver's intention to change gears. The control operation then proceeds to step 1105. Where, the current gear position GP is a parameter representing the current gearshift position determined by the shift A position RPSA, shift B position RPSB, and the like.

In step 1105, it is determined whether or not the diagnostic flag DGNAC calculated in step 502 (diagnostic flag calculation operation) of FIG. 6 is set. If the diagnostic flag DGNAC is not set, the control operation proceeds to step 1106. In step 1106, the next gear position GPNXT calculated in step 1103 or step 1104 is substituted for a target gear position TGP to complete the control operation. If the diagnostic flag DGNAC is set, the control operation proceeds to step 1107, in which it is determined whether or not a gearshift control is being provided.

If it is determined that the gearshift control is not being provided, the control operation proceeds to step 1108. In step 1108, the current gear position GP is substituted for the target gear position TGP. If it is determined that the gearshift control is being provided, the control operation proceeds to step 1109. In step 1109, it is determined whether or not the current operation is in the release control phase.

If it is determined that the current operation is in the release control phase, it is determined that the gearshift is yet to be started. The control operation then proceeds to step 1110, in which the current gear position GP is substituted for the target gear position TGP to complete the control operation. If it is determined that the current operation is not in the release control phase, it is determined that the gearshift has been started. The control operation then proceeds to step 1111. In step 1111, the next gear position GPNXT calculated in step 1103 or step 1104 is substituted for the target gear position TGP to complete the control operation.

The gearshift control is started after the lapse of a predetermined period of time after the condition of the current gear position GP≠the target gear position TGP has been met. If the gearshift is yet to be started, as determined according to the control flow shown in FIG. 12, therefore, the gearshift can be prohibited for a predetermined period of time (for the period of time through which the diagnostic flag DGNAC remains set). If the gearshift has been started, on the other hand, the gearshift can be temporarily terminated according to a control procedure to be described later before disabling the gearshift for a predetermined period of time (for the period of time through which the diagnostic flag DGNAC remains set). In accordance with the control flow shown in FIG. 12, the control is provided to prohibit the gearshift in the D range (automatic gearshift mode) and in the S range (manual gearshift mode). It is, however, generally considered that a gearshift operation is more often repeated by the operation of the driver in the S range (manual gearshift mode) than in the D range (automatic gearshift mode). Control may therefore be provided to prohibit the gearshift only in the S range (manual gearshift mode).

Details of step 504 (determination flag calculation operation) shown in FIG. 6 will be described with reference to FIG. 13.

Figure 13:
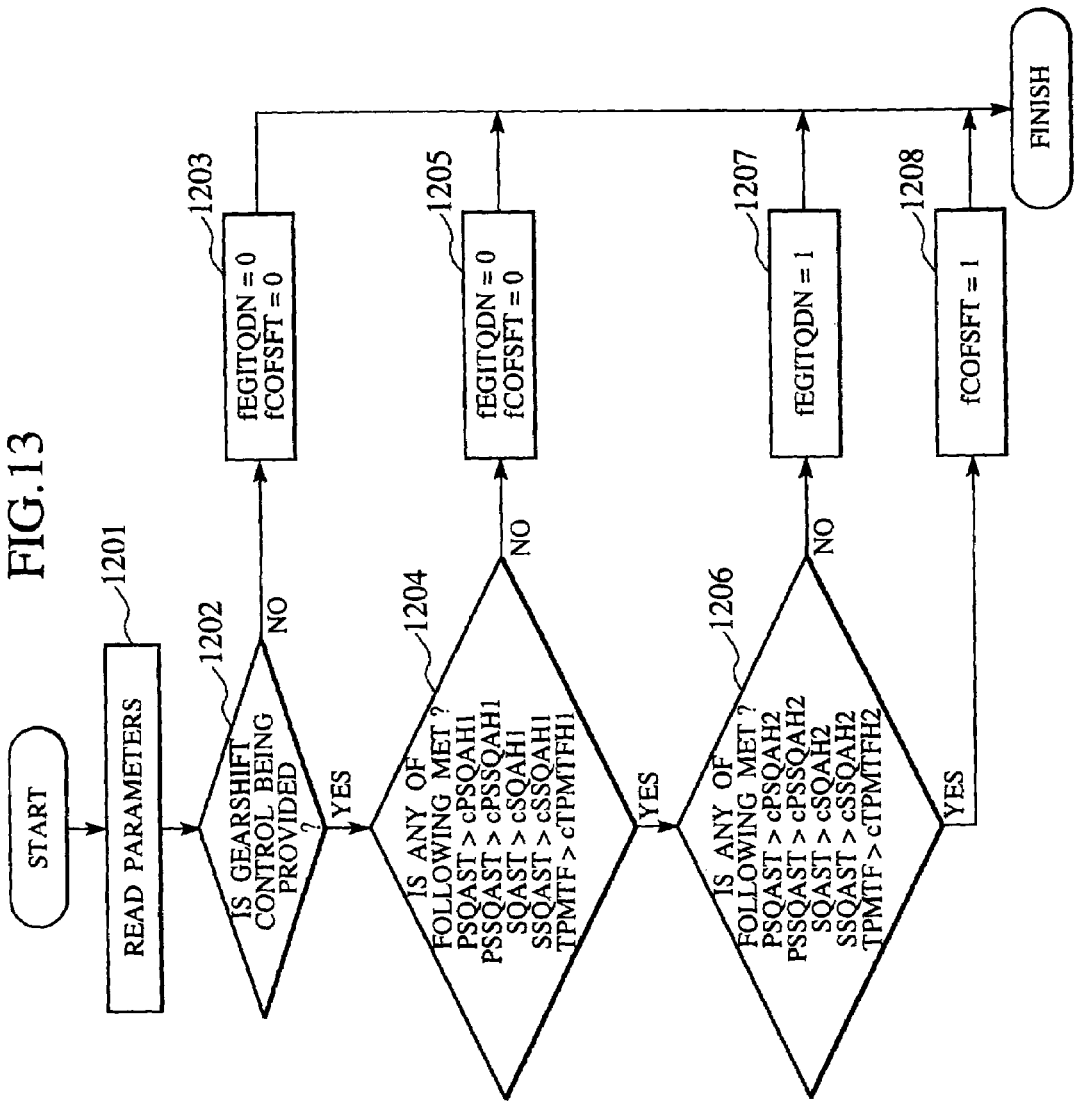
FIG. 13 is a flowchart showing detailed procedures for calculating a discrimination flag, as performed in the motor vehicle control system according to the preferred embodiment of the present invention.

FIG. 13 is a flowchart showing detailed procedures for calculating the determination flag, as performed in the motor vehicle control system according to the preferred embodiment of the present invention.

In step 1201, the power train control unit 100 reads parameters used in subsequent steps 1202 through 1207.

In step 1202, it is determined whether or not the gearshift control is being provided. If it is determined that the gearshift control is not being provided, the control operation proceeds to step 1203. In step 1203, an engine torque down flag fEGTQDN and a clutch release gearshift flag FCOFSFT are reset. Here, the engine torque down flag fEGTQDN is a flag for determining whether or not the torque of the engine 6 should be controlled according to the quantity of heat estimated value calculated in step 501. The clutch release gearshift flag FCOFSFT is a flag for determining whether or not the gearshift should be achieved by releasing the clutch 9 based on the quantity of heat estimated value calculated in step 501.

If it is determined that the gearshift control is being provided, the control operation proceeds to step 1204. In step 1204, it is determined whether or not any of the conditions represented by equations (22) through (26) is met.

$$PSQAST > cPSQAH1 \qquad (22)$$

$$PSSQAST > cPSSQAH1 \qquad (23)$$

$$SQAST > CSQAH1 \qquad (24)$$

$$SSQAST > cSSQAH1 \qquad (25)$$

$$TPMTF > cTPMTFH1 \qquad (26)$$

Where, cPSQAH1 is an estimated quantity of heat generated threshold value 1, cPSSQAH1 is an estimated quantity of heat accumulated threshold value 1, cSQAH1 is a quantity of heat generated threshold value 1, CSSQAH1 is a quantity of heat accumulated threshold value 1, and cTPMTFH1 is a lubricating oil temperature threshold value 1.

If none of the conditions specified by equations (22) through (26) is met, it is determined that there is only a marginal increase in temperature of the friction engagement device 10. The control operation then proceeds to step 1205, in which the engine torque down flag fEGTQDN and the clutch release gearshift flag fCOFSFT are reset. This completes the control operation.

If any of the conditions specified by equations (22) through (26) is met, the control operation proceeds to step 1206. In step 1206, it is determined whether or not any of the conditions specified by equations (27) through (31) is met.

$$PSQAST > cPSQAH2 \qquad (27)$$

$$PSSQAST > cPSSQAH2 \qquad (28)$$

$$SQAST > cSQAH2 \qquad (29)$$

$$SSQAST > cSSQAH2 \qquad (30)$$

$$TPMTF > cTPMTFH2 \qquad (31)$$

Where, cPSQAH2 is an estimated quantity of heat generated threshold value 2, cPSSQAH2 is an estimated quantity of heat accumulated threshold value 2, cSQAH2 is a quantity of heat generated threshold value 2, cSSQAH2 is a quantity of heat accumulated threshold value 2, and cTPMTFH2 is a lubricating oil temperature threshold value 2. The following must be met when the threshold values 2 are set in relation to the threshold values in step 1204: cPSQAH1<cPSQAH2, cPSSQAH1<cPSSQAH2, cSQAH1<cSQAH2, cSSQAH1<cSSQAH2, and cTPMTFH1<cTPMTFH2.

If none of the conditions specified by equations (27) through (31) is met, it is determined that the gearshift can be effected if the torque of the engine 6 is reduced, though there is relatively a large increase in temperature of the friction engagement device 10. The control operation then proceeds to step 1207, in which the engine torque down flag fEGTQDN is set to complete the control operation.

If any of the conditions specified by equations (27) through (31) is met, there is a significant increase in temperature of the friction engagement device 10, and it is necessary to release the clutch 9 and effect the gearshift. The control operation therefore proceeds to step 1208, in which the clutch release gearshift flag FCOFSFT is set to complete the control operation.

In the conditions specified by equations (19), (26), and (31), it is desirable that a parameter that reflects the temperature of a friction surface of the friction engagement device 10 be used. The temperature of a hydraulic fluid of the friction engagement device 10 may be used instead of the transmission lubricating oil temperature TPMTF. If the lubricating oil of the friction engagement device 10 and the lubricating oil of the transmission 50 are packed in different chambers, the temperature of the lubricating oil of the friction engagement device 10 may be used. Alternatively, the temperature of the friction surface of the friction engagement device 10 measured by a sensor that turns with the drive plate 203 and the driven plate 204 may still be used. Of all the parts making up the transmission 50, the friction engagement device 10 generates the greatest quantity of heat. The transmission lubricating oil temperature TPMTF can therefore be used as information indicating the state of the friction engagement device 10.

Details of step 505 (target input shaft speed calculation operation) shown in FIG. 6 will be described with reference to FIG. 14.

Figure 14:
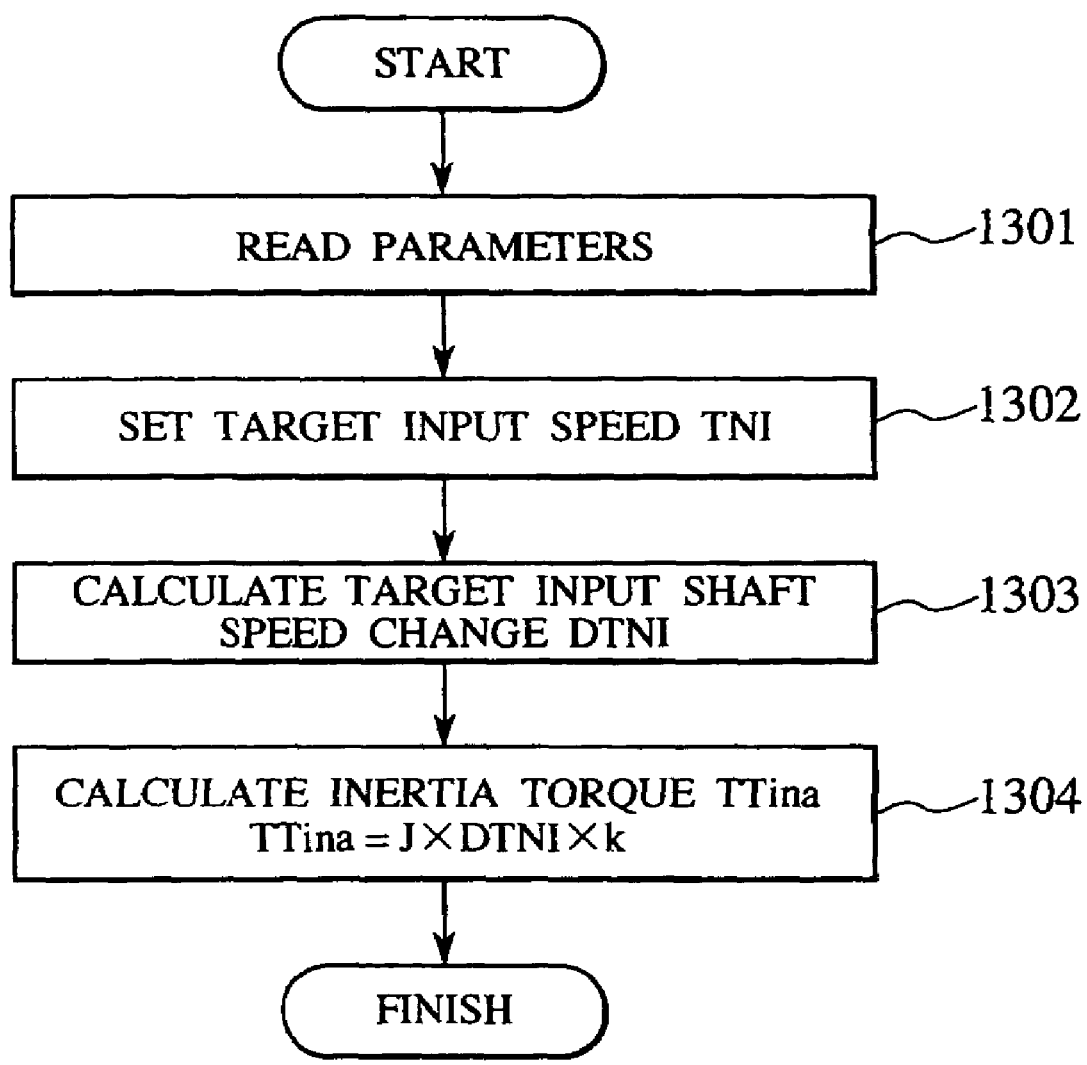
FIG. 14 is a flowchart showing detailed procedures for calculating a target input shaft speed, as performed in the motor vehicle control system according to the preferred embodiment of the present invention.

FIG. 14 is a flowchart showing detailed procedures for calculating the target input shaft speed, as performed in the motor vehicle control system according to the preferred embodiment of the present invention.

In step 1301, the power train control unit 100 reads parameters used in subsequent steps 1302 through 1304.

In step 1302, a target input shaft speed TNI is set. The target input shaft speed TNI is set from a gearshift pattern or an output shaft speed so that the speed corresponding to the gear position before the gearshift is smoothly changed to the speed corresponding to the gear position after the gearshift during rotation synchronization.

In step 1303, a change DTNI in the target input shaft speed TNI is calculated. In step 1304, an inertia torque TTina is calculated using equation (32). This completes the control operation.

$$TTina = J \times DTNI \times k \quad (32)$$

Where, J is a coefficient representing inertia from the engine to the input shaft.

Details of step 506 (target assist torque calculation operation) shown in FIG. 6 will be described with reference to FIG. 15.

Figure 15:
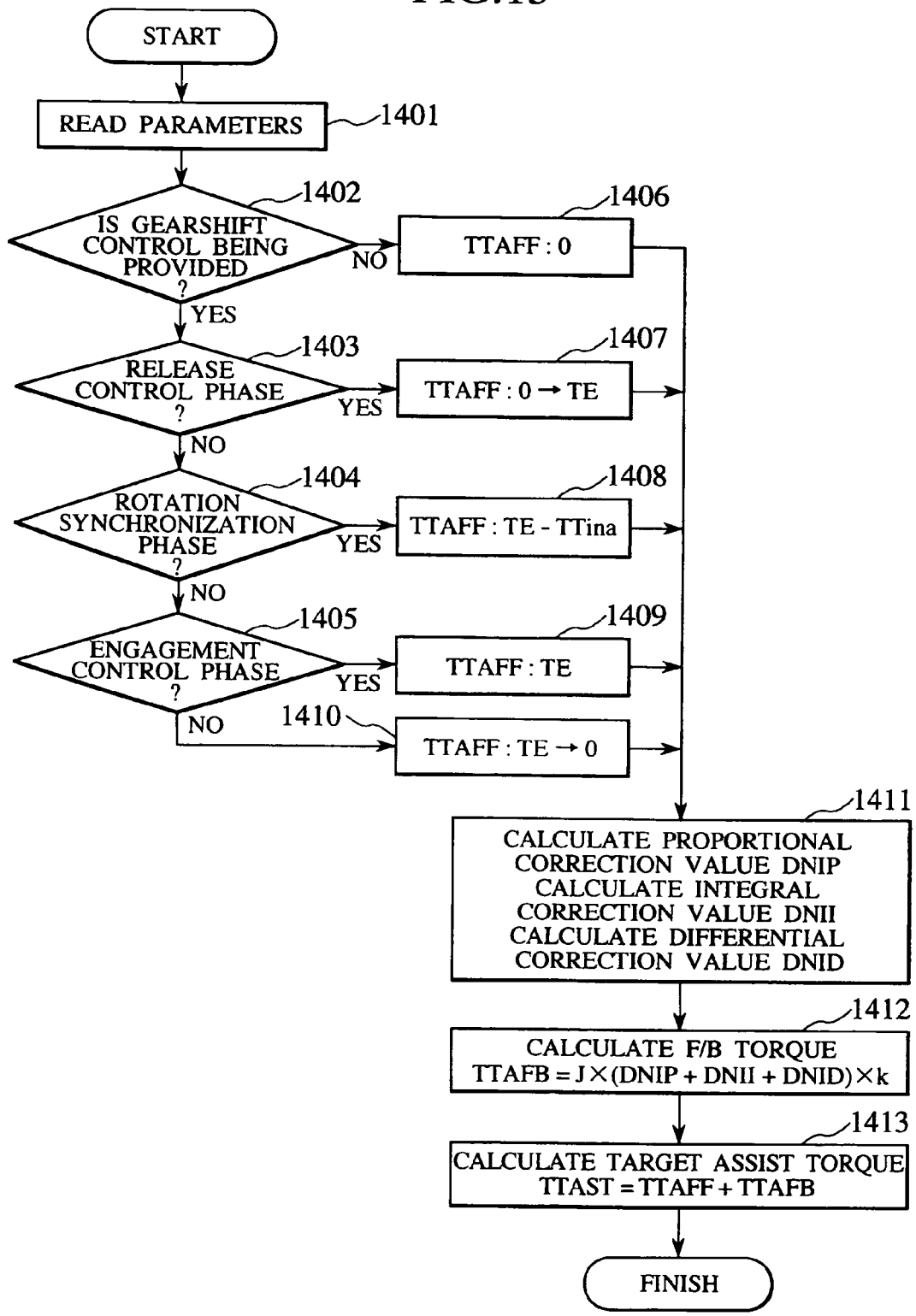
FIG. 15 is a flowchart showing detailed procedures for calculating a target assist torque, as performed in the motor vehicle control system according to the preferred embodiment of the present invention.

FIG. 15 is a flowchart showing detailed procedures for calculating the target assist torque, as performed in the motor vehicle control system according to the preferred embodiment of the present invention.

In step 1401, the power train control unit 100 reads parameters used in subsequent steps 1402 through 1413.

In step 1402, it is determined whether or not the gearshift control is being provided. If it is determined that the gearshift control is being provided, the control operation proceeds to step 1403.

If it is determined that the gearshift control is not being provided, the control operation proceeds to step 1406. In step 1406, a target assist torque feedforward value TTAFF is set to 0 and then the control operation proceeds to step 1411.

In step 1403, it is determined whether or not the current operation is in the release control phase. If it is determined that the current operation is not in the release control phase, the control operation proceeds to step 1404. If it is determined that the current operation is in the release control phase, the control operation then proceeds to step 1407. In step 1407, the target assist torque feedforward value TTAFF is allowed to gradually approach the engine torque TE. The control operation then proceeds to step 1411.

In step 1404, it is determined whether or not the current operation is in the rotation synchronization control phase. If it is determined that the current operation is in the rotation synchronization control phase, the control operation proceeds to step 1408. If it is determined that the current operation is not in the rotation synchronization control phase, the control operation then proceeds to step 1405. In step 1405, the target assist torque feedforward value TTAFF is calculated using equation (33). The control operation then proceeds to step 1411.

$$TTAFF = TE - TTina \quad (33)$$

In step 1405, it is determined whether or not the current operation is in the engagement control phase. If it is determined that the current operation is in the engagement control phase, the control operation proceeds to step 1409. In step 1409, the target assist torque feedforward value TTAFF is set to TE and the control operation proceeds to step 1411. If it is determined that the current operation is not in the engagement control phase, the control operation proceeds to step 1410. In step 1410, the target assist torque feedforward value TTAFF is allowed to gradually approach 0. The control operation then proceeds to step 1411.

In step 1411, a proportional correction value DNIP, an integral correction value DNII, and a differential correction value DNID are calculated from a deviation of the target input shaft speed TNI from the input shaft speed NI, an integral value of the deviation, and a derivative value of the deviation, respectively.

In step 1412, a target assist torque feedback value TTAFB is calculated using equation (34).

$$TTAFB = J \times (DNIP + DNII + DNID) \times k \quad (34)$$

In step 1413, the feedforward value and the feedback value are added up to arrive at the target assist torque TTAST. This completes the control operation.

Details of step 507 (shift target load calculation operation) shown in FIG. 6 will be described with reference to FIG. 16.

Figure 16:
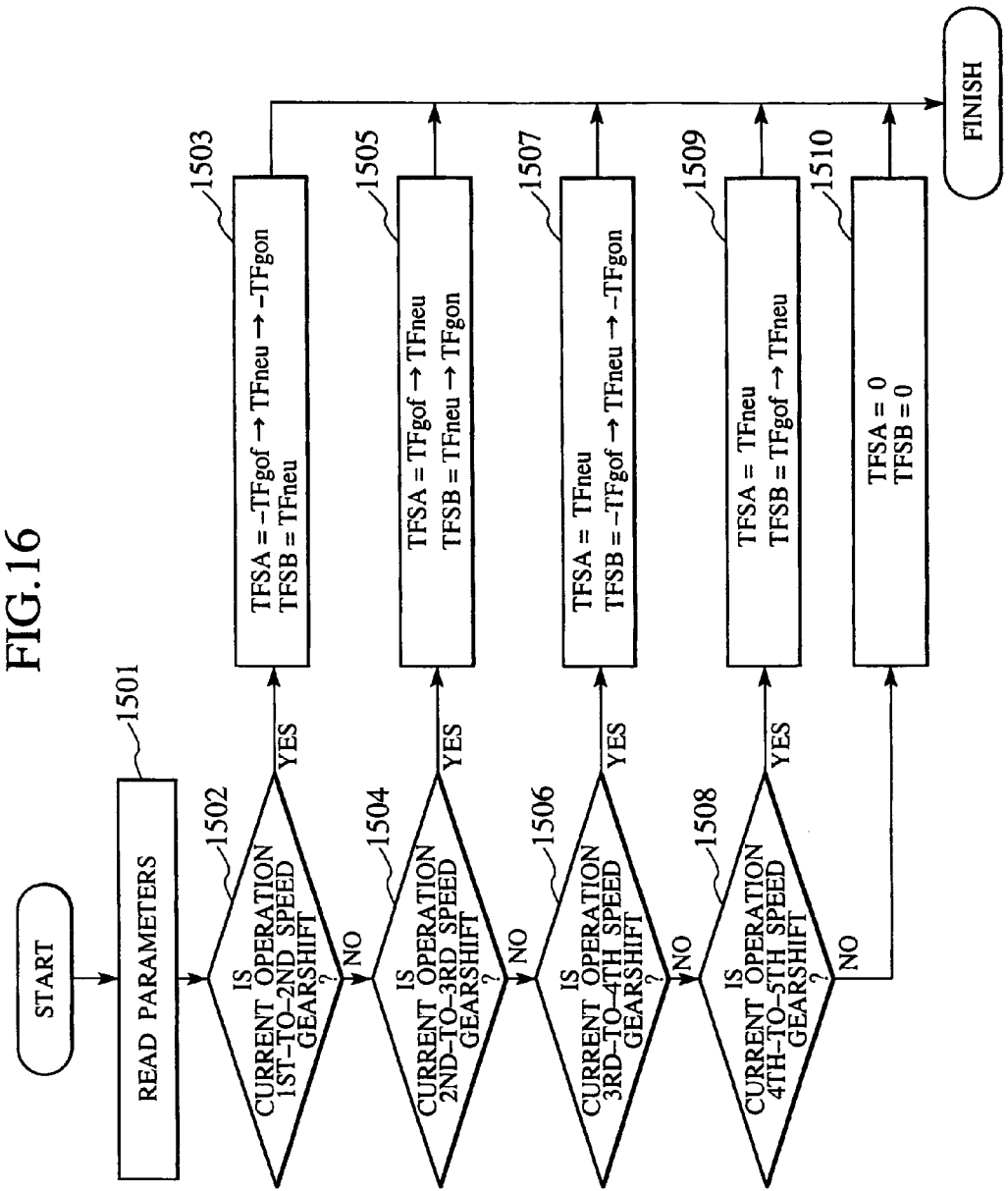
FIG. 16 is a flowchart showing detailed procedures for calculating a shift target load, as performed in the motor vehicle control system according to the preferred embodiment of the present invention.

FIG. 16 is a flowchart showing detailed procedures for calculating the shift target load, as performed in the motor vehicle control system according to the preferred embodiment of the present invention.

In step 1501, the power train control unit 100 reads parameters used in subsequent steps 1502 through 1508.

In step 1502, it is determined whether or not the current operation is a 1st-to-2nd speed gearshift. If it is determined that the current operation is not the 1st-to-2nd speed gearshift, the control operation proceeds to step 1504.

If it is determined that the current operation is the 1st-to-2nd speed gearshift, the control operation proceeds to step 1503. In the release control phase, a shift A target load TFSA is calculated as being equal to −TFgof (a gear release load) to allow the shift A to be released from the 1st speed gear. In the rotation synchronization phase, the shift A target load TFSA is calculated as being equal to TFneu (a neutral holding load) to allow the shift A to be in a neutral position. In the engagement control phase, the shift A target load TFSA is calculated as being equal to −TFgon (a gear engagement load) to allow the shift A to be engaged with the 2nd speed gear. In addition, in step 1503, a shift B target load TFSB is calculated as being equal to TFneu (the neutral holding load) to allow the shift B to be in the neutral position.

In step 1504, it is determined whether or not the current operation is a 2nd-to-3rd speed gearshift. If it is determined that the current operation is not the 2nd-to-3rd speed gearshift, the control operation proceeds to step 1506.

If it is determined that the current operation is the 2nd-to-3rd speed gearshift, the control operation proceeds to step 1505. In the release control phase, the shift A target load TFSA is calculated as being equal to TFgof (the gear release load) to allow the shift A to be released from the 2nd speed gear. In the rotation synchronization phase, the shift A target load TFSA is calculated as being equal to TFneu (the neutral holding load) to allow the shift A to be in the neutral position. In the release control phase and the rotation synchronization phase, the shift B target load TFSB is also calculated as being equal to TFneu (the neutral holding load) to allow the shift B to be in the neutral position. In the engagement control phase, the shift A target load TFSA is calculated as being equal to TFneu (the neutral holding load) to allow the shift A to be in the neutral position. The shift B target load TFSB is calculated as being equal to TFgon (the gear engagement load) to allow the shift B to be engaged with the 3rd speed gear.

In step 1506, it is determined whether or not the current operation is a 3rd-to-4th speed gearshift. If it is determined that the current operation is not the 3rd-to-4th speed gearshift, the control operation proceeds to step 1508.

If it is determined that the current operation is the 3rd-to-4th speed gearshift, the control operation proceeds to step 1507. In the release control phase, the shift B target load TFSB is calculated as being equal to −TFgof (the gear release load) to allow the shift B to be released from the 3rd speed gear. In the rotation synchronization phase, the shift B target load TFSB is calculated as being equal to TFneu (the neutral holding load) to allow the shift B to be in the neutral position. In the engagement control phase, the shift B target load TFSB is calculated as being equal to −TFgon (the gear engagement load) to allow the shift B to be engaged with the 4th speed gear. In addition, in step 1507, the shift A target load TFSA is calculated as being equal to TFneu (the neutral holding load) to allow the shift A to be in the neutral position.

In step 1508, it is determined whether or not the current operation is a 4th-to-5th speed gearshift. If it is determined that the current operation is not the 4th-to-5th speed gearshift, the control operation proceeds to step 1510. In step 1510, the shift A target load TFSA is calculated as being equal to 0 and the shift B target load TFSB is calculated as being equal to 0.

If it is determined that the current operation is the 4th-to-5th speed gearshift, the control operation proceeds to step 1509. In the release control phase, the shift B target load TFSB is calculated as being equal to TFgof (the gear release load) to allow the shift B to be released from the 4th speed gear. In the rotation synchronization phase and the engagement control phase, the shift B target load TFSB is calculated as being equal to TFneu (the neutral holding load) to allow the shift B to be in the neutral position. In addition, in step 1509, the shift A target load TFSA is calculated as being equal to TFneu (the neutral holding load) to allow the shift A to be in the neutral position. In a constant speed driving using the 5th speed gear, the friction engagement device 10 transmits the torque of the engine 6 to the output shaft 42. In the engagement control phase, therefore, the thrust load of the friction engagement device 10 is quickly increased to achieve a gearshift to the 5th speed gear.

Details of step 508 (clutch target position calculation operation) shown in FIG. 6 will be described with reference to FIG. 17.

Figure 17:
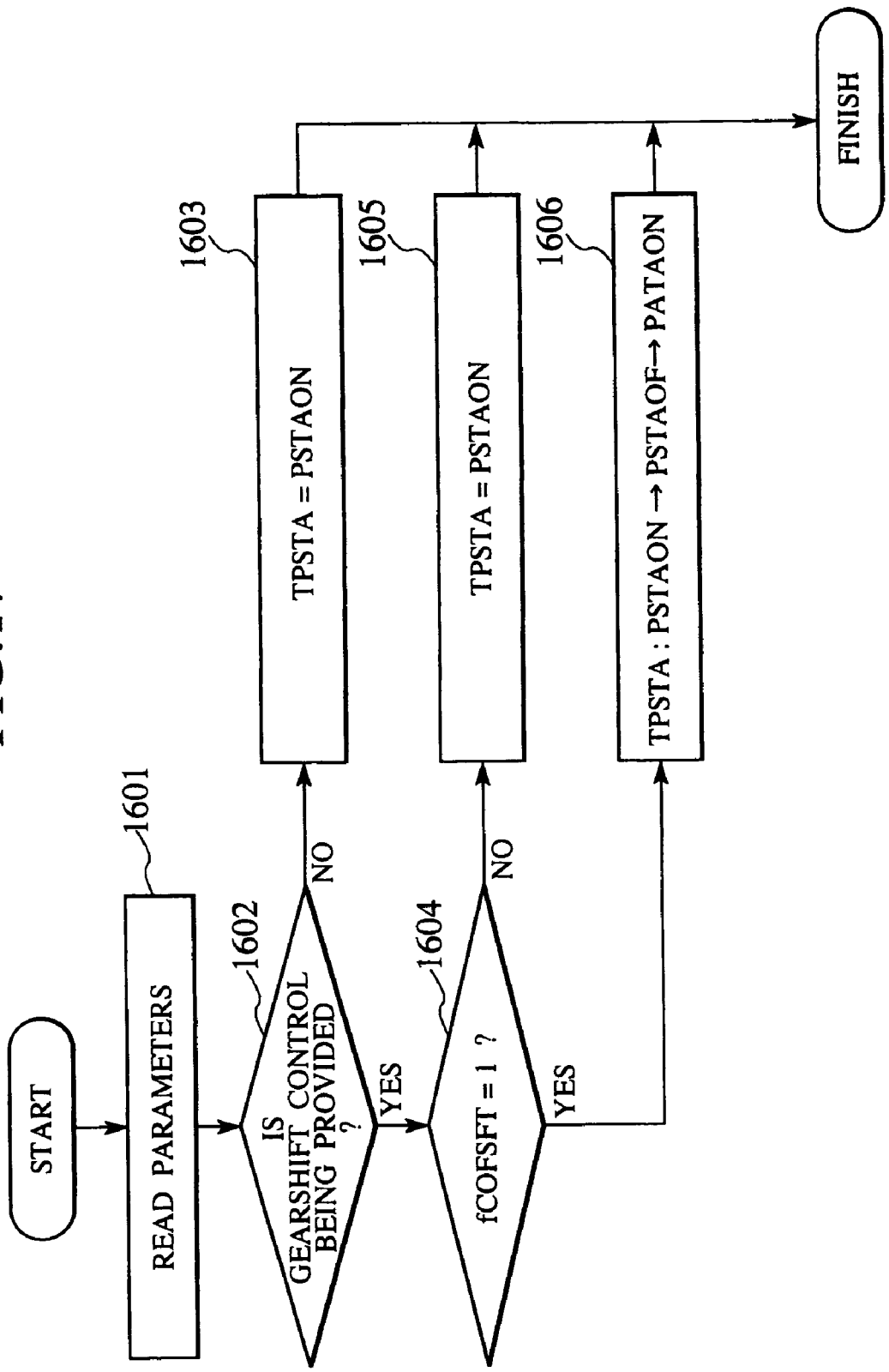
FIG. 17 is a flowchart showing detailed procedures for calculating a clutch target position, as performed in the motor vehicle control system according to the preferred embodiment of the present invention.

FIG. 17 is a flowchart showing detailed procedures for calculating the clutch target position, as performed in the motor vehicle control system according to the preferred embodiment of the present invention.

In step 1601, the power train control unit 100 reads parameters used in subsequent steps 1602 through 1604.

In step 1602, it is determined whether or not the gearshift control is being provided. If it is determined that the gearshift control is not being provided, the control operation proceeds to step 1603. In step 1603, a clutch target position TPSTA is calculated as being equal to PSTAON (an engagement position).

If it is determined that the gearshift control is being provided, the control operation proceeds to step 1604. In step 1604, it is determined whether or not the clutch release gearshift flag fCOFSFT is set. If it is determined that the clutch release gearshift flag fCOFSFT is not set, the control operation proceeds to step 1605. In step 1605, the clutch target position TPSTA is calculated as being equal to PSTAON (the engagement position).

If it is determined that the clutch release gearshift flag FCOFSFT is set, the control operation proceeds to step 1606, in which the clutch 9 is released and a gearshift is effected. First of all, the clutch target position TPSTA is lowered to PSTAOF (a release position) and the gearshift is performed with the clutch 9 released. After the gearshift has been completed, the clutch target position TPSTA is gradually raised to PSTAON (the engagement position), thereby engaging the clutch 9.

Details of step 509 (target engine torque calculation operation) shown in FIG. 6 will be described with reference to FIG. 18.

Figure 18:
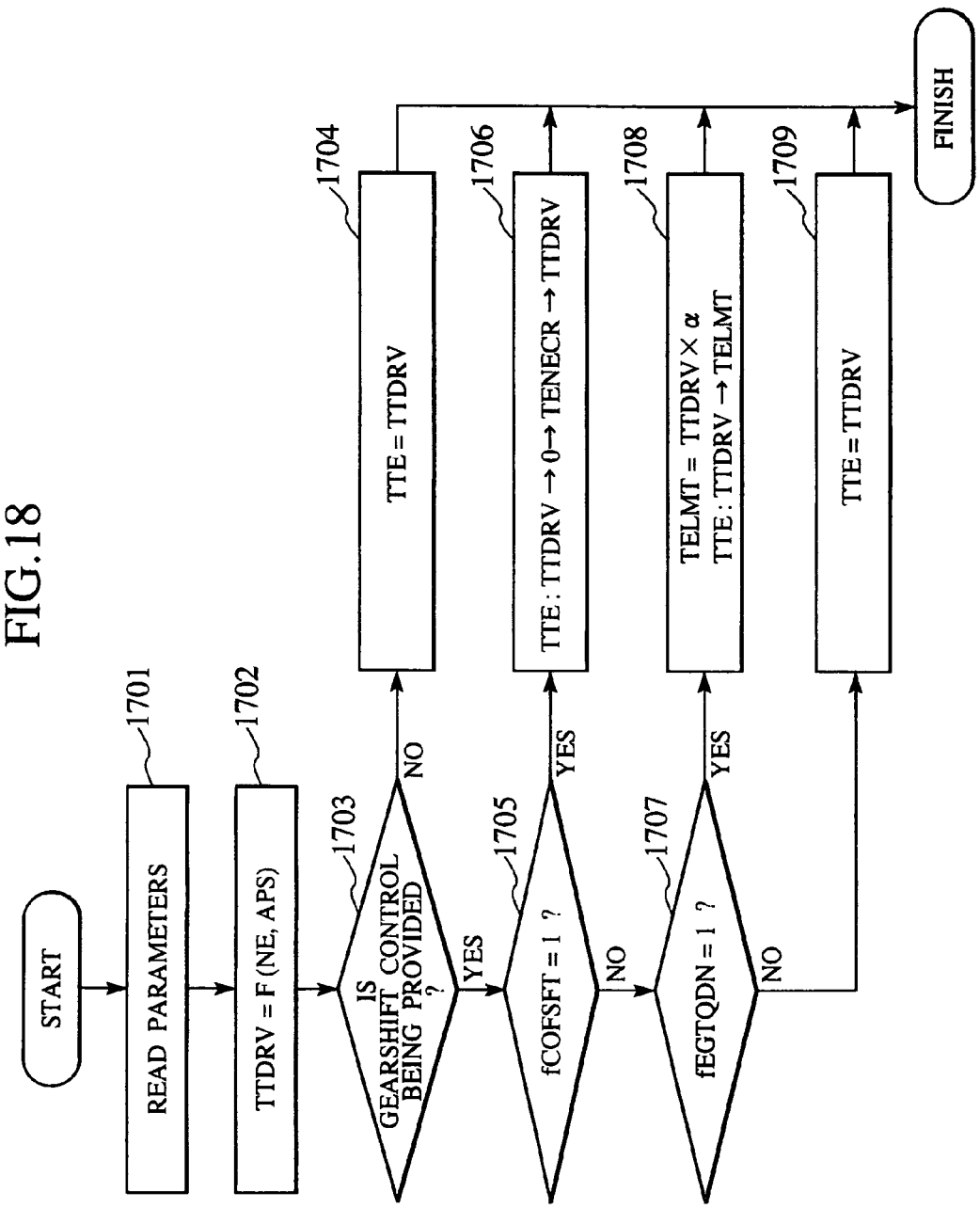
FIG. 18 is a flowchart showing detailed procedures for calculating a target engine torque, as performed in the motor vehicle control system according to the preferred embodiment of the present invention.

FIG. 18 is a flowchart showing detailed procedures for calculating the target engine torque, as performed in the motor vehicle control system according to the preferred embodiment of the present invention.

In step 1701, the power train control unit 100 reads parameters used in subsequent steps 1702 through 1709.

In step 1702, a driver torque requirement TTDRV is calculated using a function F according to the parameters of the engine speed NE, an accelerator opening APS, and the like. Here, the driver torque requirement TTDRV is an engine torque requested by the driver. The TTDRV may be determined using a map or the like based on the engine speed NE and the accelerator opening APS.

In step 1703, it is determined whether or not the gearshift control is being provided. If it is determined that the gearshift control is not being provided, the control operation proceeds to step 1704. In step 1704, the target engine torque TTE is calculated as being equal to TTDRV (the driver torque requirement).

If it is determined that the gearshift control is being provided, the control operation proceeds to step 1705. In step 1705, it is determined whether or not the clutch release gearshift flag fCOFSFT is set. If it is determined that the clutch release gearshift flag fCOFSFT is set, the control operation proceeds to step 1706. In step 1706, the target engine torque TTE is calculated for carrying out the gearshift with the clutch 9 released. In the first place, the target engine torque TTE is gradually decreased down to 0 at the same time that the clutch 9 is released. After the clutch 9 has been released, the target engine torque TTE is set to TENECR (a torque for engine speed control) in order to control the engine speed NE. After the gearshift has been completed, the clutch 9 is engaged and, at the same time, the target engine torque TTE is gradually returned back to the driver torque requirement TTDRV.

If it is determined in step 1705 that the clutch release gearshift flag FCOFSFT is not set, the control operation proceeds to step 1707. In step 1707, it is determined whether or not the engine torque down flag fEGTQDN is set. If it is determined that the engine torque down flag fEGTQDN is not set, the control operation proceeds to step 1709. In step 1709, the target engine torque TTE is calculated as being equal to TTDRV (the driver torque requirement).

If it is determined that the engine torque down flag fEGTQDN is set, the control operation proceeds to step 1708. In step 1708, the torque of the engine 6 is controlled so as to permit torque transmission during the gearshift by the friction engagement device 10. First of all, an engine torque upper limit value TELMT is calculated as being equal to TTDRV×□ (0≦□≦1). Where, a is a coefficient for setting the upper limit value. The value of a is set according to the estimated quantity of heat generated by the friction engagement device 10 calculated in step 501 (quantity of heat estimated value calculation operation) of FIG. 6 and parameters associated with the temperature of the friction surface of the friction engagement device 10. The torque of the engine 6 is then reduced by gradually lowering the target engine torque TTE down to the engine torque upper limit value TELMT.

As explained in the foregoing, the control methods shown as flowcharts in FIGS. 5 through 18 allow the quantity of heat generated by the friction engagement device 10 and the temperature of the friction surface to be detected and estimated. The following different types of controls can then be achieved according to the detected and estimated parameters. The different types of controls specifically include: (a) reducing the torque of the engine 6 during a gearshift; (b) using the friction engagement device 10 to select either the mode for performing the gearshift by forming the torque transmission path using the friction engagement device 10 (the first gearshift mode) or the mode for performing the gearshift by releasing the clutch) (the second gearshift mode); (c) prohibiting the gearshift for a predetermined period of time; and (d) informing the driver of the condition of the friction engagement device 10.

In accordance with the embodiment, step 501 (quantity of heat estimated value calculation operation), and step 504 (discrimination flag calculation operation) shown in FIG. 6 achieve discrimination of the state of the friction engagement device 10. Step 504 (discrimination flag calculation operation) and step 509 (target engine torque calculation operation) shown in FIG. 6 achieve control of the engine torque. Step 504 (discrimination flag calculation operation), step 507 (shift target load calculation operation), step 508 (clutch target position calculation operation), and step 509 (target engine torque calculation operation) shown in FIG. 6 achieve selection of the mode (the second gearshift mode), in which the gearshift is performed by releasing the clutch 9. Step 502 (diagnostic flag calculation operation) and step 503 (gearshift enable/disable discrimination operation) shown in FIG. 6 prohibit a gearshift for a predetermined period of time. Further, step 502 (diagnostic flag calculation operation) informs the driver of the condition of the friction engagement device 10.

The operation for an upshift from the 1st speed to the 2nd speed using the motor vehicle control system according to the embodiment will be described with reference to FIGS. 19 through 24.

The operation during an ordinary upshift from the 1st speed to the 2nd speed using the motor vehicle control system according to the preferred embodiment of the present invention will first be described with reference to FIG. 19.

Figure 19:
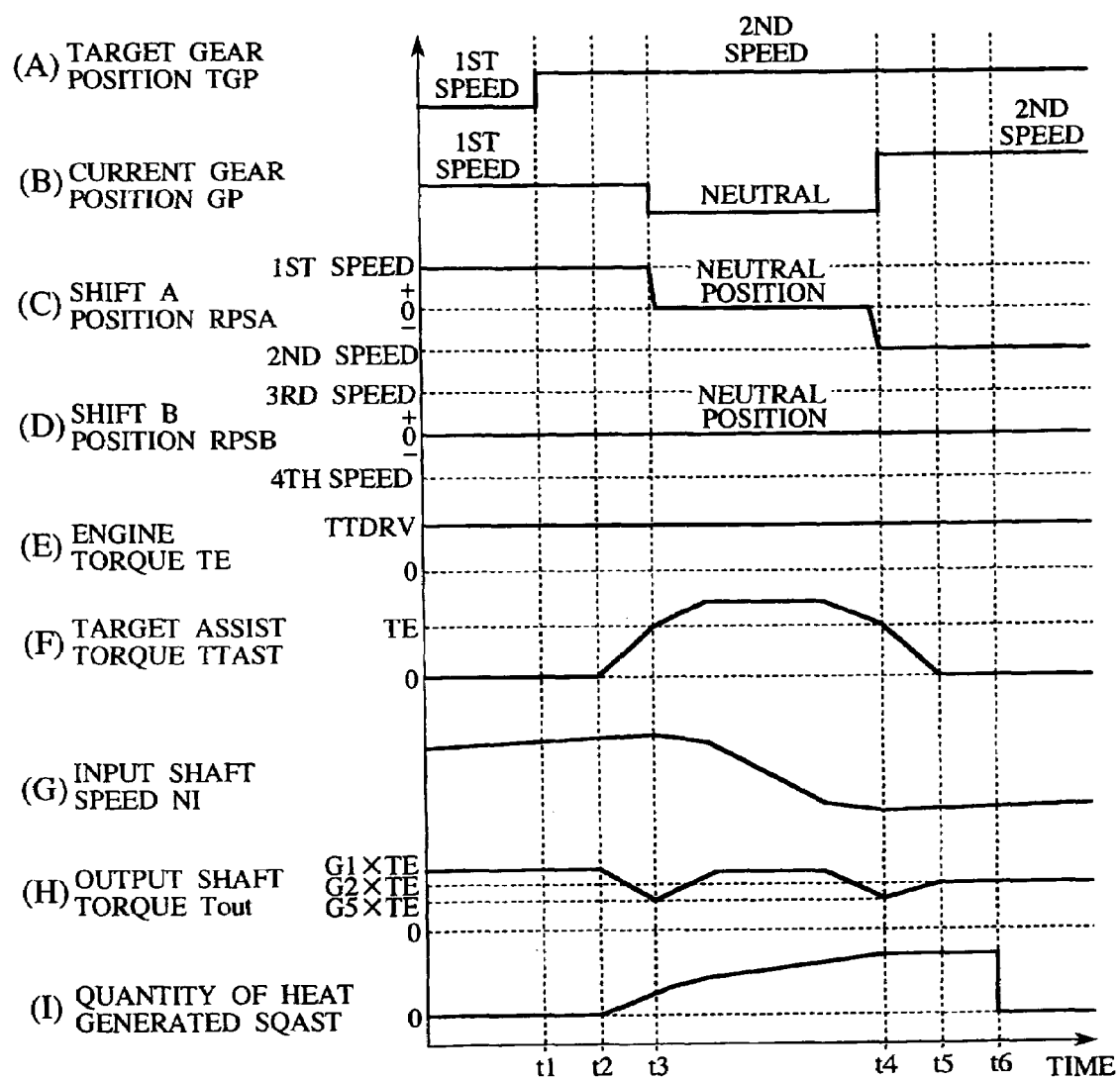
FIG. 19 is a timing chart showing the operation during an ordinary upshift from a 1st speed to a 2nd speed using the motor vehicle control system according to the preferred embodiment of the present invention.

FIG. 19 is a timing chart showing the operation during the ordinary upshift from the 1st speed to the 2nd speed using the motor vehicle control system according to the preferred embodiment of the present invention.

On FIG. 19, the abscissa represents time. A period of time from t2 to t3 represents the release control operation performed in step 403 of FIG. 5. A period of time from t3 to t4 represents the rotation synchronization control operation performed in step 405 of FIG. 5. A period of time from t4 to t5 represents the engagement control operation performed in step 407 of FIG. 5. A period of time from t5 to t6 represents the gearshift completion phase operation performed in step 409 of FIG. 5. The ordinate on FIG. 19, on the other hand, gives the following items. Specifically, (A) is the target gear position TGP; (B) is the current gear position GP; (C) is the shift A position RPSA; (D) is the shift B position RPSB; (E) is the engine torque TE; (F) is the target assist torque TTAST; (G) is the input shaft speed NI; (H) is the output shaft torque Tout; and (I) is the quantity of heat generated SQAST. The shift A position RPSA is positive in the direction of engagement of the shift A with the 1st speed gear and negative in the direction of engagement of the shift A with the 2nd speed gear. Similarly, the shift B position RPSB is positive in the direction of engagement of the shift B with the 3rd speed gear and negative in the direction of engagement of the shift B with the 4th speed gear. In addition, both the shift A position RPSA and the shift B position RPSB are zero (0) when the shift A and the shift B are at the neutral position. FIG. 19 shows when a gearshift is performed from the 1st speed to the 2nd speed with an accelerator opening kept constant. For the sake of simple explanation, it is assumed that the engine torque TE remains constant.

Referring to FIG. 19 (A), when the target gear position TGP as calculated according to step 503 (gearshift enable/disable discrimination operation) of FIG. 6 changes from that of the 1st speed to that of the 2nd speed at time t1, the following relation holds true: the current gear position GP ≠ the target gear position TGP. At time t2 after the lapse of a predetermined period of time, the gearshift control is started. Up to time t2, the torque transmission path of the engine 6 is as follows: the engine 6→the clutch 9→the input shaft 41→the gear 1→the gear 11→the sleeve 21→the output shaft 42 (hereinafter referred to as a "1st speed gear transmission path"). The torque Tout of the output shaft 42 is: Tout=TE×G1. Where, G1 is the reduction gear ratio of the 1st speed gear.

Referring to FIG. 19 (F), the target assist torque TTAST as calculated according to step 506 (target assist torque calculation operation) of FIG. 6 starts to increase gradually at time t2. The assist motor target torque TTMAC is set according to the target assist torque TTAST. The actuator 114 is then controlled to allow a thrust force to be generated on the friction surface of the friction engagement device 10.

When the thrust force is generated on the friction surface of the friction engagement device 10, the torque of the engine 6 transmitted by the 1st speed gear transmission path is gradually transmitted by the friction engagement device 10. Then, the output shaft torque Tout gradually decreases as shown in FIG. 19 (H). The transmission path of the torque transmitted by the friction engagement device 10 is as follows: the engine 6→the clutch 9→the input shaft 41→the friction engagement device 10→the gear 5→the gear 15→the output shaft 42 (hereinafter referred to as an "assist transmission path").

For a period of time from time t2 to time t5, the torque is transmitted by the friction engagement device 10. As shown in FIG. 19 (I), therefore, the quantity of heat generated SQAST as calculated according to step 501 (quantity of heat estimated value calculation operation) of FIG. 6 is on the increase.

Referring to FIG. 19 (F), when the target assist torque TTAST reaches the engine torque TE at time t3, the torque transmitted through the 1st speed gear transmission path becomes substantially 0 and the torque of the engine 6 is substantially transmitted by the assist transmission path. Then, as shown in FIG. 19 (H), the output shaft torque Tout decreases down to a level of Tout=TE×G5.

When the torque transmitted through the 1st speed gear transmission path becomes substantially 0 at time t3, the shift A target load TFSA as calculated according to step 507 (shift target load calculation operation) of FIG. 6 is set to a load for releasing the sleeve 21 from the gear 11. The shift A motor target torque TTMSA is set according to the shift A target load TFSA. When the shift A motor target torque TTMSA is set, the actuator 112 is controlled so that the sleeve 21 is released from the gear 11. After the sleeve 21 has been released from the gear 11, control is provided to bring the shift A position RPSA quickly to the neutral positive as shown in FIG. 19 (C). The target assist torque TTAST is controlled so as to control the speed NI of the input shaft 41 to the target speed (the speed corresponding to the next gearshift position) using the friction engagement device 10.

When the input shaft speed NI reaches a predetermined value, the shift A target load TFSA is set to a load for engaging the sleeve 22 with the gear 12. The sleeve 22 is then engaged with the gear 12 at time t4. Then, as shown in FIG. 19 (B), the current gear position GP becomes the 2nd speed and the gearshift is completed.

After the gearshift is completed at time t4, the target assist torque TTAST is gradually returned to 0 as shown in FIG. 19 (F) and the release control of the friction engagement device 10 is carried out. At this time, the torque transmitted by the friction engagement device 10 is gradually transmitted by the 2nd speed gear. Then, as shown in FIG. 19 (H), the output shaft torque Tout gradually increases. The transmission path of the torque transmitted by the 2nd speed gear is as follows: the engine 6→the clutch 9→the input shaft 41→the gear 2→the sleeve 22→the gear 12→the output shaft 42 (hereinafter referred to as a "2nd speed gear transmission path").

When the release of the friction engagement device 10 is completed at time t5, the torque transmitted by the friction engagement device 10 becomes substantially 0 and the torque of the engine 6 is substantially transmitted by the 2nd speed gear transmission path as shown in FIG. 19 (F). Then, as shown in FIG. 19 (H), the output shaft torque Tout increases to a level of Tout=TE×G2. Here, G2 is the reduction gear ratio of the 2nd speed gear. After the lapse of a predetermined period of time after the release of the friction engagement device 10 has been completed, the gearshift control is completed at time t6. Referring to FIG. 19 (I), the quantity of heat generated SQAST is cleared after the gearshift control has been completed.

As described in the foregoing, according to the embodiment, the torque of the engine 6 is transmitted from the input shaft 41 to the output shaft 42 using the friction engagement device 10 and the gearshift is accomplished by selecting the dog clutch with the clutch 9 engaged. This effectively prevents torque interruption during the gearshift.

The quantity of heat generated SQAST shown in FIG. 19 (I) does not meet the condition of SQAST>cSQAH1 of step 1204 shown in FIG. 13. In step 1205, therefore, the engine torque down flag fEGTQDN and the clutch release gearshift flag fCOFSFT are reset. Referring to the flowchart shown in FIG. 18, therefore, step 1705 is answered NO and step 1707 is answered NO. Through the operation of step 1709, therefore, the target engine torque TTE is calculated as being equal to TTDRV (the driver torque requirement). As explained in the foregoing, the engine torque TE (the driver torque requirement) remains constant if the gearshift is effected from the 1st speed to the 2nd speed with an accelerator opening kept constant. There may, however, be cases where the friction surface of the friction engagement device 10 generates heat to exceed a predetermined level of the quantity of heat generated depending on the difference speed of the friction engagement device 10 (the difference in speed between the input shaft 41 and the gear 5) and the torque to be transmitted. In such cases, the control method as described hereunder is taken according to the preferred embodiment of the present invention.

The operation of controlling previously the engine torque according to the quantity of heat estimated value for the friction engagement device 10 during an upshift from the 1st speed to the 2nd speed using the motor vehicle control system according to the preferred embodiment of the present invention will be described with reference to FIG. 20.

Figure 20:
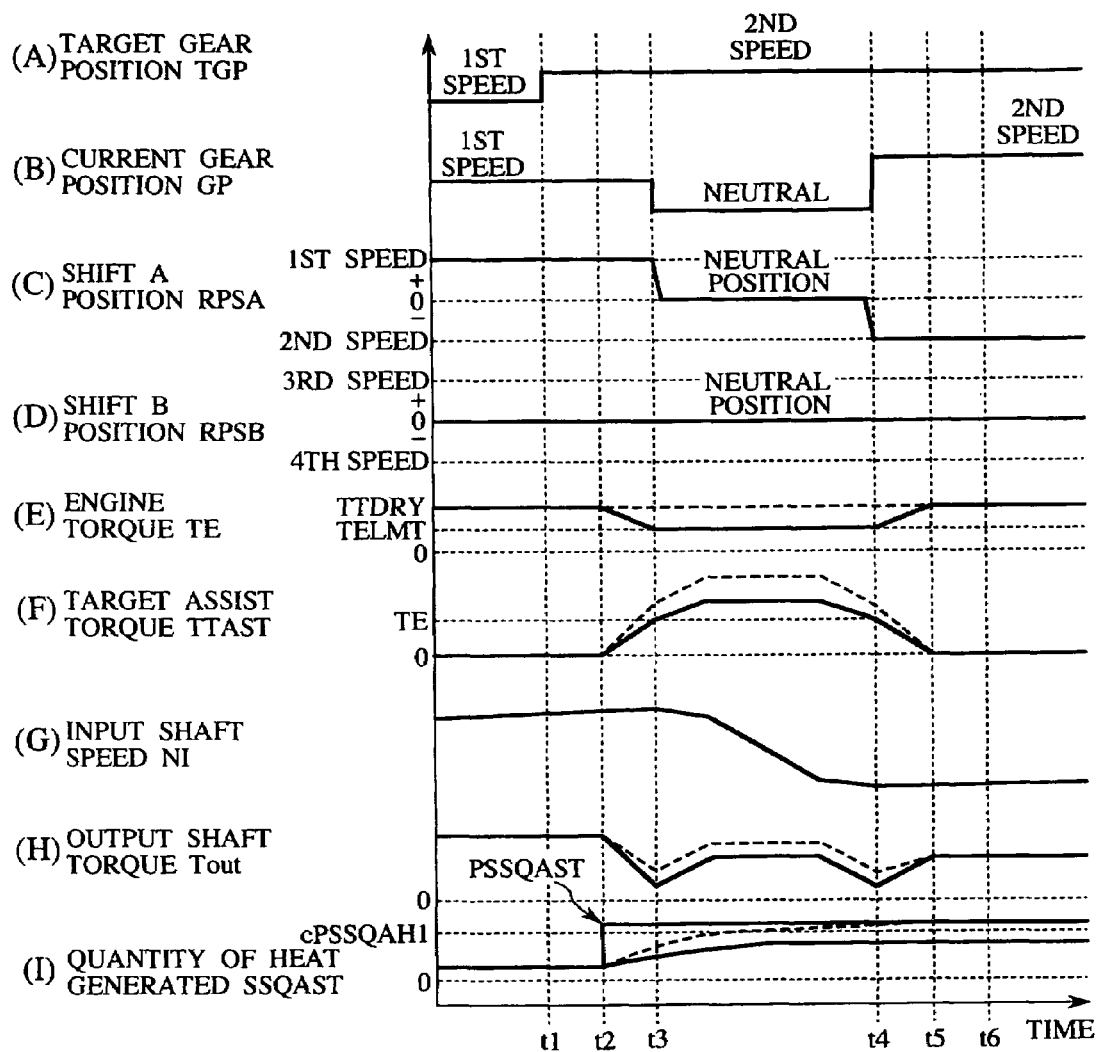
FIG. 20 is a timing chart showing the operation of controlling previously an engine torque according to a quantity of heat estimated value for a friction engagement device during an upshift from a 1st speed to a 2nd speed using the motor vehicle control system according to the preferred embodiment of the present invention.

FIG. 20 is a timing chart showing the operation of controlling previously the engine torque according to the quantity of heat estimated value for the friction engagement device 10 during the upshift from the 1st speed to the 2nd speed using the motor vehicle control system according to the preferred embodiment of the present invention.

On FIG. 20, the abscissa represents time, as with FIG. 19. The ordinate on FIG. 20 gives the same items of (A) through (I) as those on FIG. 19, except that (I) represents the quantity of heat accumulated SSQAST. The shift A position RPSA is positive in the direction of engagement of the shift A with the 1st speed gear and negative in the direction of engagement of the shift A with the 2nd speed gear. Similarly, the shift B position RPSB is positive in the direction of engagement of the shift B with the 3rd speed gear and negative in the direction of engagement of the shift B with the 4th speed gear. In addition, both the shift A position RPSA and the shift B position RPSB are zero (0) when the shift A and the shift B are at the neutral position. In the same manner as with FIG. 19, FIG. 20 shows when a gearshift is performed from the 1st speed to the 2nd speed with an accelerator opening kept constant. For the sake of simple explanation, it is assumed that the engine torque TE remains constant. Solid lines in FIG. 20 represent operations according to the control provided according to the current specific embodiment of the present invention. Broken lines in FIG. 20, given for a comparison purpose, show operations in the ordinary control shown in FIG. 19.

Referring to FIG. 20 (A), when the target gear position TGP as calculated according to step 503 (gearshift enable/disable discrimination operation) of FIG. 6 changes from that of the 1st speed to that of the 2nd speed at time t1, the following relation holds true: the current gear position $GP^1$ the target gear position TGP. At time t2 after the lapse of a predetermined period of time, the gearshift control is started. Up to time t2, the torque Tout of the output shaft 42 is: Tout=TE×G1.

Referring to FIG. 20 (F), the target assist torque TTAST as calculated according to step 506 (target assist torque calculation operation) of FIG. 6 starts to increase gradually at time t2. The assist motor target torque TTMAC is set according to the target assist torque TTAST. The actuator 114 is then controlled to allow a thrust force to be generated on the friction surface of the friction engagement device 10. When the thrust force is generated on the friction surface of the friction engagement device 10, the torque of the engine 6 transmitted through the 1st speed gear transmission path is gradually transmitted by the friction engagement device 10. Then, the output shaft torque Tout gradually decreases as shown in FIG. 20 (H).

Referring to FIG. 20 (I), the estimated quantity of heat accumulated PSSQAST as calculated according to step 501 (quantity of heat estimated value calculation operation) shown in FIG. 6 is greater than the estimated quantity of heat accumulated threshold value 1 cPSSQAH1 at time t2. At this time, the engine torque down flag fEGTQDN is set according to the operations of step 504 (discrimination flag calculation operation) shown in FIG. 6 and step 1207 shown in FIG. 13. Control is then provided to decrease the engine torque TE as shown in FIG. 20 (E) through the operations of step 509 (target engine torque calculation operation) shown in FIG. 6 and step 1708 shown in FIG. 17.

Referring to FIG. 20 (E), when the engine torque TE decreases down to the engine torque upper limit value TELMT and the target assist torque TTAST reaches the engine torque TE at time t3, the torque transmitted through the 1st speed gear transmission path becomes substantially 0. As a result, the torque of the engine 6 is substantially transmitted through the assist transmission path. In addition, since control has been provided to reduce the engine torque TE, the output shaft torque Tout decreases slightly more than the output shaft torque Tout during the control shown in FIG. 19 (=TE×G5) as shown in FIG. 20 (H).

The decrease in the engine torque TE results in the torque transmitted by the friction engagement device 10 being decreased. As a result, the increase in the quantity of heat accumulated SSQAST becomes milder as shown in FIG. 20 (I).

When the torque transmitted through the 1st speed gear transmission path becomes substantially 0 at time t3, the shift A target load TFSA as calculated according to step 507 (shift target load calculation operation) of FIG. 6 is set to a load for releasing the sleeve 21 from the gear 11. The shift A motor target torque TTMSA is set according to the shift A target load TFSA. When the shift A motor target torque TTMSA is set, the actuator 112 is controlled so that the sleeve 21 is released from the gear 11. After the sleeve 21 has been released from the gear 11, control is provided to bring the shift A position RPSA quickly to the neutral position. The target assist torque TTAST is controlled so as to control the speed NI of the input shaft 41 to the target speed (the speed corresponding to the next gearshift position) using the friction engagement device 10.

When the input shaft speed NI reaches a predetermined value, the shift A target load TFSA is set to a load for engaging the sleeve 22 with the gear 12. The sleeve 22 is then engaged with the gear 12 at time t4. Then the current gear position GP becomes the 2nd speed and the gearshift is completed.

After the gearshift is completed at time t4, the target assist torque TTAST is gradually returned to 0 as shown in FIG. 20 (F) and the release control of the friction engagement device 10 is carried out. Then, through the operation of step 1706 shown in FIG. 18, control is provided to return the engine torque TE to the driver torque requirement TTDRV. At this time, the torque transmitted by the friction engagement device 10 is gradually transmitted by the 2nd speed gear. Then, as shown in FIG. 20 (H), the output shaft torque Tout gradually increases.

When the release of the friction engagement device 10 is completed at time t5, the torque transmitted by the friction engagement device 10 becomes substantially 0 and the torque of the engine 6 is substantially transmitted by the 2nd speed gear transmission path. Then, as shown in FIG. 20 (H), the output shaft torque Tout increases to a level of Tout=TE×G2. After the lapse of a predetermined period of time after the release of the friction engagement device 10 has been completed, the gearshift control is completed at time t6.

As explained in the foregoing, the control is provided as follows: the quantity of heat that is expected to be accumulated in the friction engagement device 10 through the gearshift is estimated at the start of the gearshift control; the torque of the engine 6 is reduced before the gearshift (before the sleeve 21 is released from the 1st speed gear) according to the estimated quantity of heat accumulated; and after the gearshift (after the sleeve 21 has been engaged with the 2nd speed gear), the torque of the engine 6 is restored to a level corresponding to the accelerator pedal opening. Thus, it is possible to reduce the quantity of heat accumulated in the friction engagement device 10 through the gearshift SSQAST to a level lower than that during the ordinary control, thereby effectively preventing a sudden increase in temperature of the friction surface.

The operation of controlling, during an upshift from the 1st speed to the 2nd speed, the engine torque according to the quantity of heat estimated value for the friction engagement device 10 during the gearshift performed using the motor vehicle control system according to the preferred embodiment of the present invention will be described with reference to FIG. 21.

Figure 21:
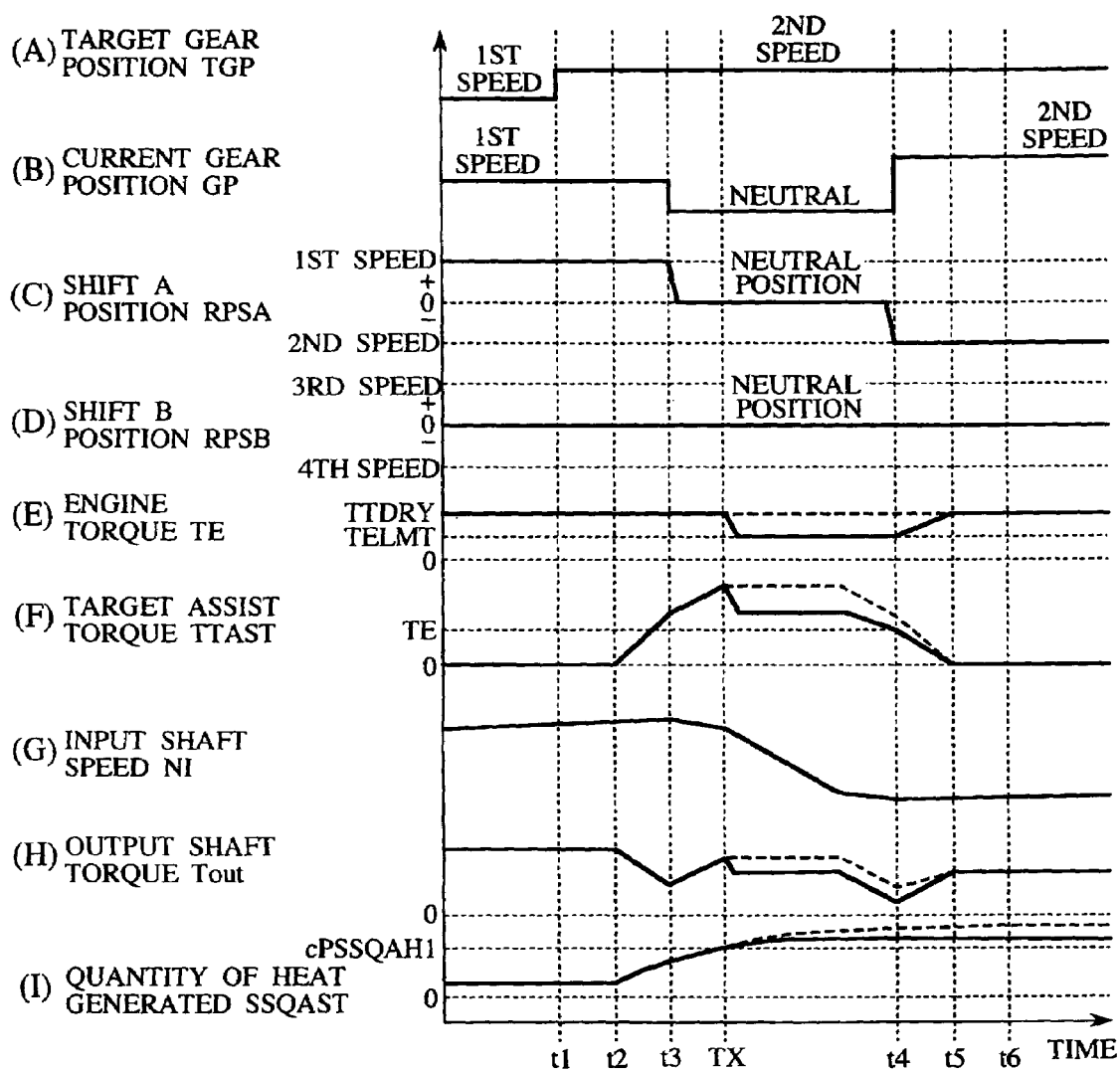
FIG. 21 is a timing chart showing the operation of controlling, during an upshift from a 1st speed to a 2nd speed, an engine torque according to a quantity of heat estimated value for a friction engagement device during the gearshift performed using the motor vehicle control system according to the preferred embodiment of the present invention.

FIG. 21 is a timing chart showing the operation of controlling, during the upshift from the 1st speed to the 2nd speed, the engine torque according to the quantity of heat estimated value for the friction engagement device 10 during the gearshift performed using the motor vehicle control system according to the preferred embodiment of the present invention.

On FIG. 21, the abscissa represents time, as with FIG. 19. The ordinate on FIG. 21 gives the same items of (A) through (I) as those on FIG. 19, except that (I) represents the quantity of heat accumulated SSQAST. The shift A position RPSA is positive in the direction of engagement of the shift A with the 1st speed gear and negative in the direction of engagement of the shift A with the 2nd speed gear. Similarly, the shift B position RPSB is positive in the direction of engagement of the shift B with the 3rd speed gear and negative in the direction of engagement of the shift B with the 4th speed gear. In addition, both the shift A position RPSA and the shift B position RPSB are zero (0) when the shift A and the shift B are at the neutral position. In the same manner as with FIG. 19, FIG. 21 shows when a gearshift is performed from the 1st speed to the 2nd speed with an accelerator opening kept constant. For the sake of simple explanation, it is assumed that the engine torque TE remains constant. Solid lines in FIG. 21 represent operations according to the control provided according to the current specific embodiment of the present invention. Broken lines in FIG. 21, given for a comparison purpose, show operations in the ordinary control shown in FIG. 19.

The operations for the period of time up to time t3 are the same as those described with reference to FIG. 19. Referring to FIG. 21 (I), after the sleeve 21 is released from the 1st speed gear at time t3, however, the quantity of heat accumulated SSQAST as calculated according to step 501 (quantity of heat estimated value calculation operation) of FIG. 6 is greater, at time TX, than the quantity of heat accumulated threshold value 1 cSSQAH1. Then, the engine torque down flag fEGTQDN is set according to the operations of step 504 (discrimination flag calculation operation) shown in FIG. 6 and step 1207 shown in FIG. 13. Then, through the operations of step 509 (target engine torque calculation operation) shown in FIG. 6 and step 1706 shown in FIG. 18, control is provided to quickly decrease the engine torque TE down to the engine torque upper limit value TELMT as shown in FIG. 21 (E). Referring to FIG. 21 (H), because of the control provided for decreasing the engine torque TE after time TX, the output shaft torque Tout is lower than that during the ordinary control shown in FIG. 19 (H). The decrease in the engine torque TE results in the torque transmitted by the friction engagement device 10 being decreased. As a result, the increase in the quantity of heat accumulated SSQAST becomes milder as shown in FIG. 21 (I).

When the input shaft speed NI then reaches a predetermined value, the shift A target load TFSA is set to a load for engaging the sleeve 22 with the gear 12. The sleeve 22 is then engaged with the gear 12 at time t4. Then the current gear position GP becomes the 2nd speed and the gearshift is completed. After the gearshift is completed at time t4, the target assist torque TTAST is gradually returned to 0 and the release control of the friction engagement device 10 is carried out. Through the operation of step 1706 shown in FIG. 18, control is provided to return the engine torque TE to the driver torque requirement TTDRV. At this time, the torque transmitted by the friction engagement device 10 is gradually transmitted by the 2nd speed gear. Then, as shown in FIG. 21 (H), the output shaft torque Tout gradually increases.

When the release of the friction engagement device 10 is completed at time t5, the torque transmitted by the friction engagement device 10 becomes substantially 0. The torque of the engine 6 is then substantially transmitted by the 2nd speed gear transmission path. Then, the output shaft torque Tout increases to a level of Tout=TE×G2.

After the lapse of a predetermined period of time after the release of the friction engagement device 10 has been completed, the gearshift control is completed at time t6. Thanks to the control provided for decreasing the engine torque TE, the quantity of heat accumulated SSQAST is reduced to a level lower than that in the ordinary control.

As explained in the foregoing, the control is performed as follows: the quantity of heat accumulated in the friction engagement device 10 through the gearshift is estimated during the gearshift; the torque of the engine 6 is reduced during the gearshift according to the estimated quantity of heat accumulated; and after the gearshift (after the sleeve 21 has been engaged with the 2nd speed gear), the torque of the engine 6 is restored to a level corresponding to the accelerator pedal opening. Thus, the quantity of heat accumulated in the friction engagement device 10 can be reduced, thereby effectively preventing a sudden increase in temperature of the friction surface.

The operation of selecting the second gearshift mode according to the quantity of heat estimated value for the friction engagement device 10 during an upshift from the 1st speed to the 2nd speed using the motor vehicle control system according to the preferred embodiment of the present invention will be described with reference to FIG. 22.

Figure 22:
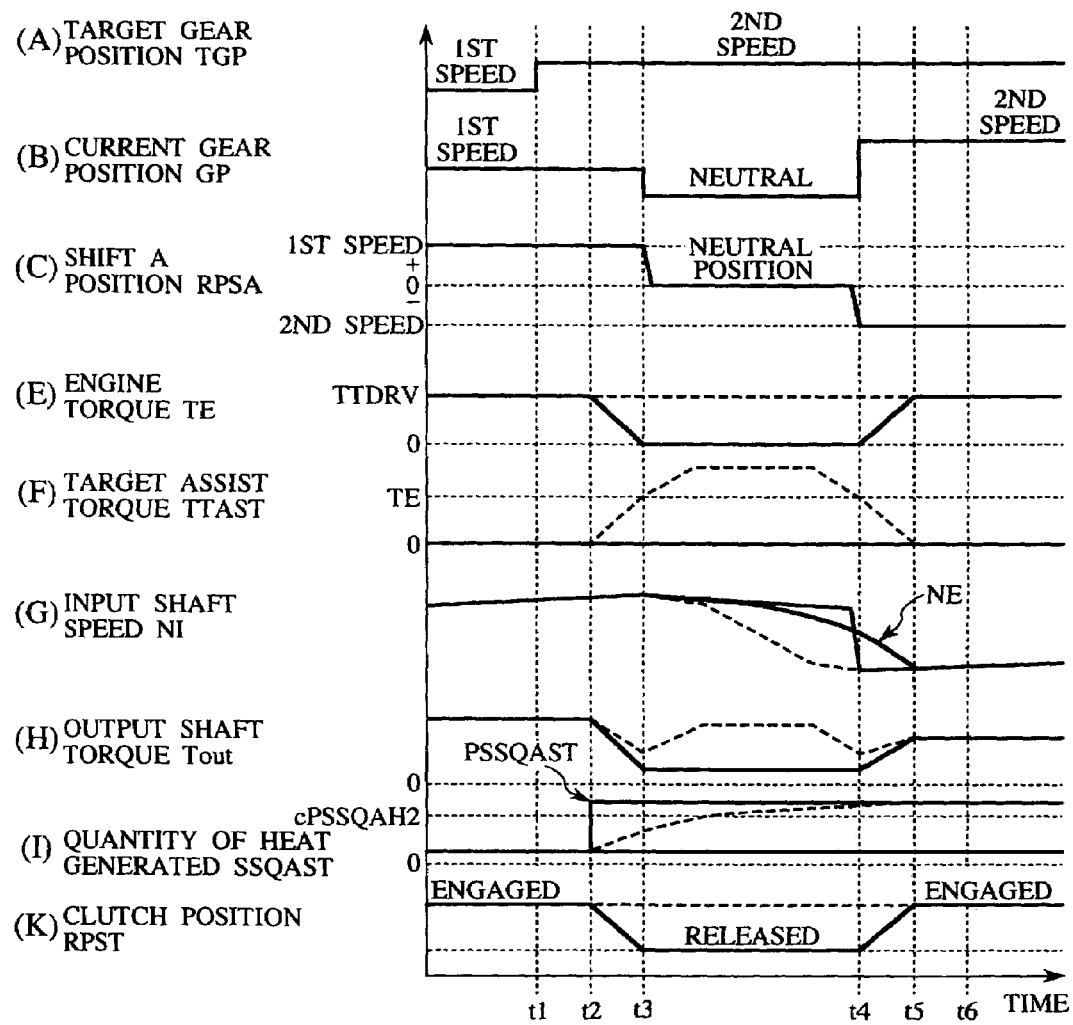
FIG. 22 is a timing chart showing the operation of selecting a second gearshift mode according to a quantity of heat estimated value for a friction engagement device during an upshift from a 1st speed to a 2nd speed using the motor vehicle control system according to the preferred embodiment of the present invention.

FIG. 22 is a timing chart showing the operation of selecting the second gearshift mode according to the quantity of heat estimated value for the friction engagement device 10 during the upshift from the 1st speed to the 2nd speed using the motor vehicle control system according to the preferred embodiment of the present invention.

On FIG. 22, the abscissa represents time, as with FIG. 19. The ordinate on FIG. 22 gives the same items of (A) through (H) as those on FIG. 19. Item (I) of the ordinate on FIG. 22 represents the quantity of heat accumulated SSQAST and item (K) of the ordinate on FIG. 22 represents the clutch position RPST. The shift A position RPSA is positive in the direction of engagement of the shift A with the 1st speed gear and negative in the direction of engagement of the shift A with the 2nd speed gear. Representation in the timing chart is omitted for the shift B position RPSB, since the shift B position RPSB retains the neutral position as in FIGS. 19 through 21. Both the shift A position RPSA and the shift B position RPSB are zero (0) when the shift A and the shift B are at the neutral position. FIG. 22 shows when a gearshift is performed from the 1st speed to the 2nd speed with an accelerator opening kept constant. Solid lines in FIG. 22 represent operations according to the control provided according to the current specific embodiment of the present invention. Broken lines in FIG. 22, given for a comparison purpose, show operations in the ordinary control shown in FIG. 19.

When the target gear position TGP as calculated according to step 503 (gearshift enable/disable discrimination operation) of FIG. 6 changes from that of the 1st speed to that of the 2nd speed at time t1, the following relation holds true: the current gear position $GP^1$ the target gear position TGP. At time t2 after the lapse of a predetermined period of time, the gearshift control is started. For a period of time up to time t2, the torque Tout of the output shaft 42 is: Tout=TE×G1.

The estimated quantity of heat accumulated PSSQAST as calculated according to step 501 (quantity of heat estimated value calculation operation) shown in FIG. 6 is greater than the estimated quantity of heat accumulated threshold value 2 cPSSQAH2 at time t2. At this time, the clutch release gearshift flag fCOFSFT is set according to the operations of step 504 (discrimination flag calculation operation) shown in FIG. 6 and step 1208 shown in FIG. 13. When the clutch release gearshift flag fCOFSFT is set, the gearshift mode is switched from the first gearshift mode to the second gearshift mode. In the first gearshift mode, the torque of the engine 6 is transmitted from the input shaft 41 to the output shaft 42 using the friction engagement device 10 and the gearshift is accomplished with the clutch 9 engaged. In the second gearshift mode, the gearshift is accomplished with the clutch 9 released. Then, the clutch target position TPSTA as calculated according to step 508 (clutch target position calculation operation) of FIG. 6 is gradually decreased to PSTAOF (the release position). The clutch motor target torque TTMST as calculated according to the clutch target position TPSTA is then set. When the clutch motor target torque TTMST is set, control is then provided to release the clutch 9 by controlling the actuator 111. The release of the clutch 9 gradually decreases the output shaft torque Tout to 0.

For a period of time from time t2 to time t3, control is provided to decrease the engine torque TE down to 0 as shown in FIG. 22 (E) through the operations of step 509 (target engine torque calculation operation) shown in FIG. 6 and step 1708 of FIG. 18. When the clutch release gearshift flag FCOFSFT is set, the target assist torque TTAST is set to 0. Then the thrust force of the friction engagement device 10 is no longer generated, thus preventing the quantity of heat accumulated SSQAST from increasing.

When the clutch position RPST reaches the release position and the engine torque decreases substantially to 0 at time t3, the shift A target load TFSA as calculated according to step 507 (shift target load calculation operation) of FIG. 6 is set to a load for releasing the sleeve 21 from the gear 11. In addition, the shift A motor target torque TTMSA is set according to the shift A target load TFSA. When the shift A motor target torque TTMSA is set, the actuator 112 is controlled so as to release the sleeve 21 from the gear 11. After the sleeve 21 has been released from the gear 11, control is provided to quickly bring the shift A position RPSA to the neutral position.

After the shift A position RPSA has been brought into the neutral position, the shift A target load TFSA is set to a load for engaging the sleeve 22 with the gear 12. At time t4, the sleeve 22 is engaged with the gear 12 and the current gear position GP becomes that of the 2nd speed. This completes the gearshift. At this time, the input shaft speed NI is decreased to a level corresponding to that of the next gearshift position by the 2nd speed gear synchromesh 32 as shown in FIG. 22 (G).

For a period of time from time t3 to time t4, the speed NE of the engine 6 is controlled as shown by a dash-single-dot line in FIG. 22 (G). The target engine torque TTE is therefore set to TENECR through step 509 (target engine torque calculation operation) shown in FIG. 6.

When the gearshift is completed at time t4, the clutch target position TPSTA as calculated according to step 508 (clutch target position calculation operation) is set to PSTAON (the engagement position), thereby providing control for engaging the clutch 9. According to step 509 (target engine torque calculation operation) shown in FIG. 6, the engine torque TE is returned to the driver torque requirement TTDRV as shown in FIG. 22 (E). Since the sleeve 21 is engaged with the 2nd speed gear at this time, the output shaft torque Tout gradually increases to G2×TE as shown in FIG. 22 (H).

The clutch position RPST reaches the engagement position and the engine torque TE is returned to the driver torque requirement TTDRV at time t5. After a predetermined period of time thereafter, the gearshift control is completed at time t6.

As explained in the foregoing, the control is performed as follows: the quantity of heat that is expected to be accumulated in the friction engagement device 10 through the gearshift is estimated at the start of the gearshift; the second gearshift mode is selected in advance, in which the gearshift is carried out with the clutch 9 released according to the estimated quantity of heat accumulated. Thus, the increase in the quantity of heat accumulated in the friction engagement device 10 is minimized, thereby effectively preventing a sudden increase in temperature of the friction surface.

The operation of selecting, during an upshift from the 1st speed to the 2nd speed, the second gearshift mode according to the quantity of heat estimated value for the friction engagement device 10 during the gearshift performed using the motor vehicle control system according to the preferred embodiment of the present invention will be described with reference to FIG. 23.

Figure 23:
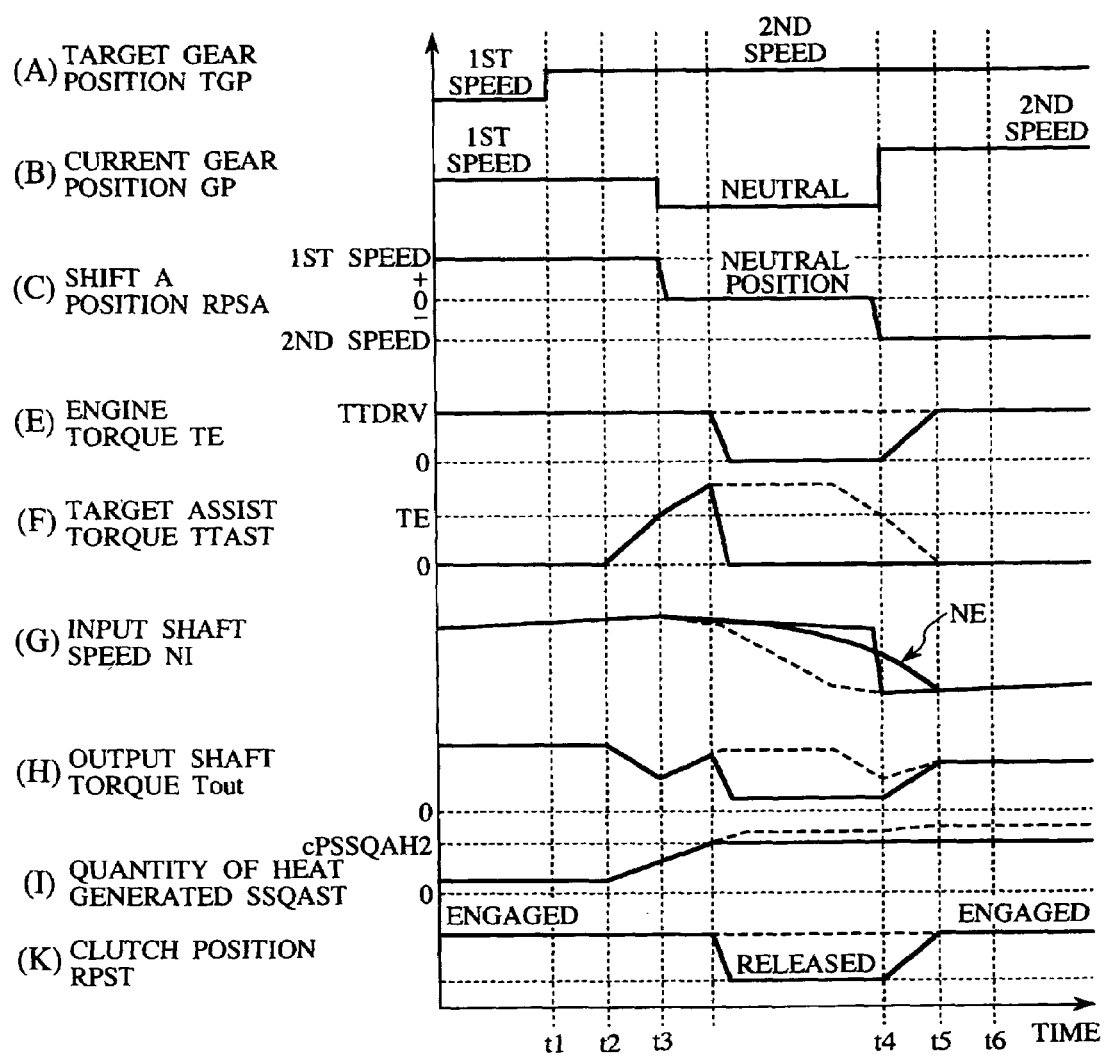
FIG. 23 is a timing chart showing the operation of selecting, during an upshift from a 1st speed to a 2nd speed, a second gearshift mode according to a quantity of heat estimated value for a friction engagement device during the gearshift performed using the motor vehicle control system according to the preferred embodiment of the present invention.

FIG. 23 is a timing chart showing the operation of selecting, during the upshift from the 1st speed to the 2nd speed, the second gearshift mode according to the quantity of heat estimated value for the friction engagement device 10 during the gearshift performed using the motor vehicle control system according to the preferred embodiment of the present invention.

On FIG. 23, the abscissa represents time, as with FIG. 19. The ordinate on FIG. 23 gives the same items of (A) through (H) as those on FIG. 19. Item (I) of the ordinate on FIG. 23 represents the quantity of heat accumulated SSQAST and item (K) of the ordinate on FIG. 23 represents the clutch position RPST. The shift A position RPSA is positive in the direction of engagement of the shift A with the 1st speed gear and negative in the direction of engagement of the shift A with the 2nd speed gear. Representation in the timing chart is omitted for the shift B position RPSB, since the shift B position RPSB retains the neutral position as in FIGS. 19 through 22. Both the shift A position RPSA and the shift B position RPSB are zero (0) when the shift A and the shift B are at the neutral position. FIG. 23 shows when a gearshift is performed from the 1st speed to the 2nd speed with an accelerator opening kept constant. Solid lines in FIG. 23 represent operations according to the control provided according to the current specific embodiment of the present invention. Broken lines in FIG. 23, given for a comparison purpose, show operations in the ordinary control shown in FIG. 19.

The operations for the period of time up to time t3 are the same as those with reference to FIG. 19. Referring to FIG. 23 (I), at time TY after the sleeve 21 has been released from the 1st speed gear at time t3, the quantity of heat accumulated SSQAST as calculated according to step 501 (quantity of heat estimated value calculation operation) of FIG. 6 is greater than the quantity of heat accumulated threshold value 2 cSSQAH2. At this time, the clutch release gearshift flag fCOFSFT is set according to the operations of step 504 (discrimination flag calculation operation) shown in FIG. 6 and step 1208 shown in FIG. 13. When the clutch release gearshift flag fCOFSFT is set, the gearshift mode is switched from the first gearshift mode to the second gearshift mode. In the first gearshift mode, the torque of the engine 6 is transmitted from the input shaft 41 to the output shaft 42 using the friction engagement device 10 and the gearshift is accomplished with the clutch 9 engaged. In addition, in the second gearshift mode, the gearshift is accomplished with the clutch 9 released. The clutch target position TPSTA as calculated according to step 508 (clutch target position calculation operation) of FIG. 6 is decreased to PSTAOF (the release position). The clutch motor target torque TTMST as calculated according to the clutch target position TPSTA is then set. When the clutch motor target torque TTMST is set, control is then provided to release the clutch 9 by controlling the actuator 111. The release of the clutch 9 gradually decreases the output shaft torque Tout to 0 as shown in FIG. 23 (H).

For a period of time from time TY to a time at which the clutch 9 is released, control is provided to decrease the engine torque TE down to 0 as shown in FIG. 23 (E) through the operations of step 509 (target engine torque calculation operation) shown in FIG. 6 and step 1708 of FIG. 18. When the clutch release gearshift flag fCOFSFT is set, the target assist torque TTAST decreases to 0. Then the thrust force of the friction engagement device 10 is no longer generated, thus preventing the quantity of heat accumulated SSQAST from increasing. The shift A target load TFSA is thereafter set to a load for engaging the sleeve 22 with the gear 12. At time t4, the sleeve 22 is engaged with the gear 12 and the current gear position GP becomes that of the 2nd speed. This completes the gearshift. At this time, the input shaft speed NI is decreased to a level corresponding to that of the next gearshift position by the 2nd speed gear synchromesh 32 as shown in FIG. 23 (G).

For a period of time from the time when the clutch 9 is released to time t4, the speed NE of the engine 6 is controlled as shown by a dash-single-dot line in FIG. 23 (G). The target engine torque TTE is therefore set to TENECR through step 509 (target engine torque calculation operation) shown in FIG. 6.

When the gearshift is completed at time t4, the clutch target position TPSTA as calculated according to step 508 (clutch target position calculation operation) is set to PSTAON (the engagement position), thereby providing control for engaging the clutch 9. According to step 509 (target engine torque calculation operation) shown in FIG. 6, the engine torque TE is returned to the driver torque requirement TTDRV as shown in FIG. 23 (E). Since the sleeve 21 is engaged with the 2nd speed gear at this time, the output shaft torque Tout gradually increases to G2×TE.

The clutch position RPST reaches the engagement position and the engine torque TE is returned to the driver torque requirement TTDRV at time t5. After a predetermined period of time thereafter, the gearshift control is completed at time t6.

As explained in the foregoing, the control is performed as follows: the quantity of heat that accumulated in the friction engagement device 10 through the gearshift is estimated; and the second gearshift mode is selected, in which the gearshift is carried out with the clutch 9 released according to the estimated quantity of heat accumulated. Thus, the increase in the quantity of heat accumulated in the friction engagement device 10 can be minimized, thereby effectively preventing a sudden increase in temperature of the friction surface.

The operation of prohibiting the gearshift for a predetermined period of time according to the temperature of the lubricating oil of the transmission using the motor vehicle control system according to the preferred embodiment of the present invention will be described with reference to FIG. 24.

Figure 24:
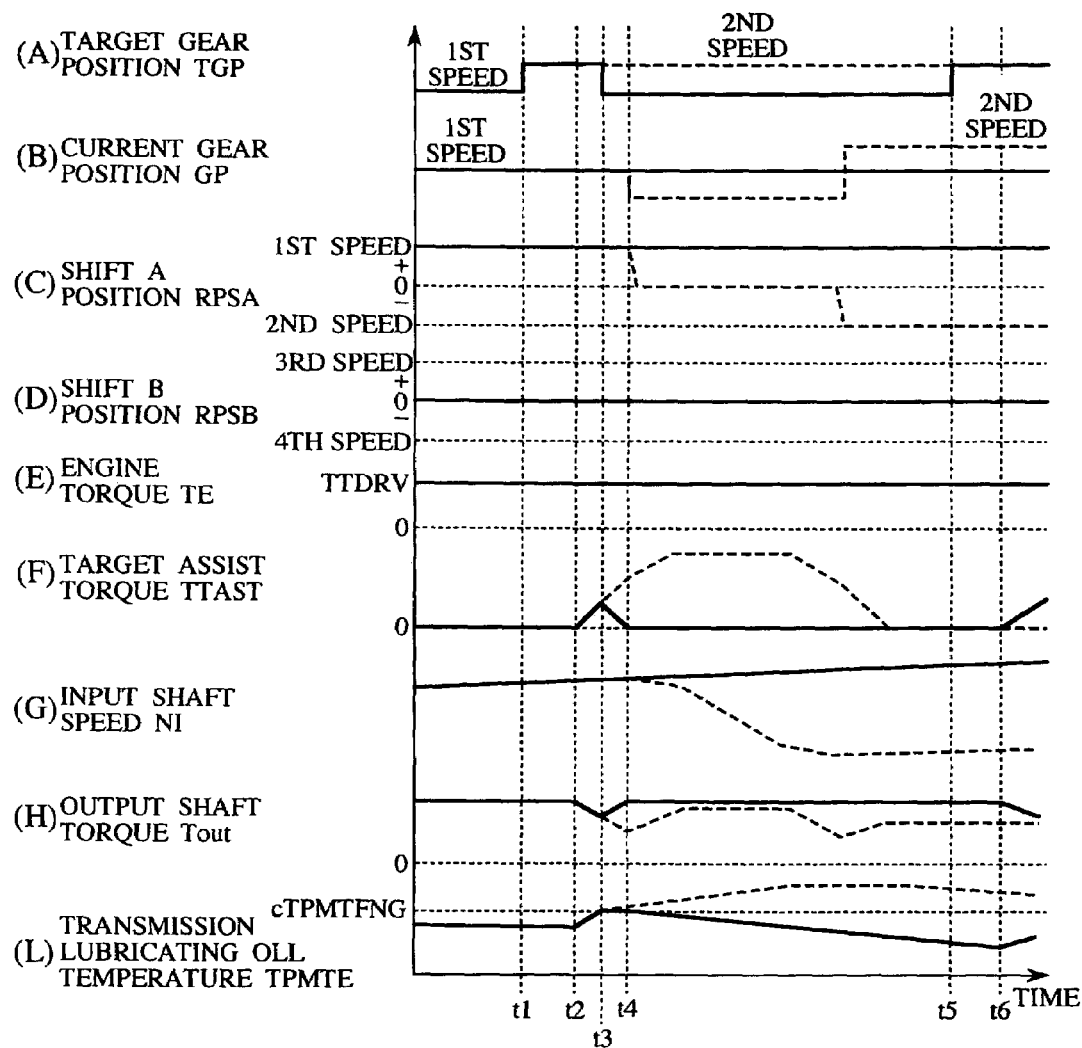
FIG. 24 is a timing chart showing the operation of prohibiting a gearshift for a predetermined period of time according to a temperature of a lubricating oil of a transmission using the motor vehicle control system according to the preferred embodiment of the present invention.

FIG. 24 is a timing chart showing the operation of prohibiting the gearshift for a predetermined period of time according to the temperature of the lubricating oil of the transmission using the motor vehicle control system according to the preferred embodiment of the present invention.

On FIG. 24, the abscissa represents time. The ordinate on FIG. 24 gives the same items of (A) through (H) as those on FIG. 19. Item (L) of the ordinate on FIG. 24 represents the transmission lubricating oil temperature TPMTF. The shift A position RPSA is positive in the direction of engagement of the shift A with the 1st speed gear and negative in the direction of engagement of the shift A with the 2nd speed gear. Similarly, the shift B position RPSB is positive in the direction of engagement of the shift B with the 3rd speed gear and negative in the direction of engagement of the shift B with the 4th speed gear. In addition, both the shift A position RPSA and the shift B position RPSB are zero (0) when the shift A and the shift B are at the neutral position. In the same manner as with FIG. 19, FIG. 24 shows when gearshift control is started for a gearshift from the 1st speed to the 2nd speed with an accelerator opening kept constant. For the sake of simple explanation, it is assumed that the engine torque TE remains constant. Solid lines in FIG. 24 represent operations according to the control provided according to the current specific embodiment of the present invention. Broken lines in FIG. 24, given for a comparison purpose, show operations in the ordinary control shown in FIG. 19.

The target gear position TGP as calculated according to step 503 (gearshift enable/disable discrimination operation) of FIG. 6 changes from that of the 1st speed to that of the 2nd speed at time t1 and the following relation holds true: the current gear position $GP^1$ the target gear position TGP. At time t2 after the lapse of a predetermined period of time, the gearshift control is started. For a period of time up to time t2, the torque Tout of the output shaft 42 remains Tout=TE×G1.

Referring to FIG. 24 (F), the target assist torque TTAST as calculated according to step 506 (target assist torque calculation operation) of FIG. 6 starts to increase gradually at time t2. The assist motor target torque TTMAC is set according to the target assist torque TTAST. The actuator 114 is then controlled to allow a thrust force to be generated on the friction surface of the friction engagement device 10. When the thrust force is generated on the friction surface of the friction engagement device 10, the torque of the engine 6 transmitted by the 1st speed gear transmission path is gradually transmitted by the friction engagement device 10. Then, the output shaft torque Tout gradually decreases as shown in FIG. 24 (H).

The transmission lubricating oil temperature TPMTF thereafter may become greater than the lubricating oil temperature NG threshold value cTPMTFNG at time t3 because of an increased temperature of the friction engagement device 10 or other cause. When this happens, the diagnostic flag DGNAC is set through the operations of step 502 (diagnostic flag calculation operation) of FIG. 6 and step 1004 of FIG. 11. At time t3, the current gear position GP is the 1st speed and it is determined that the current operation is in the release control phase.

When the diagnostic flag DGNAC is set at time t3, the current gear position GP (1st speed) is substituted for the target gear position TGP through the operations of step 503 of FIG. 6 and step 1110 of FIG. 11. Then, the relation of TGP=GP holds true and the gearshift is not executed.

After the relation of TGP=GP holds true at time t3, the target assist torque TTAST, which has been once on the increase, is gradually decreased down to 0. When the target assist torque TTAST becomes 0 at time t4, the constant speed driving using the 1st speed gear is resumed. Updating of the target gear position TGP is prohibited for a predetermined period of time, during which the constant speed driving using the 1st speed gear continues.

As shown in FIG. 24 (L), during the constant speed driving using the 1st speed gear continues, the transmission lubricating oil temperature TPMTF gradually decreases through an effect of running wind and the like for the period of time until time t5. At time t5, the transmission lubricating oil temperature TPMTF is sufficiently lower than the lubricating oil temperature NG threshold value cTPMTFNG Updating of the target gear position TGP is then enabled. As shown in FIG. 24 (A), the 2nd speed is substituted for the next gear position GPNXT through the operations of step 503 (gearshift enable/disable discrimination operation) of FIG. 6 and step 1106 of FIG. 12. The target gear position TGP then becomes the 2nd speed. It is desirable at this time that a gear position optimum for the operation of the driver and the operating condition of the vehicle be set for the target gear position TGP. The relation of TGP≠GP holds true at time t5. Then, at time t6 a predetermined period of time thereafter, the gearshift control is started again.

As explained in the foregoing, the temperature of the friction engagement device 10 can be prevented from increasing by prohibiting the gearshift for a predetermined period of time depending on the transmission lubricating oil temperature. Instead of the transmission lubricating oil temperature, the temperature of the friction surface of the friction engagement device 10, as estimated according to the quantity of heat estimated value as calculated according to step 501 (quantity of heat estimated value calculation operation) of FIG. 6 may be used.

In accordance with the preferred embodiments of the present invention described with reference to FIGS. 20 through 24, gearshift control is provided according to parameters such as the estimated quantity of heat accumulated and the quantity of heat accumulated of the friction engagement device, and the transmission lubricating oil temperature. The parameters are not, however, limited to these. Rather, any parameter that indicates the temperature of the friction surface of the friction engagement device 10 is applicable to the present invention.

The preferred embodiments described in accordance with the present invention have an arrangement, in which the friction engagement device 10 is provided for the 5th speed gear. The present invention is nonetheless applicable to an arrangement, in which the friction engagement device 10 is provided for a plurality of gearshift positions as disclosed in Japanese Patent Laid-open No. 2002-349646. In the arrangement having the friction engagement device 10 provided in the plurality of gearshift positions, the plurality of friction engagement devices may be selectively used according to the parameter representing the condition of the friction engagement devices.

The present invention can still be applied to a type of transmission having an arrangement called a twin clutch type automated MT depending on conditions involved. For the twin clutch type automated MT, Japanese Patent Laid-open No. 2002-349646 discloses a method for preventing torque interruption during a gearshift. In this method, when the gearshift is carried out by selecting the appropriate dog clutch in a first input shaft with a first friction clutch engaged, a second friction clutch is used to transmit torque of a driving power source to an output shaft. In such a gearshift method as that described above, the application of the present invention prevents the second friction clutch from being damaged due to the increased temperature.

As explained in the foregoing, according to the preferred embodiments of the present invention, as applied to the motor vehicle mounted with the transmission that transmits torque of the driving power source through the friction engagement device from the input shaft to the output shaft when the gearshift is accomplished by selecting the appropriate dog clutch, the friction engagement device can be prevented from being damaged as a result of its temperature increase. This is done by detecting or estimating the conditions of the friction surface of the friction engagement device, including temperature and quantity of heat, and carrying out the gearshift according to at least one parameter representing the detected or estimated condition.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A control system for a motor vehicle in which torque from a driving power source is transmitted to a tire through an input shaft and an output shaft of a transmission which includes a plurality of gears, a plurality of dog clutches for transmitting torque from said input shaft to said output shaft and at least one friction engagement device, wherein engagement of the gears with the dog clutches forms torque transmission paths from said input shaft to said output shaft, and wherein, when the engagement of said gears with said dog clutches is switched from a first engagement to a second engagement, said friction engagement device transmits the torque of said driving power source from said input shaft to said output shaft, said control system comprising:
    thermal state determining means for determining a thermal state by detecting or estimating a thermal state of said friction engagement device; and
    driving power source torque control means for controlling the torque of said driving power source according to a parameter representing the thermal state of said friction engagement device determined by said thermal state determining means.

2. The control system for a motor vehicle according to claim 1,
    wherein the parameter representing the thermal state of said friction engagement determined by said thermal state determining means is either a temperature of said friction engagement device or a quantity of heat of said friction engagement device; and
    wherein said driving power source torque control means reduces the torque of said driving power source if said parameter is greater than a predetermined value.

3. The control system for a motor vehicle according to claim 1, further comprising:
    first/second gearshift mode control means for controlling the transmission in either a first gearshift mode or a second gearshift mode,
    in said first gearshift mode, when the engagement of said gears with said dog clutches forming torque transmission paths from said input shaft to said output shaft is switched from the first engagement to the second engagement, a gearshift being performed such that said friction engagement device transmits the torque of said driving power source from said input shaft to said output shaft with a friction clutch interposed between said driving power source and said input shaft engaged, and said torque transmission path formed by said first engagement is switched to at least one intermediate transmission path formed by said friction engagement device before said intermediate transmission path is switched to a transmission path formed by said second engagement, and
    in said second gearshift mode, when the engagement of said gears with said dog clutches is switched from the first engagement to the second engagement, a gearshift is performed such that the transmission path formed by said first engagement is switched to the transmission path formed by said second engagement with said friction clutch released; and
    gearshift mode selection means for selecting either said first gearshift mode or said second gearshift mode according to the parameter representing the thermal state determined by said thermal state determining means.

4. The control system for a motor vehicle according to claim 3,
    wherein the parameter representing the thermal state of said friction engagement device determined by said thermal state determining means is either a temperature of said friction engagement device or a quantity of heat of said friction engagement device; and wherein said gearshift mode selection means selects said second gearshift mode to perform a gearshift if said parameter is greater than a predetermined value.

5. The control system for a motor vehicle according to claim 1, further comprising gearshift enable/disable determining means for determining whether or not said gearshift can be performed according to the parameter representing the thermal state determined by said thermal state determining means.

6. The control system for a motor vehicle according to claim 5, wherein the parameter representing the thermal state of said friction engagement device determined by said thermal state determining means is either a temperature of said friction engagement device or a quantity of heat of said friction engagement device; and wherein said gearshift enable/disable determining means prohibits said gearshift for a predetermined period of time if said parameter is greater than a predetermined value.

7. The control system for a motor vehicle according to claim 5, further comprising:

gearshift intention determining means for determining a driver's intention to change gears; and automatic/manual gearshift control means for controlling the transmission in either a manual gearshift mode in which an output of a gearshift command is produced according to the driver's intention to change gears as detected by said gearshift intention determining means or an automatic gearshift mode in which an output of a gearshift command is produced according to a gearshift map previously stored;

wherein the parameter representing the thermal state of said friction engagement device determined by said thermal state determining means is either a temperature of said friction engagement device or a quantity of heat of said friction engagement device; and wherein said gearshift enable/disable determining means prohibits a gearshift in said manual gearshift mode for a predetermined period of time if said parameter is greater than a predetermined value.

8. The control system for a motor vehicle according to claim 5, further comprising annunciation means for informing the driver of the state of the friction engagement device according to the parameter representing the thermal state as determined by said thermal state determining means.

9. The control system for a motor vehicle according to claim 8, wherein the parameter representing the thermal state of said friction engagement device determined by said thermal state determining means is either a temperature of said friction engagement device or a quantity of heat of said friction engagement device; and wherein said annunciation means warns the driver of a faulty condition of said friction engagement device if said parameter is greater than a predetermined value.

10. A control system for a motor vehicle in which torque from a driving power source is transmitted to a tire through an input shaft and an output shaft of a transmission which includes a plurality of gears and a plurality of dog clutches for transmitting torque from said input shaft to said output shaft and at least one friction engagement device, said control system comprising:

first/second gearshift mode control means for controlling the transmission in either a first gearshift mode or a second gearshift mode, in said first gearshift mode, when the engagement of said gears with said dog clutches forming torque transmission paths from said input shaft to said output shaft is switched from the first engagement to the second engagement, a gearshift being performed such that said friction engagement device transmits the torque of said driving power source from said input shaft to said output shaft with a friction clutch engaged, and said torque transmission path formed by said first engagement is switched to at least one intermediate transmission path formed by said friction engagement device before said intermediate transmission path is switched to a transmission path formed by said second engagement, and in said second gearshift mode, when the engagement of said gears with said dog clutches is switched from the first engagement to the second engagement, a gearshift being performed such that the transmission path formed by said first engagement is switched to the transmission path formed by said second engagement with said friction clutch released;

thermal state determining means for determining a thermal state of said friction engagement device; and gearshift mode selection means selecting either said first gearshift mode or said second gearshift mode according to the parameter representing the thermal state determined by said thermal state determining means.

11. A control system for a motor vehicle in which torque from a driving power source is transmitted to a tire through an input shaft of and an output shaft of a transmission which includes a plurality of gears and a plurality of dog clutches for transmitting torque from said input shaft to said output shaft and at least one friction engagement device, wherein engagement of the gears with the dog clutches forms torque transmission paths from said input shaft to said output shaft, and wherein, when the engagement of said gears with said dog clutches is switched from a first engagement to a second engagement for a gearshift, said friction engagement device transmits the torque of said driving power source from said input shaft to said output shaft, said control system comprising:

thermal state determining means for determining a thermal state of said friction engagement device; and gearshift enable/disable determining means for determining whether or not said gearshift can be performed according to the parameter representing the thermal state determined by said thermal state determining means.

12. A control system for a motor vehicle in which torque from a driving power source is transmitted to a tire through an input shaft and an output shaft of a transmission which includes a plurality of gears and a plurality of dog clutches for transmitting torque from said input shaft to said output shaft and at least one friction engagement device, wherein engagement of the gears with the dog clutches forms torque transmission paths from said input shaft to said output shaft, and wherein, when the engagement of said gears with said dog clutches is switched from a first engagement to a second engagement, said friction engagement device transmits the torque of said driving power source from said input shaft to said output shaft, said control system comprising:

thermal state determining means for determining a thermal state of said friction engagement device; and annunciation means for informing the driver of the state of the friction engagement device according to the parameter representing the thermal state as determined by said thermal state determining means.

13. A control method for a motor vehicle in which torque from a driving power source is transmitted to a tire through an input shaft and an output shaft of a transmission which includes a plurality of gears and a plurality of dog clutches for transmitting torque from said input shaft to said output shaft and at least one friction engagement device, wherein engagement of the gears with the dog clutches forms torque transmission paths from said input shaft to said output shaft, and wherein, when the engagement of said gears with said dog clutches is switched from a first engagement to a second engagement, said friction engagement device transmits the torque of said driving power source from said input shaft to said output shaft, comprising the steps of:

determining a parameter representing a thermal state of said friction engagement device by detecting or estimating a temperature of said friction engagement device or a quantity of heat of said friction engagement device; and reducing the torque of said driving power source when said parameter is greater than a predetermined value.

14. A control method for a motor vehicle in which torque from a driving power source is transmitted to a tire through an input shaft and an output shaft of a transmission which includes a plurality of gears and a plurality of dog clutches for transmitting torque from said input shaft to said output shaft, comprising the steps of:

providing a first gearshift mode in which when the engagement of said gears with said dog clutches forming torque transmission paths from said input shaft to said output shaft is switched from the first engagement to the second engagement, a gearshift is performed such that said friction engagement device transmits the torque of said driving power source from said input shaft to said output shaft with a friction clutch interposed between said driving power source and said input shaft engaged, and said torque transmission path formed by said first engagement is switched to at least one intermediate transmission path formed by said friction engagement device before said intermediate transmission path is switched to a transmission path formed by said second engagement;

providing a second gearshift mode in which when the engagement of said gears with said dog clutches is switched from the first engagement to the second engagement, a gearshift is performed such that the transmission path formed by said first engagement is switched to the transmission path formed by said second engagement with said friction clutch released;

determining a parameter representing a thermal state of said friction engagement device by detecting or estimating a temperature of said friction engagement device or a quantity of heat of said friction engagement device; and carrying out a gearshift in said second gearshift mode when said parameter is greater than a predetermined value.

15. A control method for a motor vehicle in which torque from a driving power source is transmitted to a tire through an input shaft and an output shaft of a transmission which includes a plurality of gears and a plurality of dog clutches for transmitting torque from said input shaft to said output shaft and at least one friction engagement device; wherein engagement of the gears with the dog clutches forms torque transmission paths from said input shaft to said output shaft, and wherein, when the engagement of said gears with said dog clutches is switched from a first engagement to a second engagement for a gearshift, said friction engagement device transmits the torque of said driving power source from said input shaft to said output shaft, comprising the steps of:

providing a manual gearshift mode in which a driver's intention to change gears is detected and an output of a gearshift command is produced according to the detected driver's intention, and an automatic gearshift mode in which an output of a gearshift command is produced according to a gearshift map previously stored, determining a parameter representing a thermal state of said friction engagement device, by detecting or estimating a temperature of said friction engagement device or a quantity of heat of said friction engagement device; and prohibiting a gearshift for a predetermined period of time in said manual gearshift mode when said parameter is greater than a predetermined value.

16. A control method for a motor vehicle in which torque from a driving power source is transmitted to a tire through an input shaft and an output shaft of a transmission which includes a plurality of gears and a plurality of dog clutches for transmitting torque from said input shaft to said output shaft and at least one friction engagement device, wherein engagement of the gears with the dog clutches forms torque transmission paths from said input shaft to said output shaft, and wherein, when the engagement of said gears with said dog clutches is switched from a first engagement to a second engagement, said friction engagement device transmits the torque of said driving power source from said input shaft to said output shaft, comprising the steps of:

determining a parameter representing a thermal state of said friction engagement device by detecting or estimating a temperature of said friction engagement device or a quantity of heat of said friction engagement device; and warning a driver of a faulty condition of said friction engagement device when said parameter is greater than a predetermined value.

17. A control unit for a motor vehicle in which torque from a driving power source is transmitted to a tire through an input shaft and an output shaft of a transmission which includes a plurality of gears, a plurality of dog clutches, and at least one friction engagement device, wherein engagement of the gears with the dog clutches forms torque transmission paths from said input shaft to said output shaft, and wherein, when the engagement of said gears with said dog clutches is switched from a first engagement to a second engagement, said friction engagement device transmits the torque of said driving power source from said input shaft to said output shaft, said control unit comprising:

a thermal state determiner which inputs a thermal state signal from said friction engagement device, and a torque controller which inputs the thermal state data from said thermal state determiner and outputs a torque control signal to said driving power source determined by said thermal state data.

18. An engine control unit for a motor vehicle in which torque from an engine is transmitted to a tire through an input shaft and an output shaft of a transmission which includes a plurality of gears, a plurality of dog clutches, and at least one friction engagement device, wherein engagement of the gears with the dog clutches forms torque transmission paths from said input shaft to said output shaft, and wherein, when the engagement of said gears with said dog clutches is switched from a first engagement to a second engagement, said friction engagement device transmits the torque of said driving power source from said input shaft to said output shaft, wherein said engine control unit outputs a torque control signal to said engine according to a thermal state signal of said friction engagement device.

19. A control system for a motor vehicle comprising a transmission and a control unit, wherein said transmission transmits torque from a driving power source to a tire through an input shaft, one of gears, one of dog clutches, and an output shaft, and wherein said control unit controls said gears, said dog clutches, and a friction engagement device whereby, when the engagement of said gears with said dog clutches is switched from a first engagement to a second engagement, said friction engagement device transmits the torque of said driving power source from said input shaft to said output shaft, wherein said transmission comprises a thermal state detector of said friction engagement, and wherein said control unit comprises a thermal state determiner which inputs a thermal state signal from said thermal state detector, and a torque controller which inputs the thermal state data from said thermal state determiner and outputs a torque control signal to an engine controller.

20. A motor vehicle comprising: a power source, a power source control unit, a transmission which transmits a torque from said driving power source to a tire through an input shaft, one of gears, one of dog clutches, and an output shaft, and a transmission control unit which controls said gears, said dog clutches, and a friction engagement device whereby, when the engagement of said gears with said dog clutches is switched from a first engagement to a second engagement, said friction engagement device transmits the torque of said driving power source from said input shaft to said output shaft, wherein said transmission comprises a thermal state detector of said friction engagement, wherein said transmission control unit inputs a thermal state signal from said thermal state detector, and outputs a torque control signal determined by said thermal state signal, and wherein said power source control unit controls said power source according to said torque control signal received from said transmission control unit.

* * * * *